United States Patent
Huner et al.

(10) Patent No.: US 11,816,280 B2
(45) Date of Patent: *Nov. 14, 2023

(54) TOUCH ENCODER, TOUCH PANEL, AND INPUT METHOD EDITOR WITH INTEGRATED DEVELOPMENT ENVIRONMENT AND METHODS THEREOF

(71) Applicant: Grayhill, Inc., La Grange, IL (US)

(72) Inventors: Matt Huner, La Grange, IL (US); Kevin Dooley, Chicago, IL (US); Torsten Chase, Medina, OH (US); Robert Kerner, Chicago, IL (US); Kenneth G. Mages, Chicago, IL (US); Robert Piotr Obrochta, Burbank, IL (US); Andrew Wood Polk, IV, Chicago, IL (US); Patrick Charles Leighton, Barrington, IL (US); Cheng-Yu Hsu, Chupei (TW)

(73) Assignee: GRAYHILL, INC., Lagrange, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/674,574

(22) Filed: Feb. 17, 2022

(65) Prior Publication Data

US 2022/0171493 A1 Jun. 2, 2022

Related U.S. Application Data

(63) Continuation of application No. 17/012,425, filed on Sep. 4, 2020, now Pat. No. 11,281,326, which is a
(Continued)

(51) Int. Cl.
*G06F 3/041* (2006.01)
*G06F 3/0362* (2013.01)
(Continued)

(52) U.S. Cl.
CPC ............ *G06F 3/0416* (2013.01); *G06F 3/038* (2013.01); *G06F 3/0362* (2013.01);
(Continued)

(58) Field of Classification Search
CPC .. G06F 3/0416; G06F 3/03547; G06F 3/0362; G06F 3/038; G06F 3/04847; G06F 3/016
See application file for complete search history.

(56) References Cited

U.S. PATENT DOCUMENTS 5,657,012 A   8/1997   Tait
5,831,554 A   11/1998  Tromblee
(Continued)

FOREIGN PATENT DOCUMENTS

JP   2014-089708 A   5/2014
JP   2014-102838 A   6/2014
(Continued)

OTHER PUBLICATIONS

International Search Report and Written Opinion for International Application No. PCT/US2019/012062, dated May 3, 2019 (16 pages).
(Continued)

*Primary Examiner* — Mark Edwards
(74) *Attorney, Agent, or Firm* — K&L Gates LLP

(57) ABSTRACT

An encoder may be configured to receive a first input from a user. The encoder may include a first user input area. A configurator may be configured to communicate with the encoder and the encoder may be configured to communicate with a CPU. The encoder may receive the first input from the user at the first user input area based on an encoder configuration defined by the configurator. The encoder may communicate the first input to the CPU based on the encoder configuration defined by the configurator. A panel may be configured to receive a first input from a user. The panel may
(Continued)

include a plurality of input areas. A portable computing device may comprise a configurator. The portable computing device may be configured to communicate with a CPU.

20 Claims, 33 Drawing Sheets

Related U.S. Application Data continuation of application No. 16/238,170, filed on Jan. 2, 2019, now Pat. No. 10,795,494.

(60) Provisional application No. 62/613,326, filed on Jan. 3, 2018, provisional application No. 62/613,319, filed on Jan. 3, 2018.

(51) Int. Cl.
*G06F 3/0354* (2013.01)
*G06F 3/038* (2013.01)
*G06F 3/04847* (2022.01)
*G06F 3/01* (2006.01)

(52) U.S. Cl.
CPC ...... *G06F 3/03547* (2013.01); *G06F 3/04847* (2013.01); *G06F 3/016* (2013.01)

(56) References Cited

U.S. PATENT DOCUMENTS

| | | | |
|---|---|---|---|
| 5,831,596 A | 11/1998 | Marshall et al. | |
| 6,059,660 A | 5/2000 | Takada et al. | |
| 6,388,655 B1 | 5/2002 | Leung | |
| 6,580,418 B1 | 6/2003 | Grome et al. | |
| 6,606,085 B1 | 8/2003 | Endo et al. | |
| 7,019,732 B2 | 3/2006 | Furukawa | |
| 7,265,304 B2 | 9/2007 | Ichiki et al. | |
| 7,429,977 B2 | 9/2008 | Edmunds | |
| 7,433,760 B2 | 10/2008 | Alzarez et al. | |
| 7,474,296 B2 | 1/2009 | Obermeyer et al. | |
| 7,489,303 B1 * | 2/2009 | Pryor | G01C 21/265 345/184 |
| 7,595,712 B2 | 9/2009 | Nishino et al. | |
| 8,083,590 B2 | 12/2011 | Nourry | |
| 8,094,121 B2 | 1/2012 | Obermeyer et al. | |
| 8,164,405 B2 | 4/2012 | Hsu et al. | |
| 8,264,458 B2 | 9/2012 | Cooper et al. | |
| 8,344,834 B2 | 1/2013 | Niiyama | |
| 8,344,914 B2 | 1/2013 | Yeh | |
| 8,345,005 B2 | 1/2013 | Jaouen | |
| 9,782,159 B2 | 10/2017 | Tesar | |
| 2004/0222965 A1 | 11/2004 | Riccomini et al. | |
| 2005/0052425 A1 | 3/2005 | Zadesky et al. | |
| 2005/0088413 A1 | 4/2005 | Brewer et al. | |
| 2005/0195166 A1 | 9/2005 | Cooper et al. | |
| 2006/0066588 A1 | 3/2006 | Lyon et al. | |
| 2007/0031161 A1 | 2/2007 | Andoli et al. | |
| 2007/0194219 A1 | 8/2007 | Shaw et al. | |
| 2008/0012837 A1 | 1/2008 | Marriott et al. | |
| 2008/0100568 A1 | 5/2008 | Koch et al. | |
| 2008/0309632 A1 | 5/2008 | Koch et al. | |
| 2009/0072662 A1 | 3/2009 | Sadler et al. | |
| 2010/0090813 A1 | 4/2010 | Je et al. | |
| 2010/0241973 A1 | 9/2010 | Whiddett | |
| 2011/0095877 A1 | 4/2011 | Casparian et al. | |
| 2011/0163957 A1 | 7/2011 | Jaouen | |
| 2011/0164029 A1 | 7/2011 | King et al. | |
| 2011/0186422 A1 | 8/2011 | Lee | |
| 2012/0038471 A1 | 2/2012 | Kim et al. | |
| 2012/0162076 A1 | 6/2012 | Obermeyer et al. | |
| 2013/0113729 A1 | 5/2013 | Chiang | |
| 2013/0127825 A1 | 5/2013 | Joshi | |
| 2013/0220779 A1 | 8/2013 | Kerner et al. | |
| 2014/0024110 A1 | 1/2014 | Knofe et al. | |
| 2014/0071079 A1 | 3/2014 | Heubel et al. | |
| 2014/0247246 A1 | 9/2014 | Maus | |
| 2014/0282142 A1 * | 9/2014 | Lin | A61B 8/465 715/765 |
| 2014/0333538 A1 | 11/2014 | Chang | |
| 2015/0089452 A1 | 3/2015 | Dorninger | |
| 2015/0288484 A1 | 10/2015 | Nie et al. | |
| 2016/0062618 A1 | 3/2016 | Fagan et al. | |
| 2016/0202721 A1 | 7/2016 | Bernardy et al. | |
| 2016/0313816 A1 | 10/2016 | Krishnakumar et al. | |
| 2018/0079429 A1 * | 3/2018 | Prokhorov | H04B 1/3822 |
| 2018/0373350 A1 * | 12/2018 | Rao | G06F 3/038 |
| 2019/0012003 A1 | 1/2019 | Grant et al. | |
| 2020/0264727 A1 | 8/2020 | Lee et al. | |

FOREIGN PATENT DOCUMENTS

| | | |
|---|---|---|
| WO | 2016/166793 A1 | 10/2016 |
| WO | 2017/087872 | 5/2017 |

OTHER PUBLICATIONS

Communication regarding supplementary European search report for International Application No. 19736129.8 based on PCT/US2019/012062 dated Sep. 24, 2021 (1 page).
Extended European Search Report for International Application No. 19736129.8 based on PCT/US2019/012062 dated Sep. 7, 2021 (3 pages).
Phillips CX50.pdf (Year: 2016).
Japanese Notice of Reasons for Rejection from corresponding Japanese Patent Application No. 2020-537516, dated Feb. 14, 2023.

* cited by examiner

TOUCH ENCODER, TOUCH PANEL, AND INPUT METHOD EDITOR WITH INTEGRATED DEVELOPMENT ENVIRONMENT AND METHODS THEREOF

PRIORITY CLAIM

This application claims priority to U.S. application Ser. No. 17/012,425, filed Sep. 4, 2020, which claims priority to U.S. application Ser. No. 16/238,170, filed Jan. 2, 2019 which claims priority to Provisional Application Nos. 62/613,326, filed Jan. 3, 2018 and 62/613,319, filed Jan. 3, 2018, the entire contents of which are incorporated herein by reference.

FIELD OF INVENTION

The present disclosure relates to encoders and input method editors for panels and encoders. An input method editor may include an integrated development environment. More specifically the present disclosure relates to methods and devices for customizing a user interface of an encoder and/or inputs received by a panel using an integrated development environment to define inputs received through the panel and/or the touch encoder.

BACKGROUND

Encoders generally relate to a field of hardware designed to receive inputs from a user. The encoder may adapt those inputs to be received by a central processing unit ("CPU") associated with and/or remote from the encoder. In general, inputs received from the user may take many forms depending on the application for which the encoder is used.

Typically, encoders are adapted for only a single application, and are shipped from the factory only configured to operate for the specific application for which the encoder has been adapted for at the factory. However, over time, encoders may break from wear or from operating in a harsh environment. Additionally, over time the needs required from the user for a desired application may shift over time. In such cases, an encoder may not best meet the functional requirements the user requires for the application at hand.

SUMMARY

The present disclosure provides advantages over and solutions to problems in existing technologies relating to encoders. In this regard, encoders may be adapted for only a single application. Exemplary applications for an encoder may include commercial vehicles, private vehicles, military applications, heavy machinery, light machinery, vehicle displays, joysticks, keypads, communications controls, fire control applications, navigation, GPS units, radios, unmanned aerial vehicle controls, radar and sonar controls, weapons guidance, and healthcare applications including ventilators, hospital bed keypads, patient monitoring keypads, diagnostic equipment, portable defibrillators, Magnetic Resonance Imaging ("MRI") devices, X-ray devices, ultrasound machines, and the like. In some embodiments, additional hardware may be required for the encoder to be integrated into selected applications. For example, if the encoder is used as part of a vehicle (e.g. as a drive selector), short circuit protection and/or battery/alternator protection may be required. If the encoder is used a part of a healthcare application it may be necessary to include a hermetic seal around the encoder.

In an embodiment, an encoder system may include an associated input method editor with an integrated development environment, which can be used to configure the encoder to adapt to the functional requirements needed by a user. Accordingly, the customizable encoder may be of a single design but be highly adaptable for many uses. As a result, customizable encoders may be manufactured more robustly since only a single encoder must be designed and manufactured by an original equipment manufacturer ("OEM") instead of spreading research, design, and manufacturing costs and capabilities across various encoders and encoder customers, each designed for a specific application.

According to an embodiment of the present disclosure, an encoder may be reconfigured in the field when a new encoder configuration is installed via an application to replace a previously configured encoder. The encoder may be selectively reconfigured in the field adapt, add, or remove the functionality of the encoder if the functional requirements of the encoder shift over time.

In an embodiment, when a new encoder is installed, for example, if the previous encoder was damaged, the newly installed encoder can be configured using the integrated development environment directly, without any interface from the OEM.

In an embodiment, multiple encoders may be configured to replicate the functionality of a single encoder. Thus, if an encoder is configured by a user in a manner that is especially useful for the application at hand, the integrated development environment may allow for other encoders in the field to be remotely reconfigured with the especially useful setup.

In an embodiment, an encoder having an associated input method editor with an integrated development environment can be adapted as the desired functionality of the encoder the user requires changes over time. Through the integrated development environment, functionality of the encoder may be added, modified, and/or removed by the user to respond to the changing user requirements.

An application may be configurable by a user to vary the type and method of user inputs received by an encoder and transmitted to a CPU. An application may also be selectively configurable by a user to vary the type and method of CPU outputs (e.g., visual, auditory, and/or tactile) transmitted by the CPU to the encoder to be communicated to the user.

In an embodiment, an integrated development environment and an encoder may use a Simple DirectMedia Layer ("SDL") software development library to configure the encoder and integrated development environment to communicate with each other and with external computing devices. In an embodiment, an integrated development environment uses a Linux Compiler.

In an embodiment, an encoder may comprise a playback mode. In the playback mode, the encoder may be able to reproduce recorded movements and/or inputs to the encoder for later use or reference by the user.

In light of the disclosure herein, and without limiting the scope of the invention in any way, in a first aspect of the present disclosure, which may be combined with any other aspect listed herein unless specified otherwise, a system includes an encoder, the encoder configured to receive a first input from a user, the encoder including a first user input area; a CPU; and a configurator, the configurator configured to communicate with the encoder and the encoder configured to communicate with the CPU. The encoder receives the first input from the user at the first user input area based on an encoder configuration defined by the configurator and the encoder communicates the first input to the CPU based on the encoder configuration defined by the configurator.

In a second aspect of the present disclosure, which may be combined with any other aspect listed herein unless specified otherwise, the encoder includes a central protrusion and a knob, the knob configured to rotate in substantially a single plane about the central protrusion, the knob configured to receive a second input from the user, and the encoder receives the second input from the knob based on the encoder configuration defined by the configurator.

In a third aspect of the present disclosure, which may be combined with any other aspect listed herein unless specified otherwise, the first user input area of the encoder defined by the configurator includes a touch surface.

In a fourth aspect of the present disclosure, which may be combined with any other aspect listed herein unless specified otherwise, the touch surface is configured to display a first image as defined by the encoder configuration, and the first image displayed by the touch surface correlates to a first type of input received by the encoder as defined by the encoder configuration.

In a fifth aspect of the present disclosure, which may be combined with any other aspect listed herein unless specified otherwise, the touch surface is configured to display a second image as defined by the encoder configuration, and the second image displayed by the touch surface correlates to a second type of input received by the encoder as defined by the encoder configuration.

In a sixth aspect of the present disclosure, which may be combined with any other aspect listed herein unless specified otherwise, the encoder includes a feedback unit, the feedback unit configured by the encoder configuration to provide feedback to the user in response to the first input.

In a seventh aspect of the present disclosure, which may be combined with any other aspect listed herein unless specified otherwise, the feedback unit is configurable by the configurator to provide at least one selected from the group consisting of visual feedback, audible feedback, haptic feedback, and motion feedback when the first input is received by the encoder.

In an eighth aspect of the present disclosure, which may be combined with any other aspect listed herein unless specified otherwise, the encoder includes a top portion and a base, the top portion configured to translate in a single plane relative to the base. The translation of the top portion relative to the base defines a third input from the user. The encoder receives the third input from the user based on the encoder configuration defined by the configurator.

In a ninth aspect of the present disclosure, which may be combined with any other aspect listed herein unless specified otherwise, an apparatus includes a top surface including a touch screen, the touch screen configured to receive a first input from a user; a rotatable dial located along an outer perimeter of the apparatus, the outer perimeter surrounding the top surface and set below the top surface; an under surface located on an opposite side of the rotatable dial from the top surface; a lower protrusion extending from the top surface to the under surface and configured to receive a second input from the user; and a CPU. The CPU is configured to receive the first and second inputs as defined by a configuration, and the touch screen is configured to display a first display as defined by the configuration.

In a tenth aspect of the present disclosure, which may be combined with any other aspect listed herein unless specified otherwise, the top surface is slidably and rotatably movable relative to the lower surface in substantially a single plane.

In an eleventh aspect of the present disclosure, which may be combined with any other aspect listed herein unless specified otherwise, a feedback unit as defined by the configuration provides at least one selected from the group consisting of visual feedback, audible feedback, haptic feedback, and motion feedback when the first input is received by the touchscreen.

In a twelfth aspect of the present disclosure, which may be combined with any other aspect listed herein unless specified otherwise, the touch screen is configured to receive a third input from a user, the lower protrusion is configured to receive a fourth input from the user, and the CPU is configured to receive the third and a fourth inputs as defined by an updated configuration, and the touch screen is configured to display a second display as defined by the updated configuration in response to the third input from the user.

In a thirteenth aspect of the present disclosure, which may be combined with any other aspect listed herein unless specified otherwise, the touch screen is configured to display a second display in response to the first input as defined by the configuration.

In a fourteenth aspect of the present disclosure, which may be combined with any other aspect listed herein unless specified otherwise, the touch screen is configured to display the first display prior to receiving the first input.

In a fifteenth aspect of the present disclosure, which may be combined with any other aspect listed herein unless specified otherwise, the first input is one selected from the group consisting of a press, a scroll, a multi-finger gesture, a slide, a toggle, a rotation and a swipe.

In a sixteenth aspect of the present disclosure, which may be combined with any other aspect listed herein unless specified otherwise, a method includes configuring an encoder according to a first user input configuration, the first user input configuration defining a first gesture; receiving a first user input through the first defined gesture; communicating the first user input to a CPU according to the first user input configuration; configuring the encoder according to a second user input configuration, the second user input configuration defining a second gesture; receiving a second user input through the second defined gesture; and communicating the second user input to the CPU according to the second user input configuration.

In a seventeenth aspect of the present disclosure, which may be combined with any other aspect listed herein unless specified otherwise, the method further includes receiving the first user input through a touch screen.

In an eighteenth aspect of the present disclosure, which may be combined with any other aspect listed herein unless specified otherwise, the method further includes receiving the second user input through the touch screen.

In a nineteenth aspect of the present disclosure, which may be combined with any other aspect listed herein unless specified otherwise, the method further includes providing feedback in response to the first user input, the feedback provided by a feedback unit, wherein the feedback unit is configured by the first user input configuration to provide at least one selected from the group of visual feedback, audible feedback, haptic feedback, and motion feedback, the feedback provided when the first user input is received by the touch screen.

In a twentieth aspect of the present disclosure, which may be combined with any other aspect listed herein unless specified otherwise, the method further includes receiving the second user input through a scroll wheel.

In a twenty-first aspect of the present disclosure, which may be combined with any other aspect listed herein unless specified otherwise, the method further includes providing a replacement encoder; configuring the replacement encoder according to the first user input configuration; receiving a third user input through the first defined gesture; and communicating the third user input to the CPU according to the first user input configuration.

In a twenty-second aspect of the present disclosure, which may be combined with any other aspect listed herein unless specified otherwise, a system includes a panel configured to receive a first input from a user, the panel including a plurality of input areas, the plurality of input areas including a first user input area; the panel including a CPU and a memory device; and a portable computing device including a configurator, the portable computing device configured to communicate with the CPU. The panel is configured to receive the first input from the user based on a user contact in the first user input area, the first user input area electrically defined by the configurator and physically defined by the panel, wherein the panel communicates the first input to the CPU based on the panel configuration defined by the configurator.

In a twenty-third aspect of the present disclosure, which may be combined with any other aspect listed herein unless specified otherwise, the first user input area includes a form selected from the group consisting of a switch, a trackpad, a button, a swipe, a scroll wheel, a slider, a rotary button, and combinations thereof.

In a twenty-fourth aspect of the present disclosure, which may be combined with any other aspect listed herein unless specified otherwise, the first user input area corresponds to a panel design feature.

In a twenty-fifth aspect of the present disclosure, which may be combined with any other aspect listed herein unless specified otherwise, the panel design feature includes a design formed from a conductive ink.

In a twenty-sixth aspect of the present disclosure, which may be combined with any other aspect listed herein unless specified otherwise, the plurality of input areas further includes a second user input area.

In a twenty-seventh aspect of the present disclosure, which may be combined with any other aspect listed herein unless specified otherwise, the first user input area and the second user input area receive the first input and a second input, respectively.

In a twenty-eighth aspect of the present disclosure, which may be combined with any other aspect listed herein unless specified otherwise, the system further includes a feedback unit, the feedback unit is configurable by the configurator to provide a feedback selected from the group consisting of visual feedback, audible feedback, haptic feedback, motion feedback, and combinations thereof, the feedback provided based on the first input from the user.

In a twenty-ninth aspect of the present disclosure, which may be combined with any other aspect listed herein unless specified otherwise, the panel is configured to receive an updated panel configuration defined by the configurator wherein the panel is further configured to communicate a second input to the CPU based on the updated panel configuration defined by the configurator.

In a thirtieth aspect of the present disclosure, which may be combined with any other aspect listed herein unless specified otherwise, a system includes a panel configured to receive a first and a second input from a user, the panel including a plurality of input areas, the plurality of input areas including a first user input area and a second user input area, the panel further including a CPU and a memory device; and a portable computing device including a configurator, the portable computing device configured to communicate with the CPU. The panel is configured to receive the first input from the user based on a first user contact with the first user input area and according to a first panel configuration electrically defined by the configurator and physically defined by the panel. The panel communicates the first input from the user to the CPU based on the first panel configuration electrically defined by the configurator, and the panel is configured to receive the second input from the user based on a second user contact with the second user input area and according to a second panel configuration electrically defined by the configurator and physically defined by the panel. The panel communicates the second input from the user to the CPU based on the second panel configuration electrically defined by the configurator.

In a thirty-first aspect of the present disclosure, which may be combined with any other aspect listed herein unless specified otherwise, the first and the second inputs from the user are received at the first user input area.

In a thirty-second aspect of the present disclosure, which may be combined with any other aspect listed herein unless specified otherwise, the first input from the user is a slide, and the second input from the user is a toggle.

In a thirty-third aspect of the present disclosure, which may be combined with any other aspect listed herein unless specified otherwise, the first input from the user is the same as the second input from the user, and the CPU correlates the first input from the user to a first value based on the first panel configuration and the second input from the user to a second value based on the second panel configuration.

In a thirty-fourth aspect of the present disclosure, which may be combined with any other aspect listed herein unless specified otherwise, the system further includes a feedback unit wherein the feedback unit is configurable by the configurator to provide a feedback selected from the group consisting of visual feedback, audible feedback, haptic feedback, motion feedback, and combinations thereof, the feedback provided based on the first input from the user.

In a thirty-fifth aspect of the present disclosure, which may be combined with any other aspect listed herein unless specified otherwise, the panel further includes a capacitive user input device from the group consisting of a switch, a scroll wheel, a button, a slide, a toggle, and combinations thereof, the capacitive user input device configured to communicate with the CPU.

In a thirty-sixth aspect of the present disclosure, which may be combined with any other aspect listed herein unless specified otherwise, the panel further includes a pressure sense input device from the group consisting of a switch, a scroll wheel, a button, a slide, a toggle, and combinations thereof, the pressure sense user input device configured to communicate with the CPU.

In a thirty-seventh aspect of the present disclosure, which may be combined with any other aspect listed herein unless specified otherwise, a method includes receiving a first user input configuration file with a first user input configuration; configuring a panel electrically according to the first user input configuration, the first user input configuration including a first user input area; receiving a first user input at the first user input area based on a user contact with the first user input area; communicating the first user input to a CPU based on the first user input configuration; receiving a second user input configuration file with a second user input configuration; configuring the panel electrically according to the second user input configuration, the second user input configuration including a second user input area; receiving a second user input at the second user input area based on a user contact with the second user input area; and communicating the second user input to the CPU based on the second user input configuration.

In a thirty-eighth aspect of the present disclosure, which may be combined with any other aspect listed herein unless specified otherwise, the first user input area is the same as the second user input area.

In a thirty-ninth aspect of the present disclosure, which may be combined with any other aspect listed herein unless specified otherwise, the method further includes configuring a feedback unit to provide a feedback selected from the group consisting of visual feedback, audible feedback, haptic feedback, motion feedback, and combinations thereof; and providing the feedback in response to the first user input or the second user input.

In a fortieth aspect of the present disclosure, which may be combined with any other aspect listed herein unless specified otherwise, the method further includes providing a replacement panel; configuring the replacement panel electrically according to the first user input configuration; receiving a third user input at the first user input area; and communicating the third user input to the CPU based on the first user input configuration.

In a forty-first aspect of the present disclosure, which may be combined with any other aspect listed herein unless specified otherwise, the first user input area includes a raised or a depressed portion of the panel.

In a forty-second aspect of the present disclosure, which may be combined with any other aspect listed herein unless specified otherwise, the user contact with the first user input area is a multi-finger gesture input.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Detailed embodiments of devices and methods are disclosed herein. However, it is to be understood that the disclosed embodiments are merely exemplary of the devices and methods, which may be embodied in various forms. Therefore, specific functional details disclosed herein are not to be interpreted as limiting, but merely as a basis for the claims as a representative example for teaching one skilled in the art to variously employ the present disclosure.

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number. All numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

The present disclosure relates to a touch encoder, a touch panel, and an integrated development environment that, in various embodiments, are configurable for many different applications.

Figure 1:
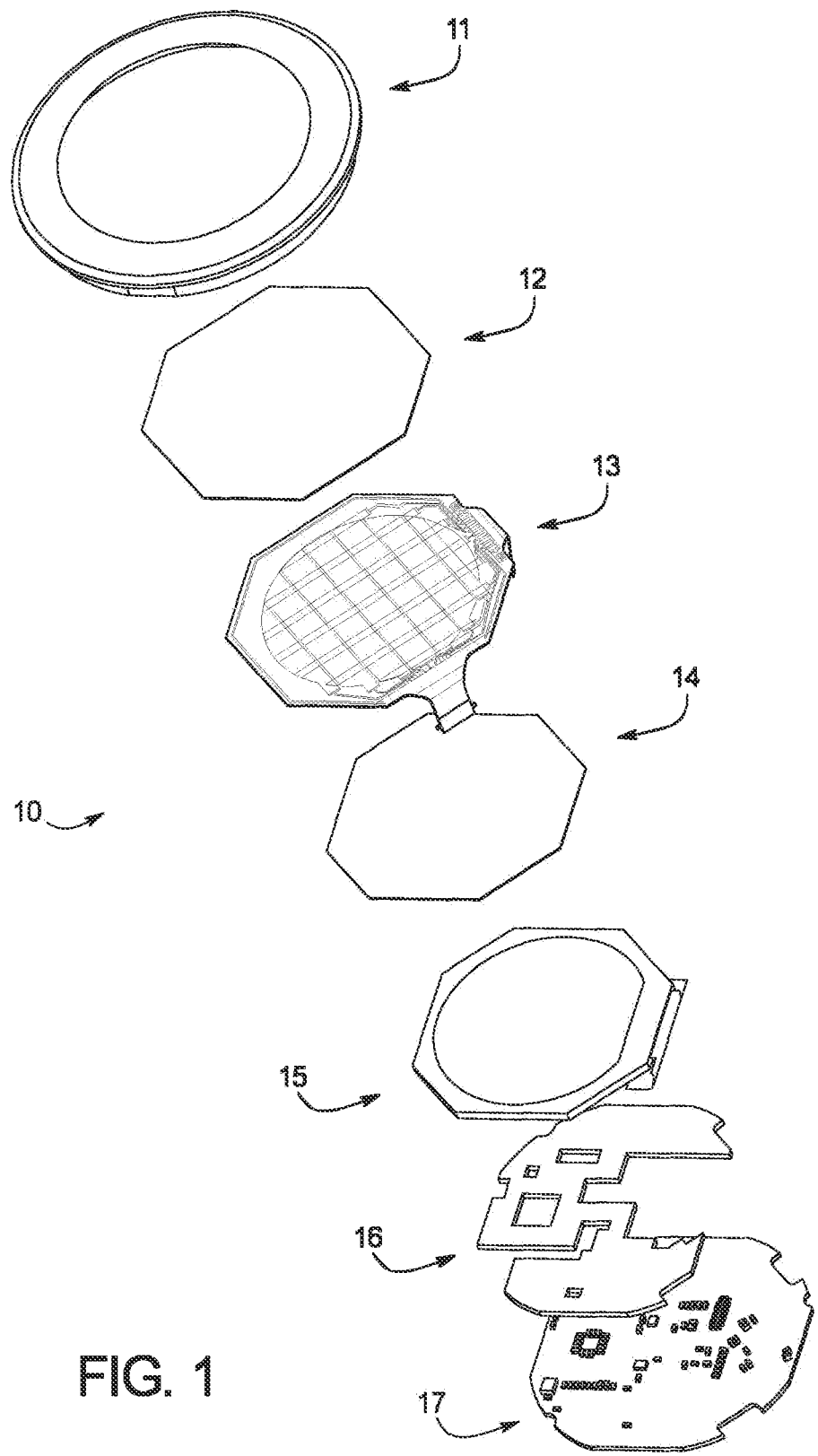
FIG. 1 illustrates an upper assembly of an encoder according to the present disclosure.

FIG. 1 generally illustrates an upper assembly 10 of an encoder. FIG. 1 is an assembly view of components that, when assembled, are an example embodiment of the upper assembly 10. The upper assembly 10 shown herein includes a lens 11, outer Optical Clear Adhesive ("OCA") film 12, touch screen 13, inner OCA film 14, display 15, gasket 16, and PC board 17. Generally, the components of the upper assembly 10 are assembled in an order shown in FIG. 1, with the lens 11 being placed on a top, outward facing direction and the PC board 17 being placed at a most distal point from the lens 11. All of the components of the upper assembly 10 may be placed and assembled along a centerline of substantially all of the substantially circular components of the upper assembly 10. The components of the upper assembly 10 may be glued together with a resin and/or epoxy, and/or may be fastened together with fasteners. Example fasteners include but are not limited to screws, bolts, nuts, clips, retainers and the like.

The lens 11 of the upper assembly 10 may be a transparent material that comprises the upper, user facing, portion of the encoder. In an embodiment, the lens 11 is clear to allow for the user to see the display 15 located underneath the lens 11. The lens 11 may be manufactured from a glass, resin, and/or polymer that is transparent, but also substantially wear and impact resistant. As the lens 11 is the outermost structure of the encoder (as compared to a mounting structure) there may be a need for the lens 11 to be durable. Wear on the encoder may result from the combination of regular intended use as well as accidental impacts with other objects in the environment in which the encoder is being used. Ideally, the lens 11 is manufactured from a single piece to as not to delaminate with normal use. The lens 11 may be temperature resistant to reduce the chance that the encoder is subjected to warm or cold thermal shock.

The outer and inner OCA films 12 and 14 of the upper assembly 10 may be provided as an adhesive to affix various components of the upper assembly 10 together. For example, as shown in FIG. 1, the upper OCA film 12 is used to affix the lens 11 to the touch screen 13 and the lower OCA film 14 is used to affix the touch screen 13 to the display 15. OCA films: may be transparent to allow a user to see through the OCA films to the other components below the OCA films; may offer light transmission back through the OCA films; and may offer adhesion to a number of different surfaces. However, an upper assembly 10 may be assembled without the use of the outer OCA films 12 and/or 14, and instead may be affixed using other methods or devices.

The touch screen 13 of the upper assembly 10 is provided as a way for a user to interact with the encoder, and for the encoder to receive inputs from the user. The touch screen 13 may be a resistive touch screen, capacitive touch screen, surface acoustic wave touch screen, optical imaging touch screen, infrared touch screen, and/or an acoustic pulse recognition touch screen. The type of touch screen may be selected based on the environment in which the encoder is to be used. For example, some work environments may require the use of gloves. In such an environment, a capacitive touch screen may not be as ideal as an acoustic pulse recognition touch screen because capacitive touch screen may only work with a finger or special stylust, while an acoustic pulse recognition touch screen may work with a gloved hand. A touch screen type may also be selected based on clarity and/or power requirements. A touch screen type may also be selected to be waterproof. The touch screen 13 may be able to detect ten different simultaneous touches. The transmission rate of communications to and from the touch screen 13 may be about 20 ms. The touch screen 13 may be able to transmit up to about 1 Mbps of data to the PC board 17.

The display 15 of the upper assembly 10 is provided as a way for the encoder to provide information to the user in a visually recognizable form. The display 15 may be a liquid crystal display ("LCD"), a light emitting diode display ("LED"), and/or another type of display. Further, the display 15 may be a subtype of a display, for example the screen may be a thin-film transistor LCD ("TFT-LCD"), an in-plane switching LCD display ("IPS-LCD"), an organic LED display ("OLED"), and/or an active-matrix OLED display ("AMOLED"). The display 15 may be configured to display color, back and white only, or any other spectrum of color. The type of display used in the display 15 may be selected based on power requirements, operation requirements, temperature requirements, and/or other requirements. The display 15 may be a high resolution display, for example a resolution of about 240 pixels per square inch. The display may be about 4.3 inches in diameter. The display 15 may be powered by about a 5 volt power source within about 1% and with about a 50 my ripple.

The PC board 17 of the upper assembly 10 is the bottom-most portion of the upper assembly 10 in an orientation where the lens 11 is the top-most portion of the upper assembly 10. The PC board 17 may be configured to communicate information from a processor to the touch screen 13 and the display 15, and from the screen 13 and display 15 back to the processor. Because the layout of the PC board 17 may be non-uniform and may be delicate, a gasket 16 may be provided to space the PC board 17 from the display 15 and/or other components of the upper assembly 10 so that the PC board 17 is securely affixed to the display 15 and/or other components of the upper assembly 10.

The PC board 17 in various embodiments may generate signals in response to signals received from the touch screen 13. The signals generated may indicate one or more touches, swipes, scrolls, presses, holds, gestures, and/or scans on the touch screen 13. The signals generated may be communicated to a CPU which is in communication with embodiments of the encoder. Furthermore, the signals generated by the PC board 17 and communicated to the CPU may be modified by an input method editor in an integrated development environment.

In an embodiment, the upper assembly 10 comprises an upper assembly without a display. In such an embodiment, physical buttons are substituted for the touch screen 13 and the display 15. For example, the upper assembly 10 may comprise two buttons, an up button and a down button, to use for increasing or decreasing a selected value. In other embodiments, more or fewer buttons may be used. Lighting, LEDs, backlighting, and icons and/or artwork may be incorporated into the upper assembly 10 without a display. The icons and/or artwork may be backlit. In an embodiment, the upper assembly 10 is about 6 mm thick and about 25 mm in diameter. In another embodiment, the upper assembly 10 is about 50 mm in diameter.

Figure 2:
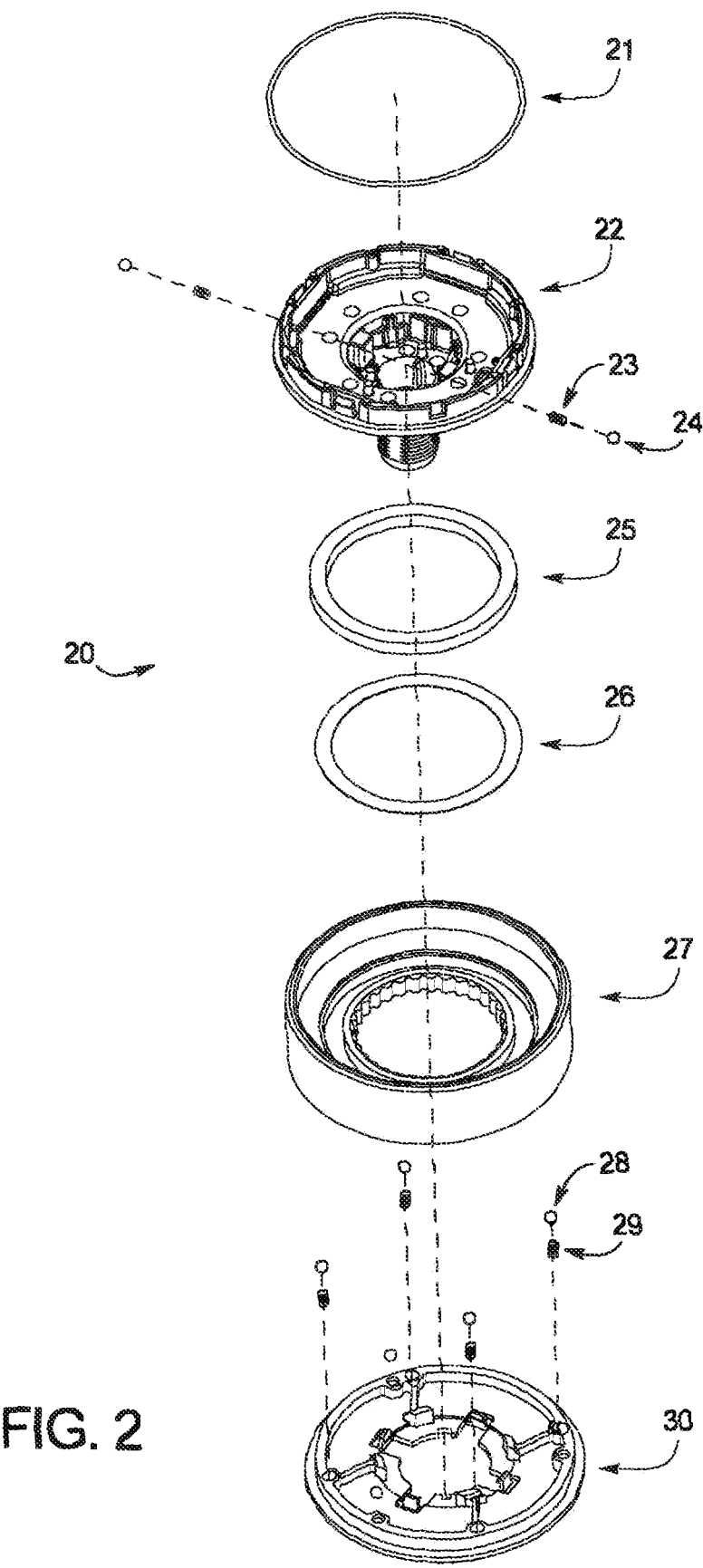
FIG. 2 illustrates a lower assembly of an encoder according to the present disclosure.

FIG. 2 generally illustrates an assembly view of a lower assembly 20 of an encoder. The lower assembly 20 connects to the upper assembly 10 of the encoder at the main housing 22. The main housing 22 may snap, screw in, and/or otherwise be fastened to the upper assembly 20. An o-ring 21 may sit between the main housing 22 and the upper assembly 10 to achieve a tight, non-slip seal between the main housing 22 and the upper assembly 10. The main housing 22 shown in FIG. 2 comprises an upper, substantially planar portion and a lower, substantially cylindrical protrusion. The upper, substantially planar portion may be configured to engage with the upper assembly 10. The lower, substantially cylindrical protrusion may be configured to receive a knob 27 such that the knob 27 may be rotated about the lower, substantially cylindrical protrusion.

A magnet 25 and a magnet adhesive 26 may be configured to sit between the main housing 22 and the knob 27. The magnet adhesive 26 may affix the magnet 25 to the knob 27. In an embodiment, the magnet adhesive 26 is tape. In an embodiment, the magnet adhesive 26 is not present, and the magnet 25 snaps into the knob 27 using snaps and/or other fasteners. When the magnet 25 is affixed to the knob 27, the magnet 25 may rotate with the knob 27. For example, when the knob 27 is rotated, for example by a user, the rotating of the knob 27 also rotates the magnet 25.

As shown in FIG. 2, a detent ball 24 and detent spring 23 may be configured to be placed between the main housing 22 and the knob 27. In an embodiment where the knob 27 is configured to rotate about the lower, substantially cylindrical protrusion of the main housing 22, the knob 27 may be configured to slidably contact the detent ball 24 such that the knob 27 can rotate smoothly about the lower, substantially cylindrical protrusion. In other embodiments, ridges may be placed around an inner perimeter of the knob 27 that comprises a contact area with the detent ball 24. As the detent ball 24 rolls across the ridges, the detent ball 24 passing over the ridges can provide the user tactile and/or auditory feedback as to the rotational movement of the knob 27. A detent spring 23 may be configured between the detent ball 24 and the main housing 22. The detent spring 23 can function to bias the detent ball 24 (and therefore, the knob 27) in a radially outward direction from a center vertical axis of the encoder.

In an embodiment, several detent balls 24 and detent springs 23 may be placed circumferentially about the lower, substantially cylindrical protrusion of the main housing 22. For example, four detent ball 24 and detent spring 23 groups may be placed 90 degrees apart about the circumference of the lower, substantially cylindrical protrusion of the main housing 22. In other embodiments, more or fewer detent balls 24 and detent spring 23 groups may be used, which may be spaced uniformly or non-uniformly about the circumference of the lower, substantially cylindrical protrusion of the main housing 22.

A rear cover 30 of the lower assembly 20 may be affixed below the knob 27 as viewed from the main housing 22 and may be configured to attach to the lower, substantially cylindrical, protrusion of the main housing 22. The rear cover 30 may be manufactured from a hard plastic, metal, and/or other sufficiently strong material to accept user inputs on the knob 27 without cracking, breaking, and/or disadvantageously deforming. When the encoder is assembled according to the embodiment shown in FIG. 2 the knob 27 sits between the rear cover 30 and the upper, substantially planar portion of the main housing 22.

As shown in FIG. 2, a support ball 28 and a support spring 29 may be configured to be placed between the rear cover 30 and the knob 27. In an embodiment where the knob 27 is configured to rotate about the lower, substantially cylindrical protrusion of the main housing 22, the knob 27 may be configured to slidably contact the support ball 28 such that the knob 27 can rotate smoothly above the rear cover 30. A lubricant may be added to the surface of the knob 27 where the support ball 28 contacts the knob 27. In other embodiments, ridges may be placed around a circumference of the knob 27 that comprises a contact area with the support ball 28. As the support ball 28 rolls across the ridges, the support ball 28 passing over the ridges can provide tactile feedback to the user as to the rotational movement of the knob 27.

A support spring 29 may be located between the support ball 28 and the rear housing 30. The support spring 29 can bias the support ball 28 (and therefore, the knob 27) in a vertical direction (i.e., toward the upper, substantially planar portion of the main housing 22).

In an embodiment, the support spring(s) 29 may require calibration to ensure that the encoder assembly, which rests upon the support spring(s) 29 when no user input is applied to the encoder, relays an accurate position deflection when a user input is applied to the knob 27. As such, a spring compression tolerance (how the spring compresses to a given load), a spring release tolerance (how the spring releases when a load is removed from the spring), a spring rebound calibration (how the spring re-compresses after extending past the resting spring point of the spring when a load is removed from the spring), and a release angle (a defined vector of the spring force to account for a spring not applying spring force in exactly a single vector over the entire travel length of the spring) of the spring may all be evaluated when the support spring(s) 29 are calibrated.

In an embodiment, the calibration of the zero point of the support spring(s) 29 is performed automatically and at predetermined or preset intervals to ensure that there is no drift of the zero position over time and/or with use of the encoder. In an embodiment, the calibration may be performed by a component of the encoder and/or by the integrated development environment. For example, a method of use of the touch encoder may comprise calibrating the touch encoder prior to use of the touch encoder. A method of use may comprise using a touch encoder for a first period of time, for example about a year, according to any of the methods disclosed herein. When the first period of time has passed, the encoder may indicate to the user that the encoder requires calibration. An integrated development environment may also or alternatively indicate to the user that an updated calibration is required. A user may further edit calibration frequency and/or intervals in the integrated development environment. In an embodiment, an interval between calibrations may be a period of time, for example about six months, about one year, and/or about two years. In an embodiment, an interval between calibrations may be an operating time of the encoder, for example about 500, about 1,000, and/or about 5,000 hours. In some embodiments where greater precision of the spring forces is needed, calibrations may occur more frequently, such as about every 50, about every 5 or about every 1 hours.

In an embodiment, several support balls 28 and support springs 29 may be placed circumferentially about rear cover 30. For example, four support ball 28 and support spring 29 groups may be placed at 90 degree intervals about the circumference of the rear cover 30. In other embodiments, more or fewer support ball 28 and support spring 29 groups may be used, which may be spaced uniformly or non-uniformly about the circumference of the rear cover 30.

The knob 27 may be grasped by a user and rotated about the lower, substantially cylindrical protrusion of the main housing 22. Accordingly, the knob 27 may be manufactured from a durable material to facilitate minimal wear with frequent and repeated use. The knob 27 may be manufactured from a plastic, a metal, a polymer, an organic material, and/or other materials. The outer circumference of the knob 27 may be textured (e.g., crosshatched, ribbed, etc.) or made from a different material as the knob 27 to reduce slippage in a user's hand when the knob 27 is grasped and turned. For example, a textured rubber strip may be fitted around the outer circumference of the knob 27 to reduce user slippage. The knob 27 may also be painted or be manufactured in a specific color depending on the application for the encoder.

The lower, substantially cylindrical protrusion of the main housing 22 may comprise mounting hardware for the encoder. In some embodiments, the lower, substantially cylindrical protrusion may rigidly attach the encoder to another body, for example an encoder base. In other embodiments, the lower protrusion may removably attach the encoder to another body. In yet other embodiments, the lower protrusion may allow a user to move the encoder relative to a base and/or other body. The encoder in various embodiments may be moved rotationally, angularly, in a single plane, and/or in multiple planes. In an embodiment, the lower protrusion may contain sensors such that the encoder's movement relative to a fixed point may be communicated to a CPU.

Figure 3:
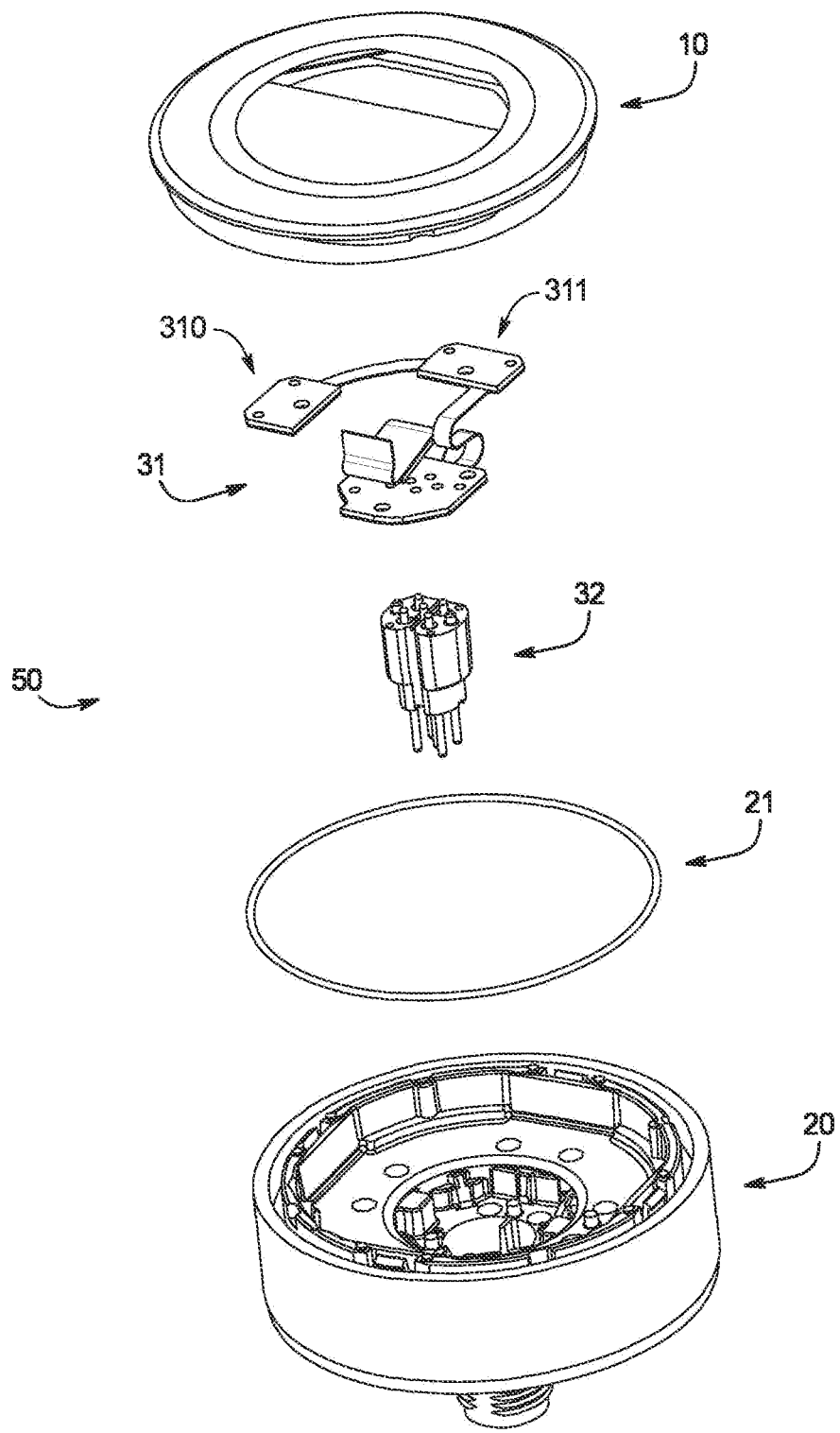
FIG. 3 illustrates an assembly view of an upper assembly of an encoder and a lower assembly of an encoder according to the present disclosure.

FIG. 3 shows the upper assembly 10 and the lower assembly 20 in an assembly view, positioned along a common center axis. When assembled, the upper assembly 10 may be affixed to the lower assembly 20 along the common center axis to form an encoder 50. As shown in FIG. 2, the o-ring 21 can sit between the main housing 22 and the upper assembly 10 to achieve a tight, non-slip and/or waterproof seal between the main housing 22 and the upper assembly 10.

Also shown in FIG. 3 is a flex assembly 31. The flex assembly 31 may connect to the main housing 22 of the lower assembly 20, such that the flex assembly 31 is fixed relative to the rotation of the knob 27. The flex assembly 31 may connect to the PC board 17 of the upper assembly 10. The flex assembly may communicate information, for example user inputs from the upper assembly 10, which has been communicated to the PC board 17, to a connector 32. The flex assembly 31 may additionally or alternatively connect to the PC board 17 to bring power and signal data to the upper assembly 10.

A connector 32 is shown in FIG. 3. The connector 32 is configured to connect to the flex assembly 31. The connector 32 may be a 5-pin connector. In an embodiment, connector 32 is a 12 mm, 5-pin connector. In an embodiment, the connector 32 is soldered to the flex assembly 31. Connector 32 may also be a video graphics array connector ("VGA"), digital visual interface connector ("DVI"), PS/2 port, network cable connector, phone connector, universal serial bus connector ("USB"), high definition multimedia interface connector ("HDMI"), other known connector, and/or a wireless transmitter receiver without any hard connection. The encoder 50 may communicate through any of various communication protocols, including USB, controller area network ("CAN") protocol (J1939), Modbus, and/or Encoder+ protocol. In an embodiment, the flex assembly 31 and/or the connector 32 is configured with filtering and conditioning hardware. The filtering and conditioning hardware may, for example, protect the encoder from circuit overload conditions such as power spikes.

The flex assembly 31 may be configured with hall effect sensors 310 and 311. The hall effect sensors 310 and 311 may be placed in sensing communication with the magnet 25. The magnet 25 may be configured on the knob 27 such that the magnet 25 rotates on the knob 27 relative to the hall effect sensors 310 and 311. The rotation of the magnet 25 may cause a change in a magnetic field associated with the magnet 25 that may be detected by the hall effect sensors 310 and 311. In such a configuration, a rotation of the knob 27 may be detected by the hall effect sensors 310 and 311. The rotation detected by the hall effect sensors 310 and 311 may be communicated to the flex assembly 31, the PC board 17, a CPU, and/or the connector 32. In an embodiment, there may be more or less hall effect sensors, for example, a single hall effect sensor of five hall effect sensors may be integrated on the flex assembly 31.

In an embodiment, the hall effect sensors 310 and 311 may require calibration to ensure that detent feedback on the knob 27, which provides detent feedback when the knob 27 is rotated by a user, relays accurate detent feedback when a user input is applied to the knob 27. As such, the timing and/or intensity of the detent feedback may be correlated with the user input applied to the knob 27 by correlating input received by the hall effect sensors 310 and 311 to the detent feedback provided by the knob 27.

In an embodiment where the connector 32 is a hard-wire type connector, such as a 5-pin connector, wires connected to the connector 32 may be directed from the connector 32, and through the lower assembly 20 through a hollow central portion of the lower, substantially cylindrical protrusion of the main housing 22. The wires may then be directed to another connector, a PC board, a processor, and/or other component as required for the present use of the encoder 50.

Figure 4:
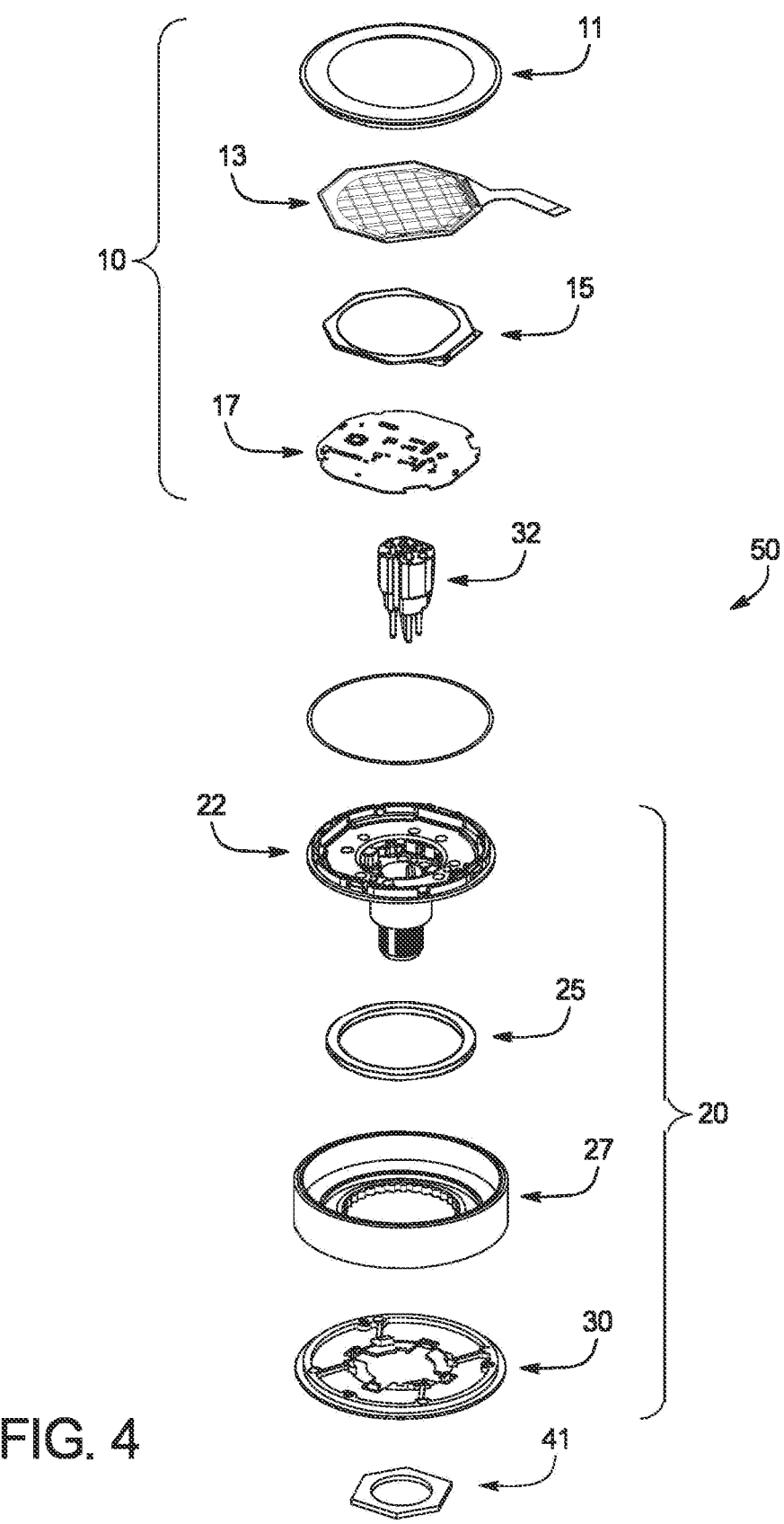
FIG. 4 illustrates an assembly view of an encoder according to the present disclosure.

FIG. 4 illustrates the encoder 50 according to the present disclosure in an assembly view. Notably, in FIG. 4 the upper assembly 10 and lower assembly 20 are partially disassembled to show how the various components of the encoder 50 can fit together. All of the components of FIG. 4 are shown along the common central axis of the components, which may be how the components of the encoder 50 are assembled. For example, the lens 11, touch screen 13, display 15, and PC board 17 of the upper assembly 10 are shown, as well as the main housing 22, magnet 25, knob 27, and rear cover 30 of the lower assembly 20. A retention ring 41 is also shown. The retention ring 41 may be configured to screw onto the lower, substantially cylindrical protrusion of the main housing 22. The retention ring 41 may affix the rear cover 30, knob 27, magnet 25, and additional components to the main housing 22. In other embodiments, these components may be affixed by, for example clipping and/or snapping into the main housing 22.

Figure 5:
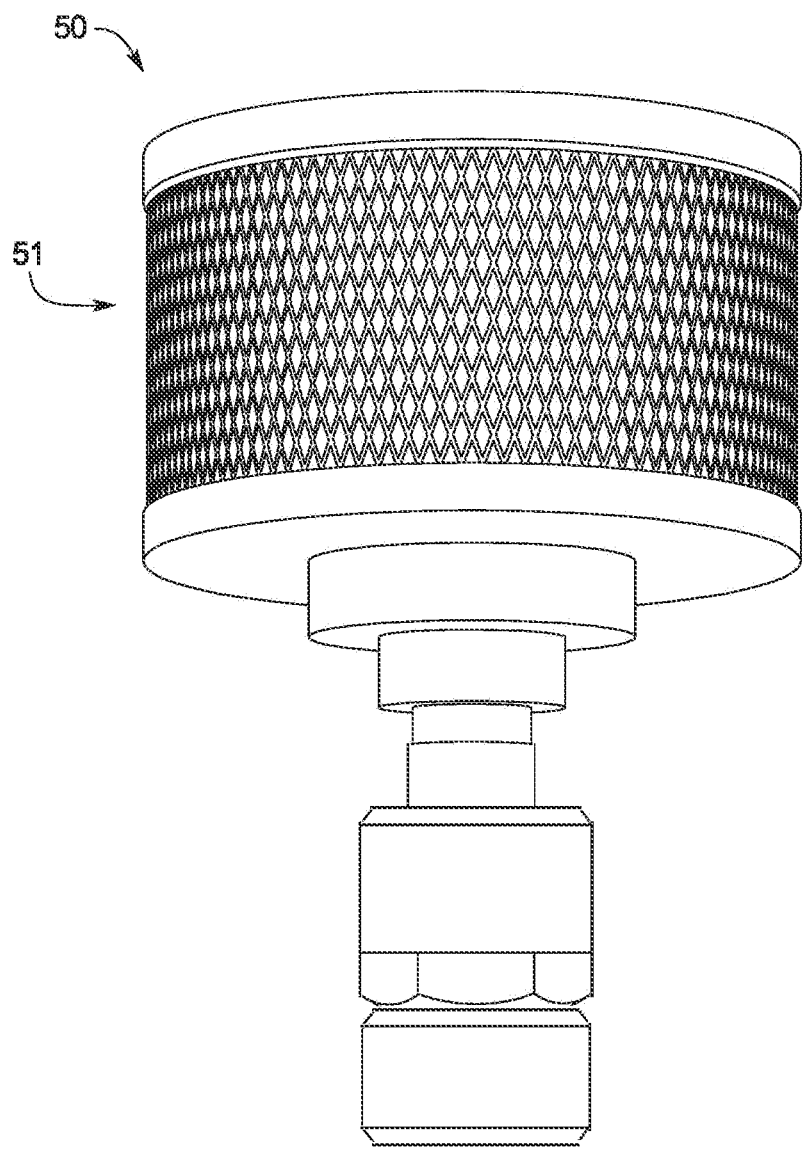
FIG. 5 illustrates an encoder according to the present disclosure.

FIG. 5 illustrates an example embodiment of the encoder 50 in an assembled configuration, and ready for installation into an application. FIG. 5 also illustrates a knob sidewall 51, which is crosshatched to provide a surface that is more easily grasped by the user. The knob sidewall 51 of the knob 27 may be grasped by a user and rotated about the lower, substantially cylindrical protrusion of the main housing 22. The knob sidewall 51 shown in FIG. 5 is manufactured from stainless steel, but may be manufacturer from other metals and/or from non-metal materials.

While the encoder 50 shown herein is cylindrical, an exemplary encoder may be of any shape needed for an encoder application. For example, an encoder body may take the shape of a square or an oval. In various embodiments, an encoder body may also comprise auditory, haptic, movement, and/or vibration media. Haptics may at least include piezoelectric actuators and/or surface transducers. Such media may be activated in response to inputs from a processor. As a result, the media may generate a response to user interaction with the touch screen 13.

Figure 6A:
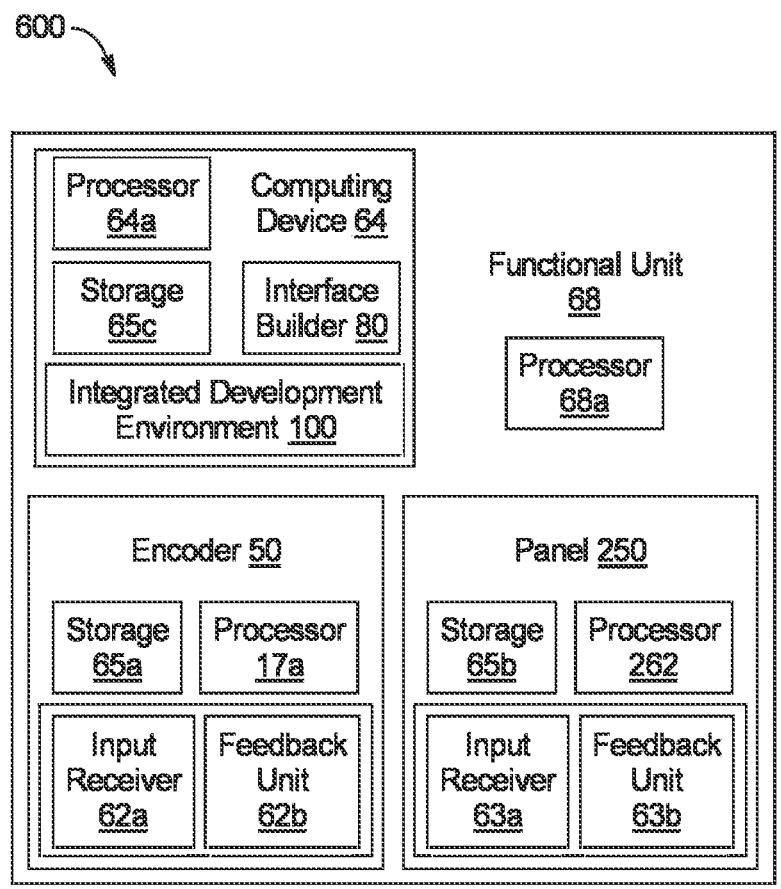
FIGS. 6a-6c illustrate block diagrams of an exemplary panel, encoder, integrated development environment and interface builder system.
Figure 6B:
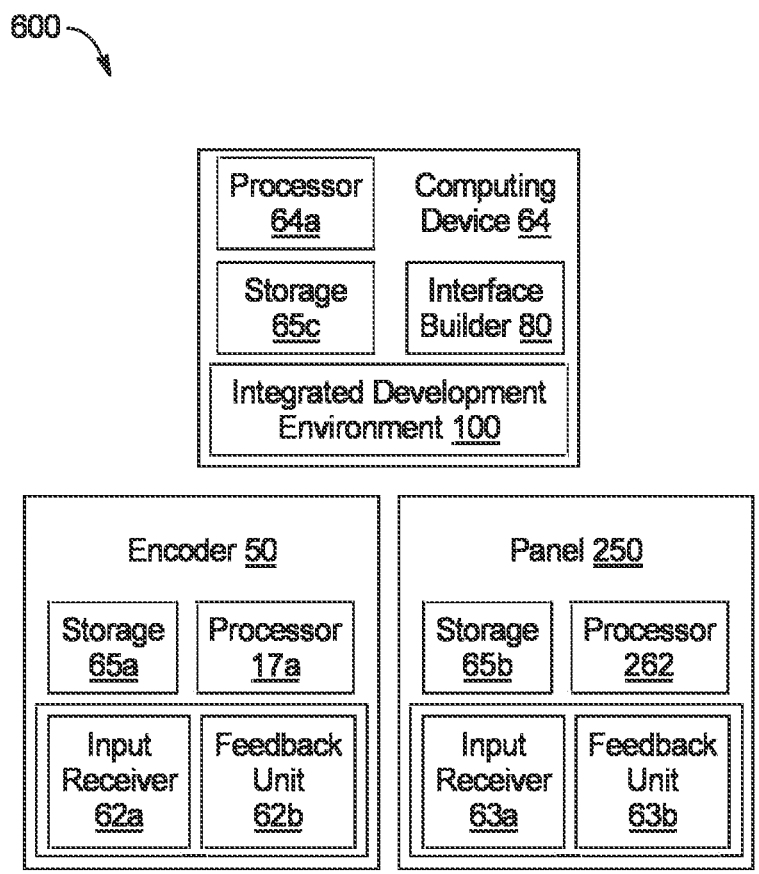
Figure 6C:
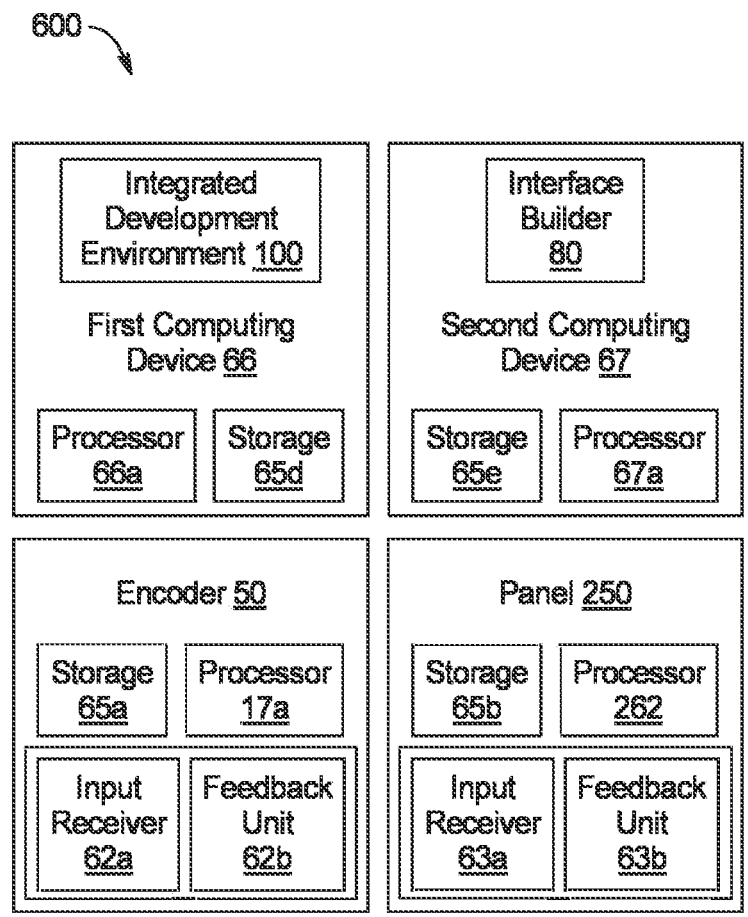

FIGS. 6a-6c illustrate several embodiments of a system environment 600, which include block diagrams of an exemplary panel, encoder, integrated development environment, and interface builder system. While several system environment 600 configurations are shown, for clarity and conciseness herein every possible permutation of the panel, encoder, integrated development environment, interface builder, processor, storage, and/or memory layout has not been shown. Accordingly, one of skill in the art would understand additional configurations of the system environment 600 not specifically shown to be implicitly disclosed herein.

In the exemplary system environment 600, the encoder 50 can be comprised of any device, transducer, software program, and/or algorithm that converts information from one format to another format. In such embodiments, the encoder 50 is designed to receive human inputs and translate the human inputs into inputs readable by a processor. The human inputs may be in the form of single or multi-touch gestures, swipes, clicks, scrolls, spins, voice commands, bio-sensors (including face, retinal, and/or fingerprint scanners), and/or any other type of gesture or command.

In an embodiment, a human input may change forms when received by the encoder 50. For example, the human input of rotating the knob 27 of the encoder 50 may be translated to a change in a magnetic field. The change in the magnetic field may be sensed by a hall effect sensor configured to vary output voltage in response to the magnetic field. The change in voltage may be communicated to a CPU.

Human inputs my be received by the encoder 50 through appropriate hardware devices such as resistive touchscreen panels, gesture recognition hardware, surface acoustic wave technology using ultrasonic waves, capacitive sensing (including surface capacitance, projected capacitance, mutual capacitance, and self-capacitance), infrared grid sensing, infrared acrylic projection, optical sensing, dispersive signal technology, and/or acoustic pulse recognition sensing. Other hardware mechanisms for receiving human inputs are contemplated by the instant disclosure.

The exemplary encoder 50 in some embodiments may have the ability to receive outputs from the processor and translate the outputs into signals that can be received by the user. Such signals may be in the form of haptics, kinesthetic communication, forces, vibrations, lights, sounds, recordings, videos, temperature, wind, and/or any other output readily received by the senses of the user.

The system environment 600 as shown in FIG. 6a may include a computing device 64 with a processor 64a, the computing device 64 configured to receive inputs from a first user. The computing device 64 may be any fixed or mobile computing device, including but not limited to cell phones, laptops, tablets, PDA's, desktop computers, personal computers, watches, or derivations thereof adapted for uses in various control systems, vehicles, machinery, or equipment. As shown in FIG. 6a, the computing device 64, the encoder 50, and the panel 250 are all integrated into a functional unit 68 which includes a processor 68a.

The computing device 64 can host an integrated development environment 100. As shown in FIG. 6b, the integrated development environment 100 may remotely store encoder 50 and/or panel 250 configurations in a storage 65c. In an embodiment, a configuration may be stored as a configuration file. Then, the stored configurations may be communicated to other networked encoders and/or panels that may be remote from the computing device 64. Stated otherwise, in an embodiment of the system environment 600 according to FIG. 6b, there may not be any functional unit 68 or processor 68a linking any of the computing device 64, the encoder 50, and the panel 250.

Thus, in various embodiments of the disclosed system, other encoders in the field can be remotely updated to reflect newly developed encoder functionality. Therefore, a newly configured encoder with a configuration that solves a particular problem may be easily adapted to other encoders in the field remotely without shipping the encoders back to the factory to be reprogrammed. In addition, the same ability to apply selected encoder configurations across a broad range of encoders in the field allows an OEM to remotely communicate with an encoder to provide software updates and/or additional functionality to the encoder 50 and/or integrated development environment 100 when such updates are desired by a user or required by an OEM.

The integrated development environment 100 may be downloaded from a cloud computing storage location. Periodically, the integrated development environment 100 may be remotely updated to increase performance, add new and/or different configurations and/or add/change functionality of the integrated development environment 100.

Generally, if the integrated development environment 100 is communicating with the encoder 50, the configuration will be communicated from the integrated development environment 100, to a processor 17a (for example, a processor configured on PC board 17, not shown), then to the encoder 50. In an embodiment, the processor 17a is integrated within the encoder 50 along with a storage 65a. If the integrated development environment 100 is communicating with the panel 250, the configuration will be communicated from the integrated development environment 100, to a processor 262, then to the panel 250. In an embodiment, the processor 262 is integrated within the panel 250 along with a storage 65b.

In an embodiment, the integrated development environment 100 can be adapted to operate a processor configured to communicate with the encoder 50, computing device linked with the encoder 50, collection of computer hardware networked to the encoder 50 via the processor 17a, and/or one or more computing units selectively communicating with the encoder 50. For example, in some embodiments the integrated development environment 100 may be configured as an application a user can operate on the user's existing phone, PC, laptop, tablet, or similar device. Conversely, the integrated development environment 100 may be configured to run on stand-alone hardware specifically designed to be used with the integrated development environment 100.

In an embodiment, an interface builder 80 may be integrated with the integrated development environment 100 to customize the encoder 50 as shown in FIGS. 6a and 6b. Optionally, the interface builder 80 may be remote from the integrated development environment 100 as shown in FIG. 6c. In FIG. 6c, a first computing device 66 may host the integrated development environment 100 and include a processor 66*a* and a storage 65*d*. A second computing device 67 may host the interface builder 80 and a processor 67*a* and a storage 65*e*. The first computing device 66 may communicate with the second computing device 67 to transmit encoder or panel configurations, components, and/or other functional or non-functional information between the first computing device 66 and the second computing device 67.

The interface builder 80 may be customized to allow the encoder 50 to have varying levels of functionality, and the functionality can be made to accommodate each specific user need. For example, when a user need is entered into the interface builder 80, the second computing device 67 with the interface builder 80 then communicates with the first computing device 66 with the integrated development environment 100 to configure the encoder 50 to correspond with the functionality the user selected in the interface builder 80. The interface builder 80 may store configurations to and retrieve desired configurations from the storage 65*e*.

The first computing device 66 with the integrated development environment 100 may communicate with the encoder 50 through the processor 17*a* or the processor 262 via a direct link and/or a remote link such as near field communication, Bluetooth®, Zigbee® connection, or any combination thereof. As a result, the integrated development environment 100 can be directly or remotely linked to the encoder 50 through the use of any fixed or mobile computing device, including but not limited to cell phones, laptops, tablets, PDA's, desktop computers, personal computers, watches, or combinations thereof adapted for uses in various control systems, vehicles, machinery, or equipment. The first computing device 66 with the integrated development environment 100 may also load a configuration onto a removable storage device such as an SD card and/or USB flash card to transfer the configuration to the encoder 50. Such removable storage may be user with or to replace the storage 65*d*.

For example, a user may desire a button to be displayed on the touch screen 13 of the encoder 50. The user may select an icon in the interface builder 80 corresponding to the desired button. The icon may be a backlit icon. The user may configure the button to perform a function assigned in the interface builder 80 using the second computing device 67. The button configuration may be saved to the storage 65*e*. The button configuration may be communicated to the first computing device 66 comprising the integrated development environment 100. The first user may now integrate the button into a configuration recalled from storage 65*d* using the integrated development environment 100 through the first computing device 66. The integrated development environment 100 may now save the updated configuration to the storage 65*d*. The user may now send the configuration to the processor 17*a* to load on the encoder 50.

The first or a second user may now interact with newly configured button of the encoder 50 using an input receiver 62*a* and a feedback unit 62*b*. In the present embodiment, the input receiver 62*a* and the feedback unit 62*b* may comprise the touch screen 13 of the encoder 50. Accordingly, the touch screen 13 may display the desired button, and the user may select the desired button (i.e. receive the input, functionally comprising the input receiver 62*a*). The user's selection of the button may then be communicated from the encoder by the processor 17*a*. When the desired button is selected by the user, the desired button may visually indicate that the button was depressed (i.e. give feedback, functionally comprising the feedback unit 62*b*).

In an embodiment, integrated development environment 100 may be configured with one or several generic user profiles. A user profile may be specific to a user or a group of users. The user profiles may be password protected, for example a user may be required to enter a password to access the user profile associated with the password. In an embodiment, a user may log in using a fingerprint scanner, retina scanner, facial recognition software, or other user input hardware and/or software.

In an embodiment, a first user profile may comprise a first configuration. The first configuration may be a preset configuration (e.g., factory set configuration). The first configuration may be a configuration as previously defined by a user. The first configuration may define button location, button type, encoder and/or panel layout, encoder and/or panel settings, user profile, haptic settings, and/or other customizable features.

In an embodiment, a second user profile may be provided. The second user profile may comprise a second configuration. The second configuration may be a preset configuration (e.g., factory set configuration). The second configuration may be a configuration as previously defined by a user. The second configuration may define button location, button type, encoder and/or panel layout, encoder and/or panel settings, user profile, haptic settings, and/or other customizable features. The first configuration may be the same as the second configuration, and may be different than the second configuration. The second configuration may comprise more, less, and/or different customization when compared to the first configuration. For example, the first user profile may allow more or less access to configurable features when compared to the second user profile. Accordingly, the customization provided by the first user profile may be different than the second user profile.

In an embodiment, a configuration may be recalled from storage 65*d* by the first user without updating the configuration from the interface builder 80. For example, a stored configuration for an encoder 50 may include a software sleep mode with a wake up pin that engages if the encoder 50 has been idle for a preset amount of time. The configuration may be recalled from storage 65*d*, and sent to the processor 17*a* to be applied to the encoder 50 without making any changes using the interface builder 80.

Figure 6D:
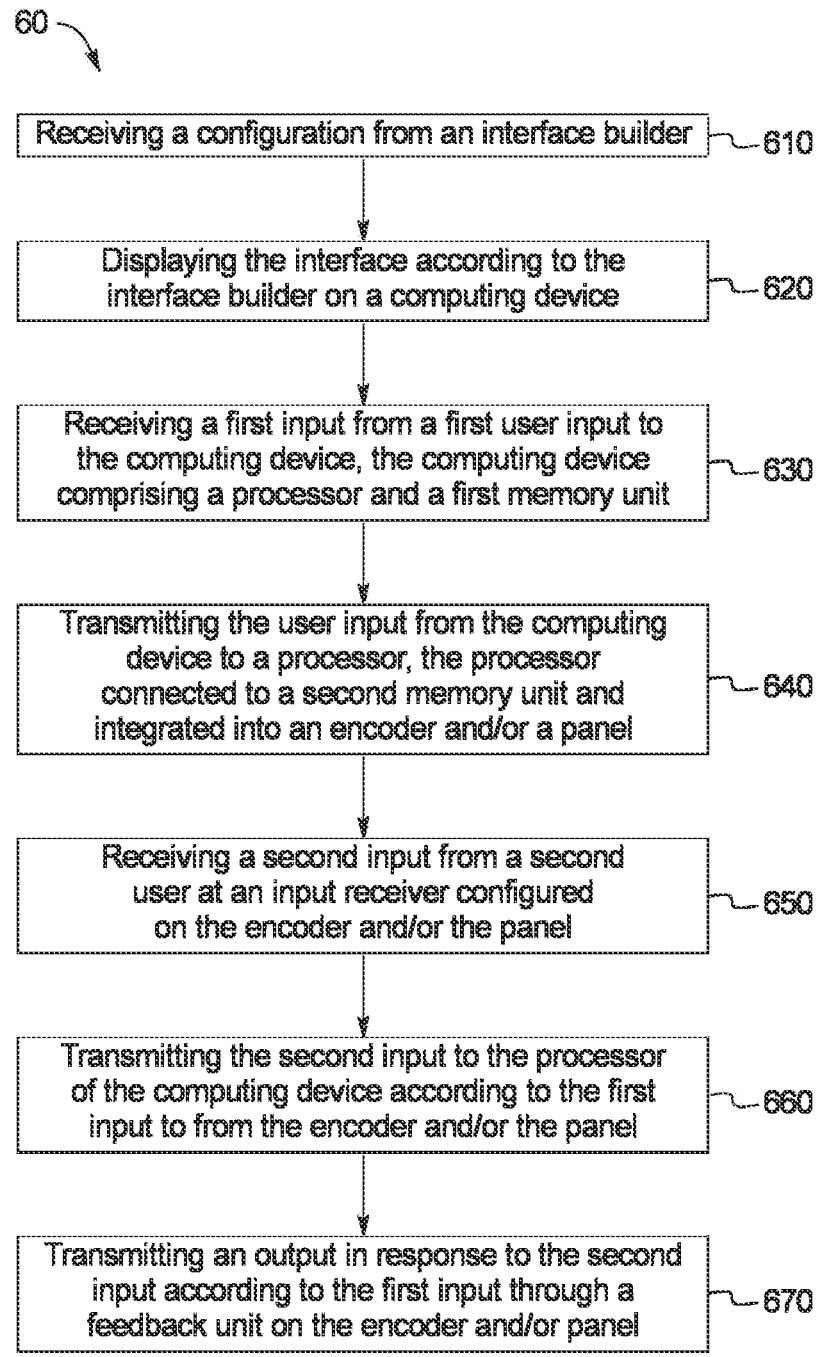
FIG. 6d illustrates a flowchart illustrating an example method of operation of an exemplary panel, encoder, integrated development environment and interface builder system.

FIG. 6*d* illustrates a flowchart illustrating an example method 60 of operation of an exemplary panel, encoder, integrated development environment and interface builder system. For example, in method step 610 a configuration may be received from an interface builder. Then, in method step 620, an interface may be displayed on a computing device according to the configuration received from the interface builder. In method step 630, a first input from a first user may be received by the computing device. The computing device may comprise a processor and a memory unit. In method step 640, the user input may be transmitted from the computing device to a processor. The processor may be connected to a second memory unit and integrated into an encoder and/or a panel.

In method step 650, the encoder and/or the panel may receive a second input optionally from a second user at an input receiver configured to operate with the encoder and/or the panel. In method step 660, the second input may be transmitted according to the configuration resultant from the first input to the processor of the computing device. In method step 670, an output in response to the second user input may be transmitted through a feedback unit on the encoder and/or the panel.

In an embodiment, the encoder 50 may provide for the following steps or interactions of the method 60: the user configuring the encoder 50 using the computing device 64, the computing device 64 configuring the encoder 50 using the integrated development environment 100, the integrated development environment 100 storing a configuration and/or retrieving a stored configuration from storage 65c, the integrated development environment 100 communicating the configuration to the processor 17a, the processor 17a operating the encoder 50 according to the configuration using at least one input receiver 62a and/or at least one feedback unit 62b, and communicating and/or receiving an input from a second user. The input receiver 62a may further communicate an input from second user applied to the encoder 50 to the processor 17a, to the integrated development environment 100, and/or to another processor for use in an encoder application.

In an embodiment, the panel 250 may provide for the following steps or interactions of the method 60: the user configuring the panel 250 using the computing device 64, the computing device 64 configuring the panel 250 using the integrated development environment 100, the integrated development environment 100 storing a configuration and/or retrieving a stored configuration from storage 65c, the integrated development environment 100 communicating the configuration to the processor 262 through the processor 68a of the functional unit 68, the processor 262 operating the panel 250 according to the configuration using at least one input receiver 63a and/or at least one feedback unit 63b, and communicating and/or receiving an input from a second user. The input receiver 63a may further communicate an input from second user applied to the panel 250 to the processor 262, to the integrated development environment 100, and/or to another processor for use in an encoder application.

In an embodiment, there is more than one input receiver 62a, input receiver 63a, feedback unit 62b and/or feedback unit 63b. In an embodiment, processor 17a and processor 262 may be integrated or be the same processor. In an embodiment, the user may be a single user or multiple users. In an embodiment, the encoder 50 may be integrated into the panel 250. Any one or combination of the storage 65a, 65b, 65c, 65d and 65e may be a single storage unit, in the cloud, and/or comprise cloud based storing. In an embodiment, the integrated development environment 100 and the interface builder 80 are the same application on the computing device 64.

Figure 7A:
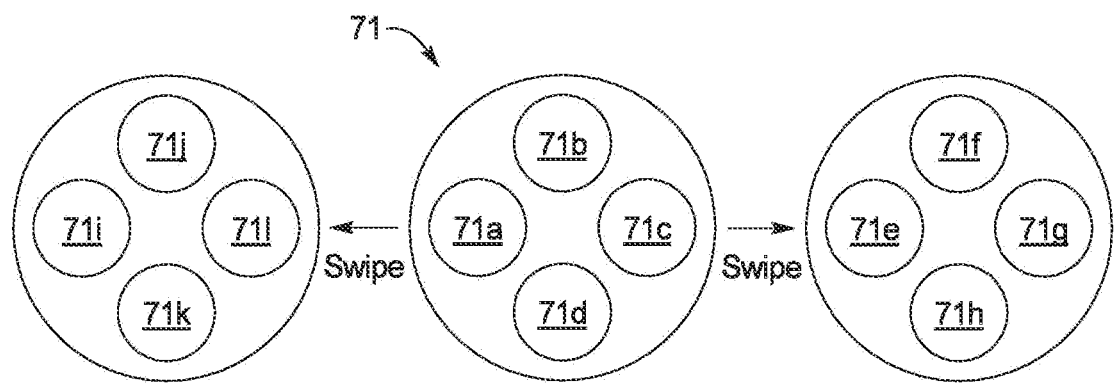
FIGS. 7a-7b illustrate an encoder display according to the present disclosure.

FIG. 7a illustrates an exemplary encoder 50 configuration that may be loaded to the encoder 50 using the integrated development environment 100. The screens shown in FIG. 7a are embodiments of an encoder display 71 and may be projected on the display 15 of the encoder 50. A user may switch between screens shown in FIG. 7a by swiping in the direction indicated in FIG. 7a. For example, a user may swipe left to move from the encoder display 71 showing icons 71a-71d to the encoder display 71 showing icons 71i-71l. A user may also swipe left to move from the encoder display 71 showing icons 71a-71d to the encoder display 71 showing icons 71e-71h. Each icon shown on encoder display 71 may be a button.

In an embodiment, when an icon, for example icon 71b, is selected, the selected icon may be moved from the icon's original position, positioned about the outer circumference of the encoder display 71, to the center of the encoder display 71. The selected icon may also be enlarged when the icon is moved to the center of the encoder display 71. When the icon is unselected, the icon may move back to the original location of the icon about the outer circumference of the encoder display 71.

Figure 7B:
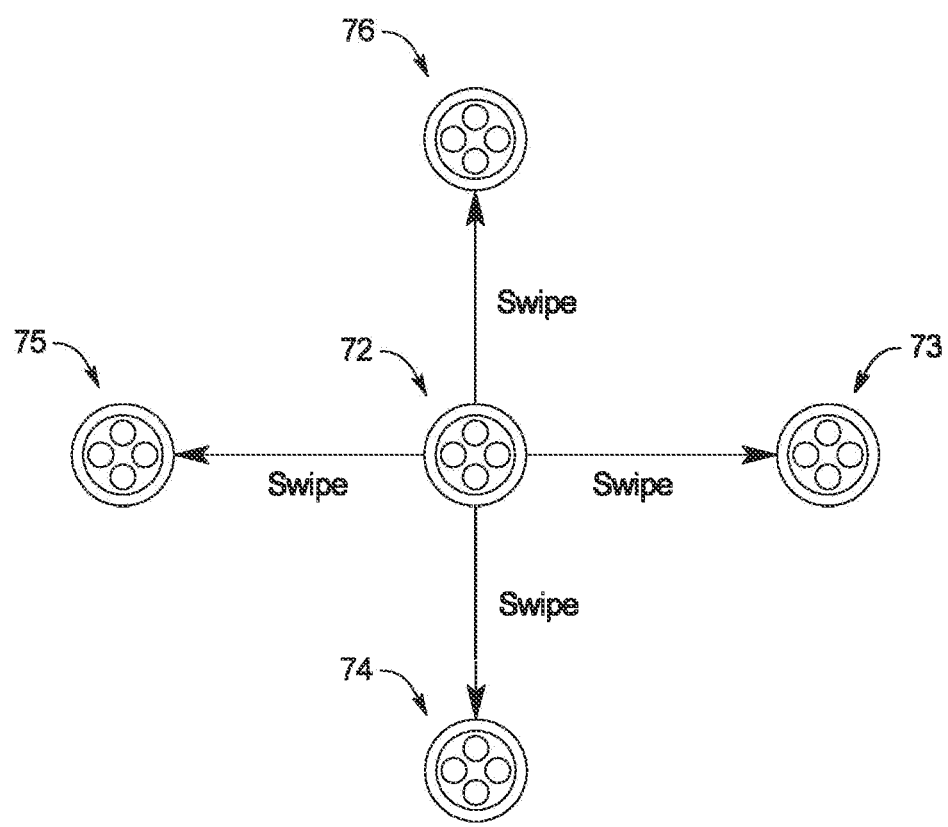

FIG. 7b illustrates an exemplary encoder 50 configuration that may be loaded to the encoder 50 using the integrated development environment 100. The screens shown in FIG. 7a may be projected on the encoder display 71 of the display 15 of the encoder 50. A user may switch between screens shown in FIG. 7a by swiping in a direction indicated in FIG. 7a. For example, from a user may swipe up to navigate from the encoder display home screen 72 to the encoder display upper screen 76, or swipe down to navigate from encoder display upper screen 76 to encoder display home screen 72. A user may also swipe left at the home screen from the encoder display home screen 72 to access the encoder display left screen 75, right to access the encoder display right screen 73, and/or down to access the encoder display lower screen 74.

In an embodiment, the period of time between the swipe input and the displaying of the newly accessed screen is about 100 milliseconds. In an embodiment, the period of time between the swipe input and the displaying of the newly accessed screen is about 50 milliseconds. In an embodiment, a turn of the knob 27 of the encoder 50 may be used to cycle between screens instead of a swipe. In an embodiment, a single touch may activate the encoder 50 prior to selecting screens, and/or a doubletap may be used to put the encoder 50 into a sleep setting. A tap and hold input may also be received by the encoder 50 in an example configuration. In an embodiment, the encoder 50 comprises a touch screen lock. In an embodiment, the encoder 50 may be able to receive voice inputs from a user.

In an embodiment, the display 33 may display a splash screen or intermediate screen between the original screen and the newly accessed screen. In an embodiment, an icon, for example icon 71a, may be selected by a user by tapping the screen. The user may use a rotation of the knob 27 to select icon 71a. The user may press, or perform a vertical depression of the encoder 50 in a substantially vertical direction, the encoder 50 to select icon 71a. In an embodiment, each icon may select a separate functionality of the encoder 50. For example, icon 71c may select a radio function, and icon 71g may be a "return to home screen" function.

Figure 8:
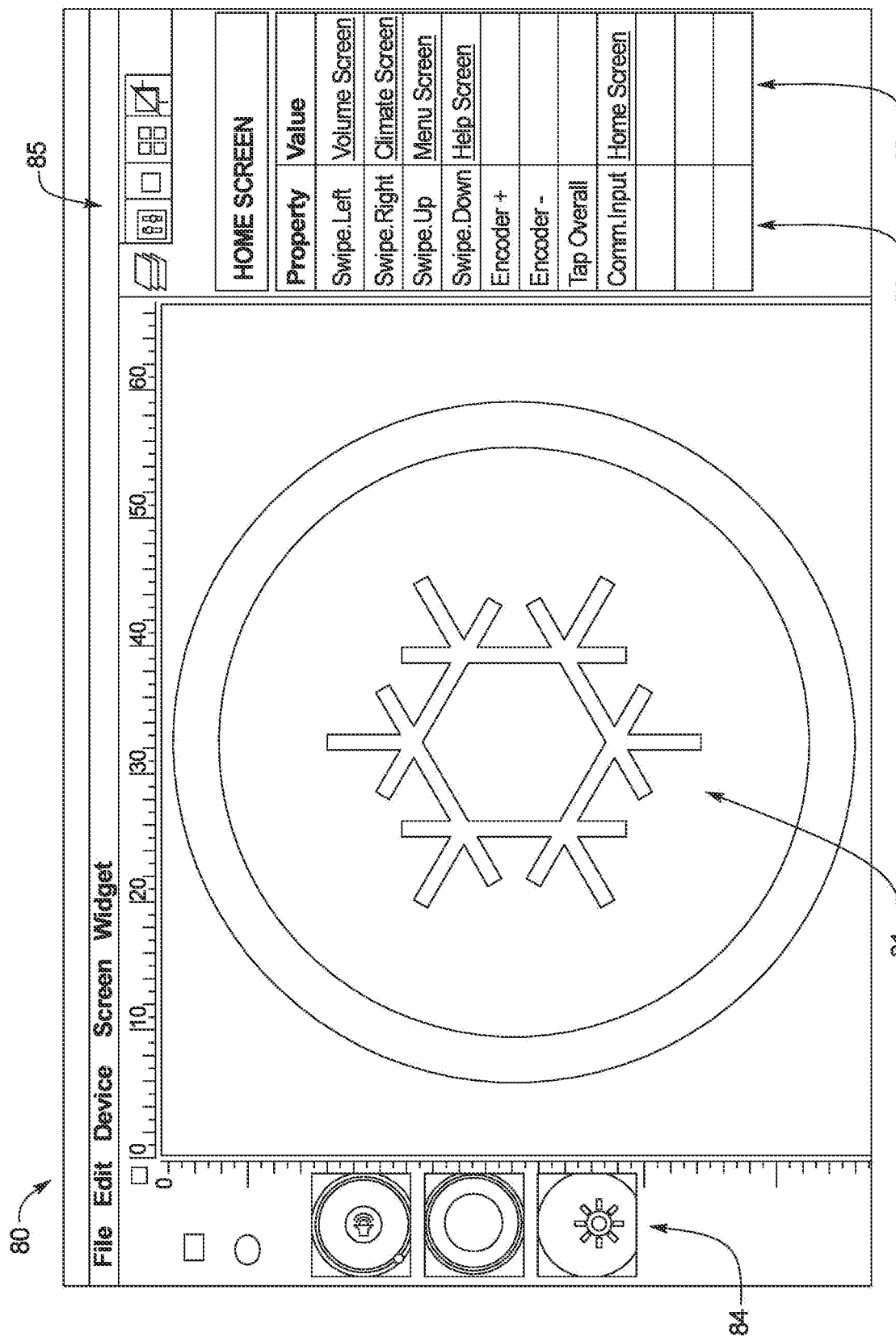
FIG. 8 illustrates an interface builder according to the present disclosure.

FIG. 8 illustrates an example embodiment of the interface builder 80. The interface builder 80 may create the encoder screen layout and/or create and edit various icons. For example, an exemplary build icon 81 is displayed in FIG. 8. Other previously created icons may be saved and shown as saved screens 84. In an embodiment, an icon may be pre-loaded into the system for use in the build icon 81. The saved screens 84 may be selected and edited by dragging a saved screen 84 into the interface builder 80 workspace. Work space settings 85 may be selected may contain various editable settings and preferences that may be used to edit the build icon 81. For example, the home screen of the work space settings 85 is shown. A screen access method 83 and an assignment location 82 may be edited in the home screen. The screen access method 83 may indicate a type of input received by the user to the encoder 50, and the assignment location 82 may indicate what screen or application the assigned access method 83 accesses for each type of input. A user may also upload various icon graphics. For example, a user may upload about a 420×400 pixel image to use as an icon.

Figure 9:
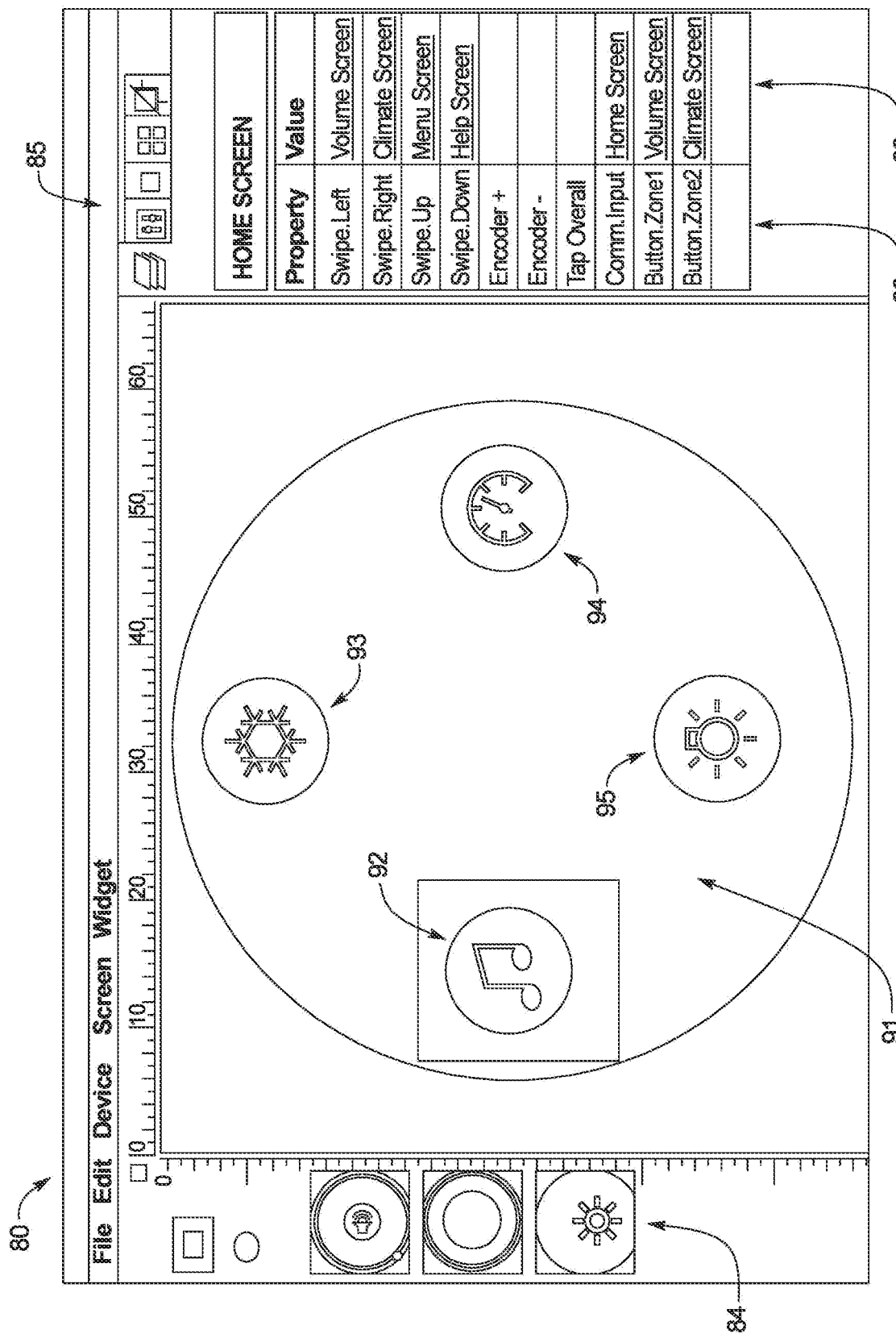
FIG. 9 illustrates an interface builder according to the present disclosure.

FIG. 9 illustrates an example embodiment of the interface builder 80. The interface builder 80 may edit variable icons, for example build icons 91 may comprise build sub-icons 92, 93, 94, and 95. Other previously created icons may be saved and shown as saved screens 84. Work space settings 85 may be selected may contains various editable settings and preferences that may be used to edit the build icon 81.

For example, the home screen of the work space settings 85 is shown. A screen access method 83 and an assignment location 82 may be edited in the home screen. In an embodiment, the assignment location 82 may comprise a press zone that correlates to an icon. For example, build sub-icon 93 may correlate to the press zone on build icon 91 that a user may press and/or select to access another screen, application, and/or function.

Figure 10:
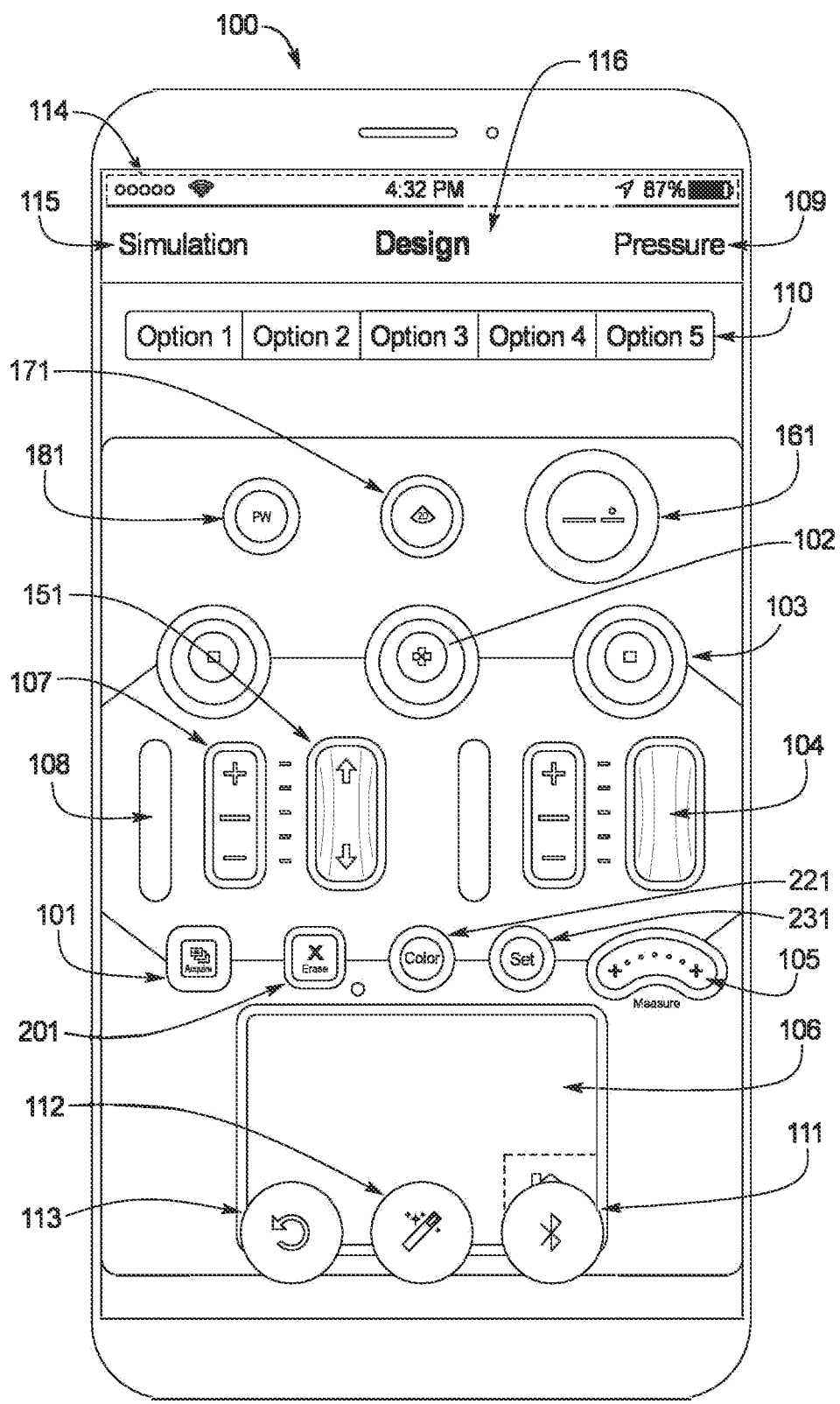
FIG. 10 illustrates an integrated development environment according to the present disclosure.

FIG. 10 illustrates an example embodiment of the integrated development environment 100. The integrated development environment 100 may be an application on a cellular phone. For example, when the integrated development environment 100 is hosted on a cellular phone, a computing device data bar 114 may be displayed showing relevant data about the cellular phone. For example, battery life, the time, and/or network strength may be displayed in the computing device data bar 114.

The integrated development environment 100 may be configured to edit the panel 250 and/or the encoder 50 configuration. For example, the integrated development environment 100 of FIG. 10 shows an example configuration for the panel 250. A panel layout selector 110 may be used to select configurations. For example, "Option 1" is selected and is shown in FIG. 10. Option 1 is a configuration for the panel 250. Another configuration may be selection in "Option 2", or any other "Option" displayed in the panel layout selector 110. An environment name 115 may be used to select other sets of configurations, e.g., other sets of "Options" to be selected for editing.

In a selected configuration of the integrated development environment 100, the configuration may be edited by selecting an input method editor selector 109, which may be used to edit an input received by the panel 250 in a location, and/or by selecting an editor mode selector 112 to access an editor mode selection screen. A back selector 113 may be configured to undo the most recent edit, and a connectivity selector 111 may be used to find, connect, and/or disconnect from the panel 250 or the encoder 50 to change, edit, and/or update a configuration.

The panel 250 and/or the encoder 50 may comprise a physical layout and a digital panel layout 103. The physical layout may comprise the physical features of the panel 250 and/or of the encoder 50. The digital panel layout 103, which is represented in the configuration shown in FIG. 10, may comprise a digital representation of the physical features of the panel 250 and/or encoder 50. Accordingly, the integrated development environment 100 may be able to edit the digital properties of the inputs associated with the physical characteristics of the panel 250, but may not be able to edit the physical characteristics of the panel 250. For example, the integrated development environment 100 may edit the sensitivity of a button on the panel 250, but may not move a physical depression representing the button in the panel 250.

The panel 250 may contain numerous different types of input methods in the panel layout 103. Several are listed herein, but the inputs described herein are not limiting, and are instead samples of the types of input methods that may be used with a system according to the present disclosure. In addition, the shape and size of the various input methods described herein may be edited, as well as the icon associated with each physical or digital embodiment of each input method.

An input method may comprise a rotary button 161. The rotary button 161 may be programmed to vary the type of haptic feedback associated with the rotary button 161. The type of haptic feedback may comprise a click, tone, and/or make/break feedback. Make/break feedback may comprise physical feedback, such as a vibration, when a user makes or breaks contact with a touchpad and/or touchscreen. In addition, the rotary button 161 dial speed may be varied depending on the application. Furthermore, the pressure threshold at which a user must press the rotary button 161 to communicate a signal to the CPU is also variable. The rotary button 161 may also be configured to provide visual feedback through the use of lighting and/or animation. Lighting and/or animation may comprise pre-recorded video, colored illumination, and/or non-colored illumination. The shape, style, and movement of the button may also be configurable by the user. For example, button size, visual depiction, styling, labeling, and location on the panel 250 may be configurable. Rotary buttons 171, 181, and 102 may also be included in a panel layout 103. As shown in the FIG. 10, different rotary buttons may be different sizes, be located in different locations, and have different icons. For example, the rotary button 102 and the rotary button 181 are different in size, location, and icon layout.

An input method may comprise a scroll wheel 104. The scroll wheel 104 may be programmed to vary the type of haptic feedback associated with the scroll wheel 104. The type of haptic feedback may comprise a click, tone, and/or make/break feedback. In addition, the scroll wheel 104 speed may be varied depending on the application. Furthermore, a momentum of the scroll wheel 104, as perceived by the user, may be varied. The scroll wheel 104 may also be configured to provide visual feedback through the use of LEDs, lighting, and/or animation. Lighting and/or animation may comprise pre-recorded video, colored illumination, bar graphs, and/or non-colored illumination. The shape, style, and movement of the scroll wheel 104 may also be configurable by the user. For example, scroll wheel 104 size, visual depiction, styling, labeling, and location on the panel 250 may be configurable. The scroll wheel 104 orientation may also be varied. The orientation of the scroll wheel 104 may comprise horizontal orientation, vertical orientation, and/or orientation somewhere in-between. A scroll wheel 151 may also be included in a panel layout 103. As shown in the FIG. 10, different scroll wheels may be different sizes, be located in different locations, and have different icons. For example, the scroll wheel 104 and the scroll wheel 151 are different in location and icon layout, and may also be sized and/or oriented differently than shown in FIG. 10.

An input method may comprise a swipe 105. The swipe 105 may be programmed to vary the type of haptic feedback associated with the swipe 105. The type of haptic feedback may comprise a click, tone, and/or make/break feedback. In addition, the swipe 105 input speed may be varied depending on the application. Furthermore, a momentum of the swipe 105, as perceived by the user, may be varied. The swipe 105 may also be configured to provide visual feedback through the use of lighting and/or animation. Lighting and/or animation may comprise pre-recorded video, colored illumination, bar graphs, and/or non-colored illumination. The shape, style, and/or movement of the swipe 105 may also be configurable by the user. For example, swipe size, visual depiction, styling, labeling, and location on the panel 250 may be configurable. Swipe 105 pressure function may also be varied. Pressure function of the swipe 105 may comprise various configurations which vary inputs to the CPU by the pressure at which a user presses the swipe 105. Similarly, swipe 105 orientation may be varied. Swipe 105 orientation may comprise horizontal orientation, vertical orientation, or orientation somewhere in-between. A swipe 108 may also be included in a panel layout 103. As shown in the FIG. 10, different swipes may be different sizes, be located in different locations, and have different icons. For example, the swipe 105 and the swipe 108 are different in location, physical layout, size and icon layout, and may also be sized and/or oriented differently than shown in FIG. 10.

An input method may comprise a button 101. The button 101 may be programmed to vary the type of haptic feedback associated with the button 101. The type of haptic feedback may comprise a click, tone, and/or make/break feedback. Furthermore, the pressure threshold at which a user must press the button 101 to communicate a signal to the CPU is also variable. The button 101 may also be configured to provide visual feedback through the use of lighting and/or animation. Lighting and/or animation may comprise pre-recorded video, colored illumination, solid light, pulsed light, and/or non-colored illumination. The shape, style, and movement of the button 101 may also be configurable by the user. For example, button size, visual depiction, styling, labeling, and/or location on the panel 250 may be configurable. Buttons 201, 221, and 231 may also be included in a panel layout 103. As shown in the FIG. 10, different buttons may be different sizes, be located in different locations, and have different icons. For example, the buttons 101, 201, 221, and 231 shown in FIG. 10 vary in location, size and icon layout, and may also be sized and/or oriented differently than shown in FIG. 10.

An input method may comprise a slider 107. The slider 107 may be programmed to vary the type of haptic feedback associated with the slider 107. The type of haptic feedback may comprise a click, tone, and/or make/break feedback. In addition, the slider 107 slide-speed may be varied depending on the application. Furthermore, the momentum of the slider 107, as perceived by the user, may be varied. The slider 107 may also be configured to provide visual feedback through the use of lighting and/or animation. Lighting and/or animation may comprise pre-recorded video, colored illumination, bar graphs, and/or non-colored illumination. The shape, style, and movement of the slider 107 may also be configurable by the user. For example, slider size, visual depiction, styling, labeling, and location on the panel 250 may be configurable. Slider 107 pressure function may also be varied. Pressure function of the slider 107 may comprise only enabling the function, and/or be based on a relative addition or subtraction of pressure to the slider 107. Similarly, slider 107 orientation may be varied. Slider 107 orientation may comprise horizontal orientation, vertical orientation, or orientation somewhere in-between. While only a single slider 107 is indicated with labels in FIG. 10, two or more sliders may be included in the panel layout 103.

An input method may comprise a trackpad 106. The trackpad 106 may be programmed to vary the type of haptic feedback associated with the trackpad 106. The type of haptic feedback may comprise a click, tone, and/or make/break feedback. In addition, the trackpad 106 gesture input speed may be varied depending on the application. The trackpad 106 may also be configured to provide visual feedback through the use of lighting and/or animation. Lighting and/or animation may comprise pre-recorded video, colored illumination, bar graphs, and/or non-colored illumination.

The shape, style, and movement of the trackpad 106 may also be configurable by the user. For example, trackpad size, visual depiction, styling, labeling, and location on the panel 250 may be configurable. Trackpad 106 pressure function may also be varied. Pressure function of the trackpad 106 may comprise various configurations which vary inputs to the CPU by the pressure at which a user presses the trackpad 106. Similarly, trackpad 106 orientation may be varied. Trackpad 106 orientation may comprise horizontal orientation, vertical orientation, or orientation somewhere in-between. A trackpad may also be combined with other interfaces available within the integrated development environment 100.

For example, a trackpad 106 may also comprise a button, swipe, scroll wheel, slider, and/or rotary button configured to operate within, and/or in conjunction with, the trackpad 106. While only a single rectangular trackpad 106 is illustrated in FIG. 10, two or more trackpads may be included in the panel layout 103, and an exemplary trackpad may be in a form other than a rectangular form, for example, a circle and/or other polygon.

The physical embodiment of the trackpad 106 may comprise a specific texture. The specific texture may be configured to support fine intentional movement by a user, but not create so much friction as to restrict the movement of the user. In an embodiment, the trackpad 106 is a separate assembly sealed to the main panel 250, and may include a gasket between the trackpad 106 and the panel 250.

In an embodiment, the integrated development environment 100 may correlate the speed of an input from a user to a specific function. For example, a quick movement by a user may yield a gross movement. A slow movement by a user may give finer control.

In an embodiment, the integrated development environment 100 may change the functionality of a physical embodiment of a feature positioned on the panel 250. For example, a panel 250 may be provided with the slider 107. The slider 107 may be programmed according to a configuration as provided by the integrated development environment 100. For example, the slider 107 may be configured such that a user can swipe the slider in a first and/or second direction to achieve a slide and/or scroll functionality. However, a different functionality of the slider may be required. In such an embodiment, the user may edit the configuration of the slider 107 using the integrated development environment 100 to operate differently, for example as a toggle switch. For example, when the slider 107 is configured as a toggle switch, the user may swipe in a first direction to achieve a first condition, for example "on," and may swipe in a second direction to achieve a second condition, for example "off." In such an operation using the integrated development environment 100, the physical embodiment of the slider 107 on the panel 250 has not changed, however, the functionality of the slider 107 when manipulated by the user has changed.

A contemplated use of the integrated development environment 100 where the integrated development environment 100 may change the functionality of physical embodiments of user input areas on the panel 250 is not limited to the slider 107. Instead, any feature of the panel 250 useable as a user input area may be configured and re-configured by the integrated development environment 100. For example, a button may be configured as a slider, a swipe may be configured as a button, and a scroll wheel may be configured as a variable pressure sensitive button. The aforementioned examples are not limiting, as any other user input area may be configured with any user input method.

Figure 11:
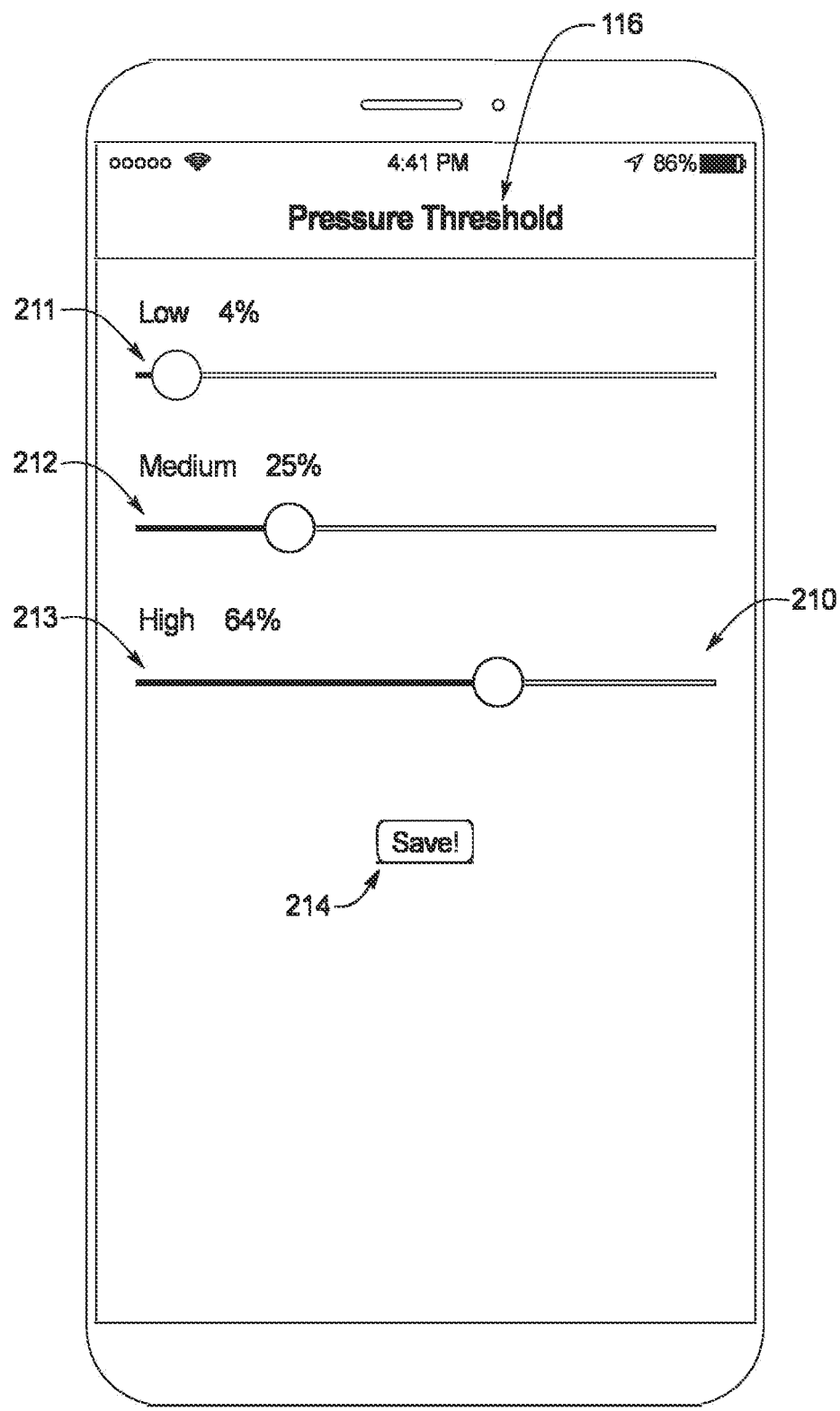
FIG. 11 illustrates an input method editor screen of an integrated development environment according to the present disclosure.

FIG. 11 illustrates an exemplary input method editor screen 210 of an example integrated development environment. The input method editor screen 210 may be accessed by selecting the input method editor selector 109. As shown in the edit title 116, the specific input method editor screen 210 of FIG. 10 may vary a pressure threshold. The pressure threshold may comprise a low, medium, and high pressure threshold. Accordingly, input method editor screen 210 includes a low pressure selector 211, a medium pressure selector 212, and a high pressure selector 213. More and/or different input types and variations may be included in the input method editor screen 210. A user may vary the low pressure threshold by moving the scroll icon associated with the low pressure selector 211. Similar processes may be used for to vary the medium and high pressure thresholds. When the user is finished editing the pressure thresholds in the input method editor screen 210, the user may save the configuration of the input by selecting the save button 214.

Figure 12:
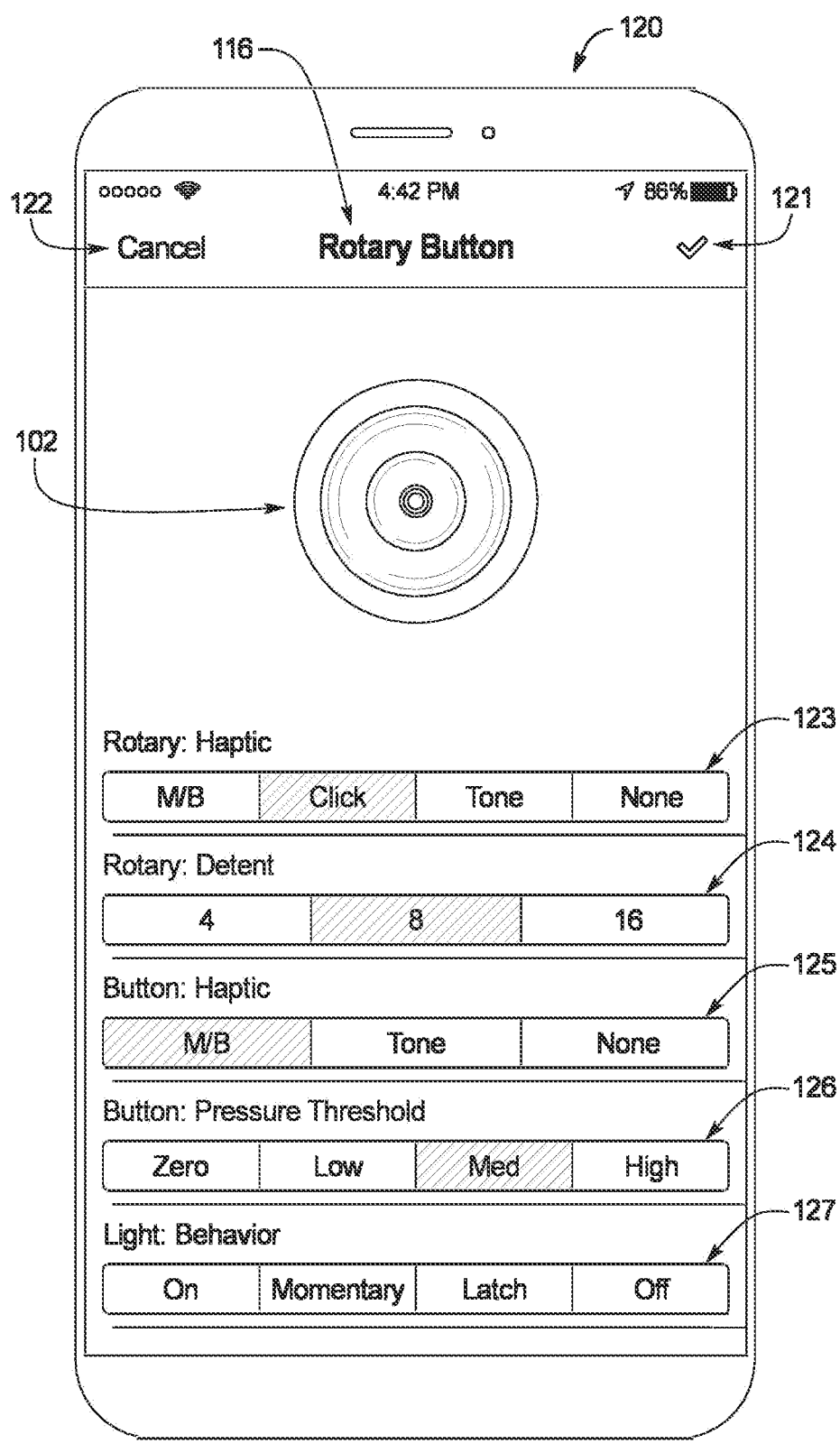
FIG. 12 illustrates a rotary button configurator of an integrated development environment according to the present disclosure.

FIG. 12 illustrates a rotary button configurator 120 of an example integrated development environment. The rotary button configurator 120 may be selected by selecting the rotary button 102 on the panel layout 103 of the integrated development environment. In the rotary button configurator 120, various properties of the rotary button 102 may be edited.

For example, a rotary haptic selector 123 may be used to vary the haptic feedback provided by the rotary button 102 between "make/break ("M/B")", "Click" "Tone" and/or "none" settings. An M/B feedback may be configured to provide contact when a user makes contact or breaks contact with a touch sensitive area. A "Click" feedback may provide feedback in the form of a clicking sound while a user rotates the rotary button 102. A "Tone" feedback may provide an audible tone while the user is providing input to the rotary button 102. A selection of "none" may turn off any haptic feedback. A detent selector 124 may be used to vary the frequency of the detent feedback provided by the rotary button 102. The detent feedback may be perceived as vibrational movement of the rotary button 102 in a rotational plane of the rotary button 102 while the rotary button 102 is being moved in the rotational plane. A button haptic selector 125 may be used to select the feedback received when the rotary button 102 is depressed (or receives an input correlated to the act of the user depressing the rotary button 102, as the rotary button 102 may not physically move). A pressure threshold selector 126 may be used to select the amount of pressure required by the user to activate the rotary button 102 and begin sending inputs to the panel 250. A light indicator selector 127 may be used to configure visual feedback and/or light illumination associated with any input or lack of input received by the rotary button 102.

When the user has completed the edits, the configuration of the rotary button 102 can be saved by selecting the edit acceptor 121. If the user instead wishes to discard any changes to the configuration of the rotary button 102, the user may exit the rotary button configurator 120 without saving the configuration by selecting the edit rejector 122.

Numerous other configurator screens according to the present disclosure will not be described. However, the configuration, of the configurator screens, types of buttons and/or input types configurator, and/or individual settings of the inputs and/or feedback that are configurable within any configurator should are not limiting. Numerous other embodiments may be contemplated by those of skill in the art, but for the sake of brevity, have not been included in the present disclosure.

Figure 13:
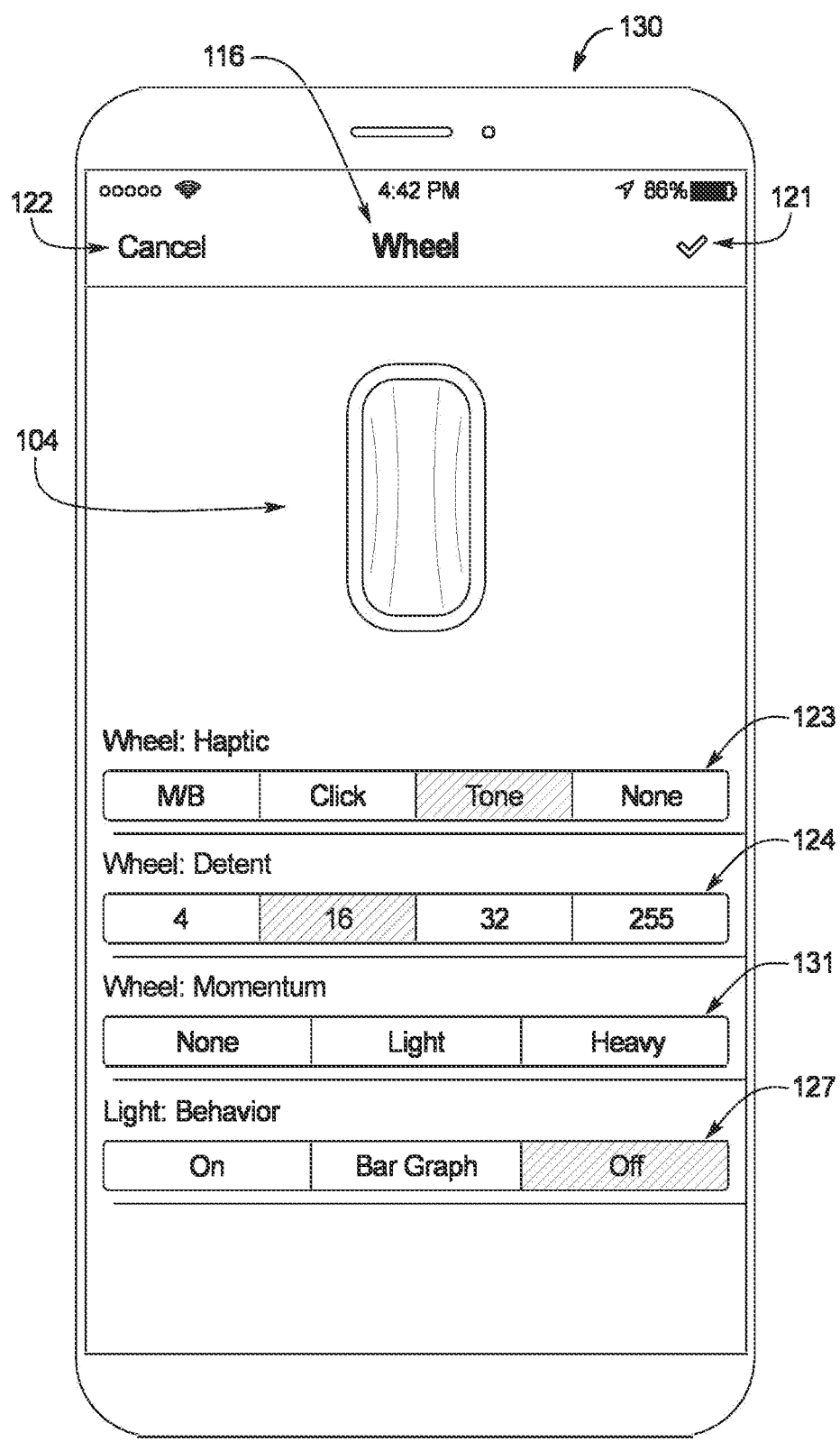
FIG. 13 illustrates a scroll wheel configurator of an integrated development environment according to the present disclosure.

FIG. 13 illustrates a scroll wheel configurator 130 of an example integrated development environment. The scroll wheel configurator 130 may be selected by selecting the scroll wheel 104 on the panel layout 103 of the integrated development environment. In the scroll wheel configurator 130, various properties of the scroll wheel 104 may be edited.

For example, the rotary haptic selector 123 may be used to vary the haptic feedback provided by the scroll wheel 104. The detent selector 124 may be used to vary the frequency of the detent feedback provided by the scroll wheel 104. A momentum selector 131 may be used to select the perceived momentum of the scroll wheel 104 when rotated by the user. The light indicator selector 127 may be used to configure visual feedback and/or light illumination associated with any input or lack of input received by the scroll wheel 104.

When the user has completed the edits, the configuration of the scroll wheel 104 can be saved by selecting the edit acceptor 121. If the user instead wishes to discard any changes to the configuration of the scroll wheel 104, the user may exit the scroll wheel configurator 130 without saving the configuration by selecting the edit rejector 122.

Figure 14:
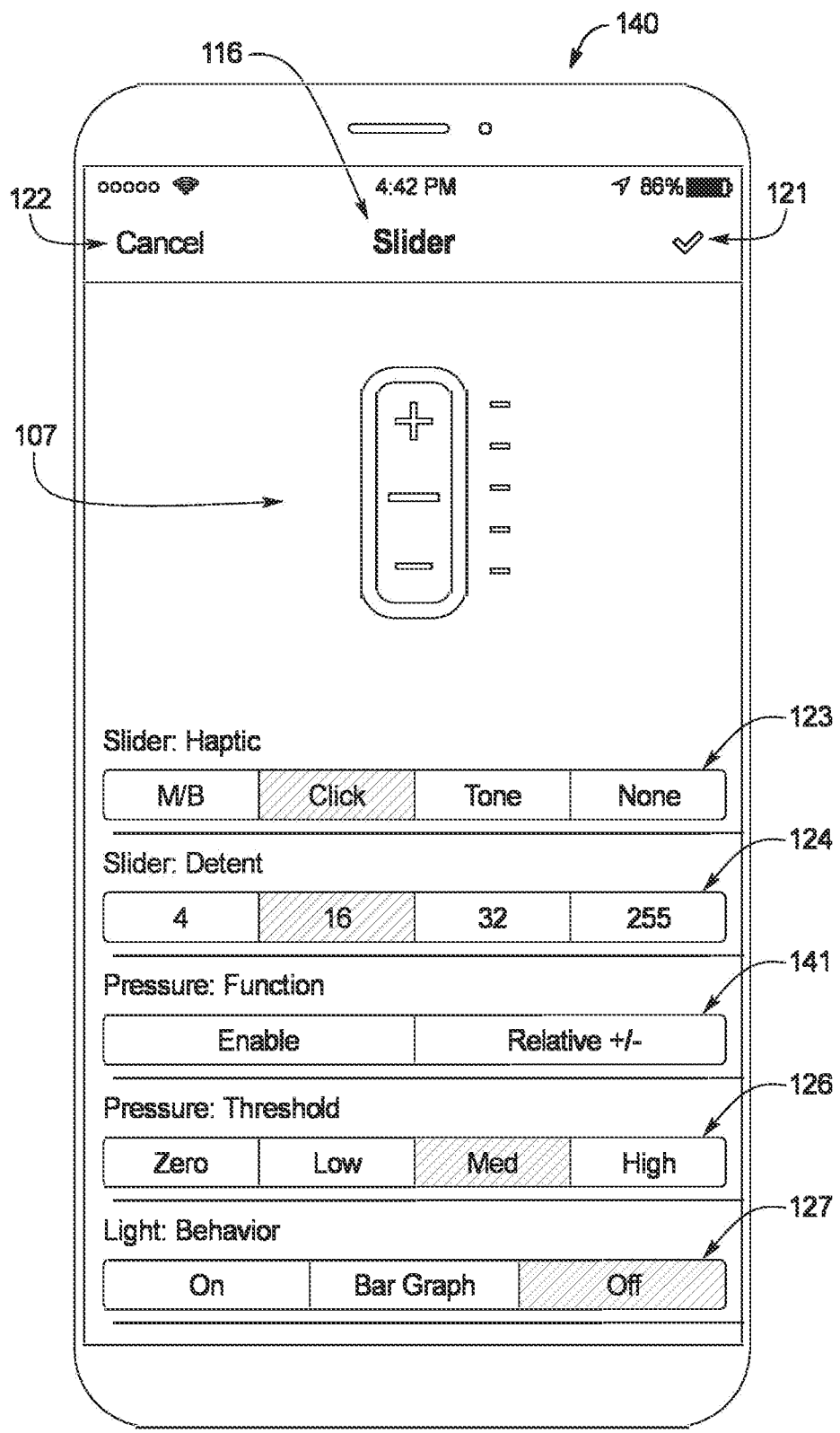
FIG. 14 illustrates a slider configurator of an integrated development environment according to the present disclosure.

FIG. 14 illustrates a slider configurator 140 of an example integrated development environment. The slider configurator 140 may be selected by selecting the slider 107 on the panel layout 103 of the integrated development environment. In the slider configurator 140, various properties of the slider 107 may be edited.

For example, the rotary haptic selector 123 may be used to vary the haptic feedback provided by the slider 107. The detent selector 124 may be used to vary the frequency of the detent feedback provided by the slider 107. A pressure function selector 141 may be used to select an ability to vary the slider 107 input by how "hard" the slider 107 is pressed by the user. The pressure threshold selector 126 may be used to select the amount of pressure required by the user to activate the slider 107 and begin sending inputs to the panel 250. The light indicator selector 127 may be used to configure visual feedback and/or light illumination associated with any input or lack of input received by the slider 107.

When the user has completed the edits, the configuration of the slider 107 can be saved by selecting the slider 107. If the user instead wishes to discard any changes to the configuration of the slider 107, the user may exit the slider configurator 140 without saving the configuration by selecting the edit rejector 122.

Figure 15:
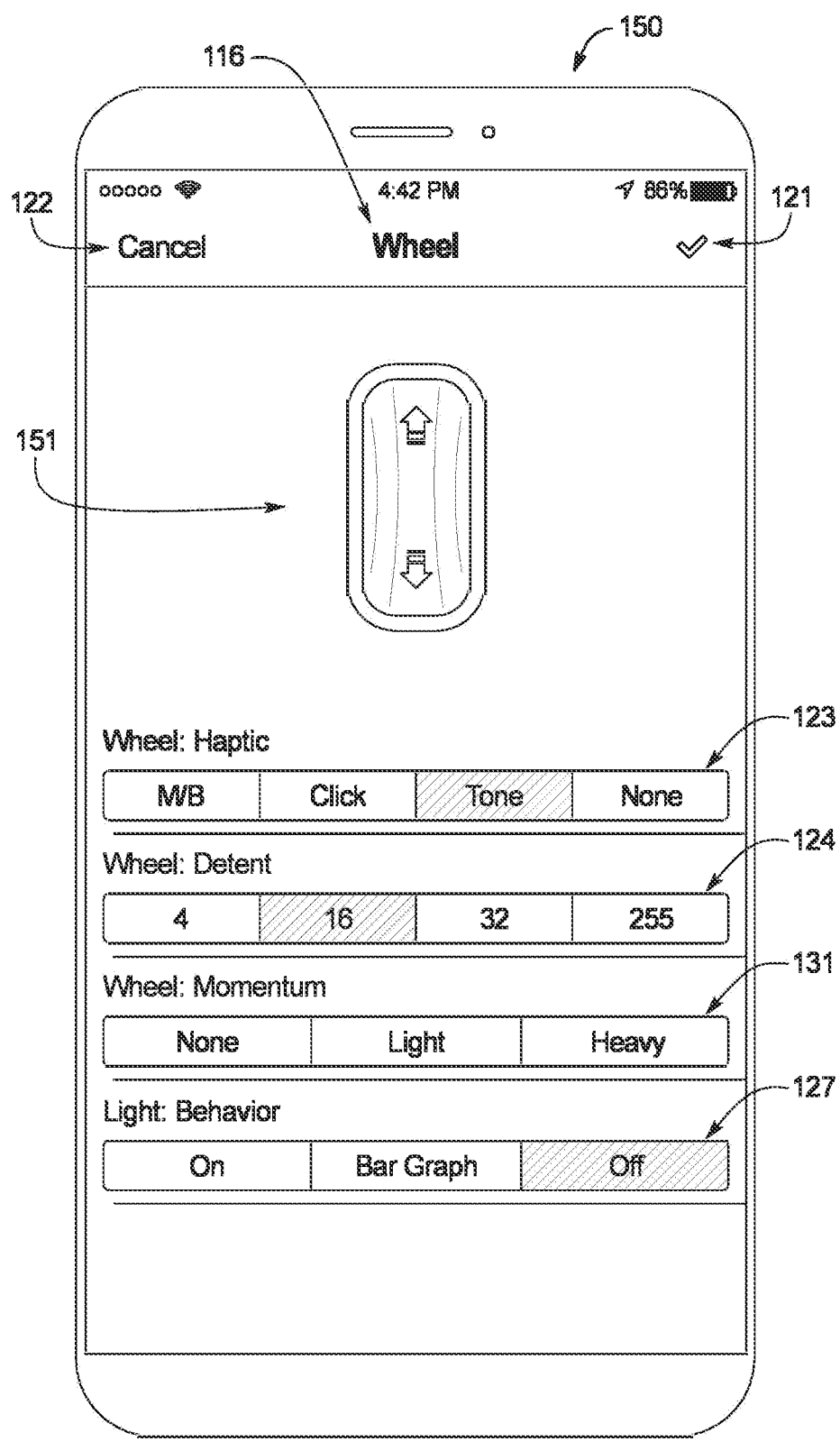
FIG. 15 illustrates a scroll wheel configurator of an integrated development environment according to the present disclosure.

FIG. 15 illustrates an embodiment of a scroll wheel configurator 150 of an example integrated development environment. The scroll wheel configurator 150 may be selected by selecting the scroll wheel 151 on the panel layout 103 of the integrated development environment. In the scroll wheel configurator 150 various properties of the scroll wheel 151 may be edited. The properties may be the same or different from the properties editable in other scroll wheel configurators associated with the integrated development environment.

Figure 16:
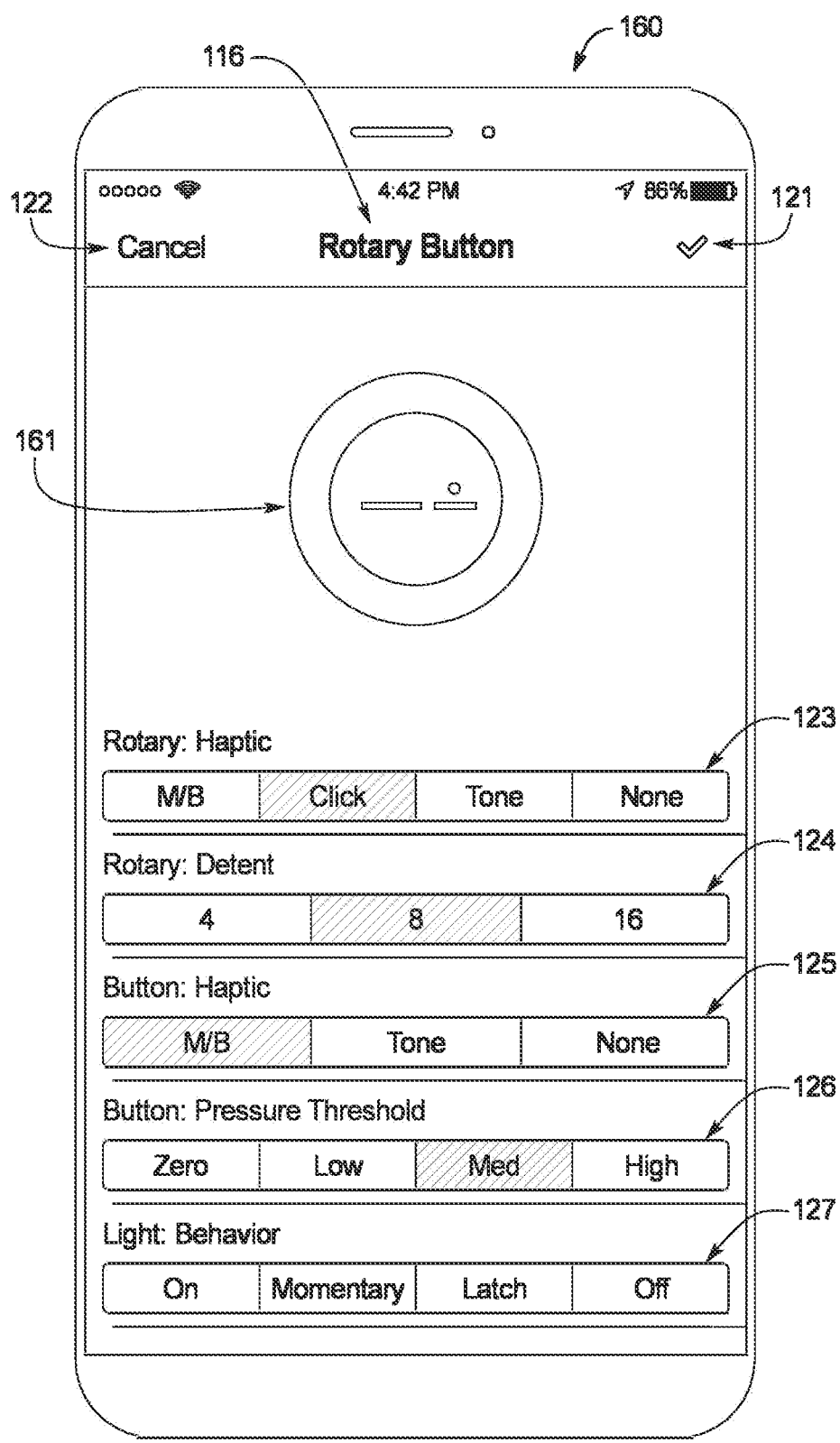
FIG. 16 illustrates a rotary button configurator of an integrated development environment according to the present disclosure.

FIG. 16 illustrates an embodiment of a rotary button configurator of an example integrated development environment. Specifically, FIG. 16 illustrates a rotary button configurator 160 that may be used to configure rotary button 161. The rotary button configurator 160 may be selected by rotary button 161 on the panel layout 103 of the integrated development environment. The rotary button configurator 160 may be different from other rotary button configurators, for example rotary button configurator 120, but may also be the same as other rotary button configurators of the integrated development environment.

Figure 17:
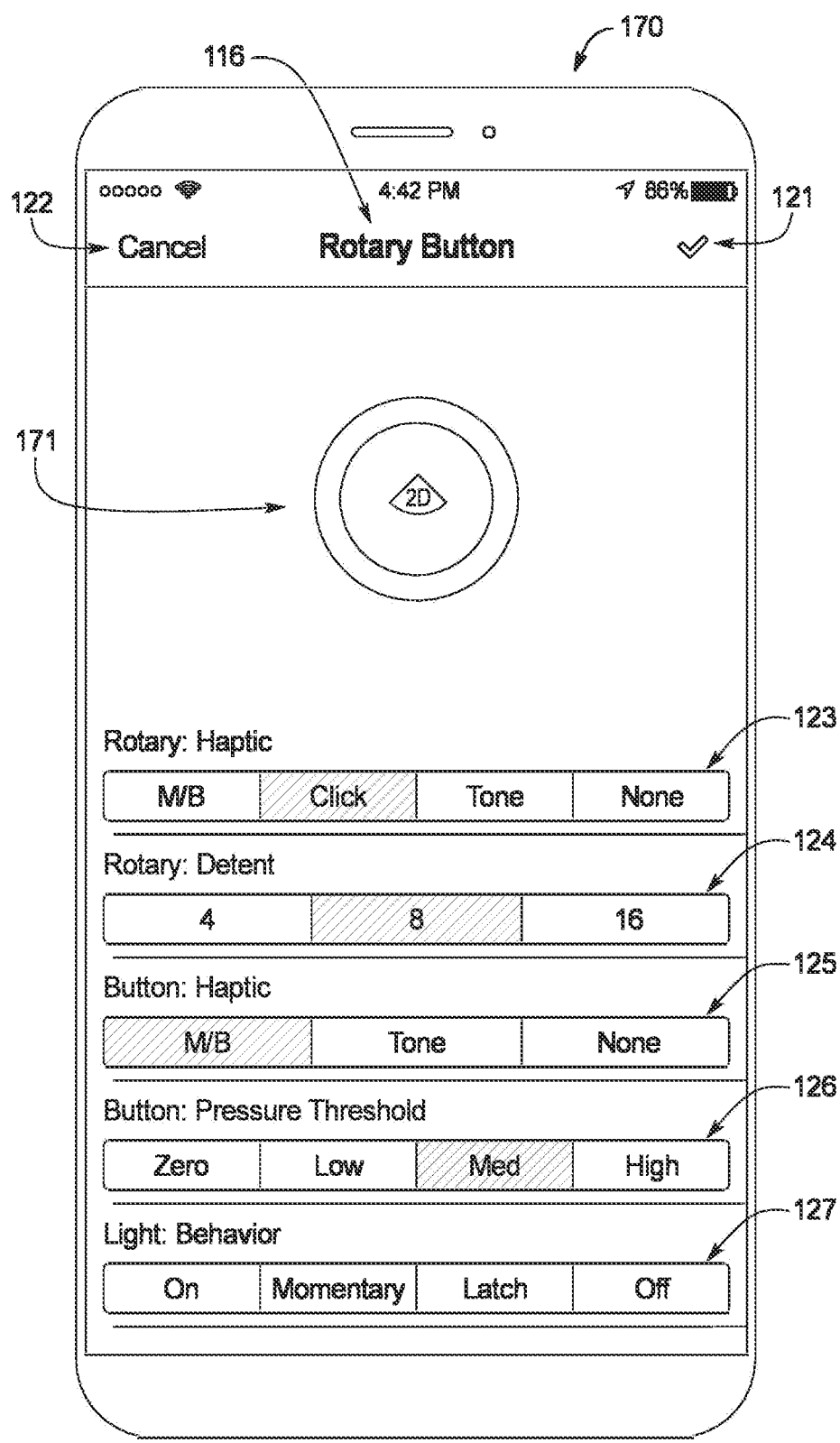
FIG. 17 illustrates a rotary button configurator of an integrated development environment according to the present disclosure.

FIG. 17 illustrates an embodiment of a rotary button configurator of an example integrated development environment. Specifically, FIG. 17 illustrates a rotary button configurator 170 that may be used to configure rotary button 171. The rotary button configurator 170 may be selected by rotary button 171 on the panel layout 103 of the integrated development environment. The rotary button configurator 170 may be different from other rotary button configurators, for example rotary button configurator 120, but may also be the same as other rotary button configurators of the integrated development environment.

Figure 18:
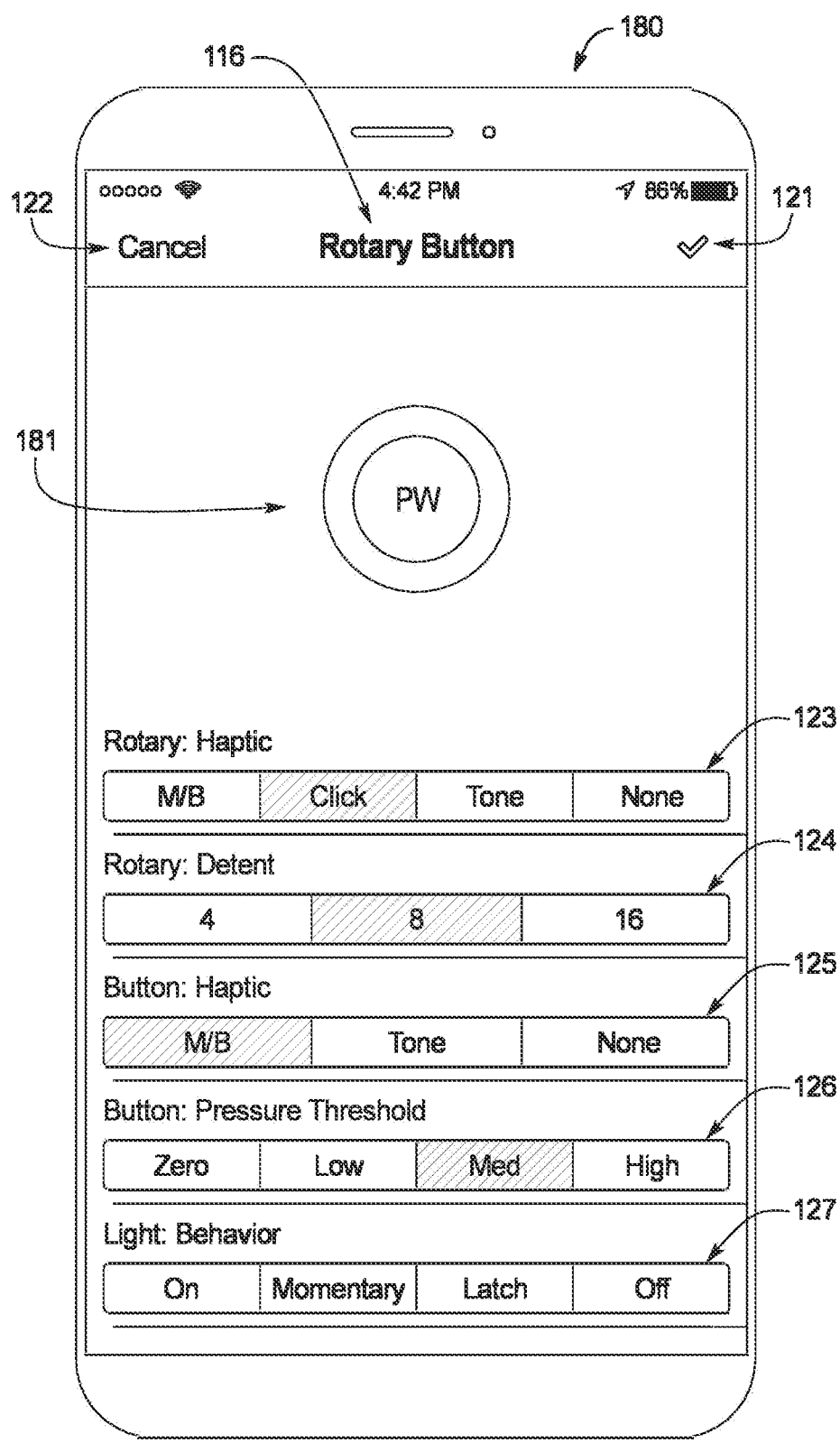
FIG. 18 illustrates a rotary button configurator of an integrated development environment according to the present disclosure.

FIG. 18 illustrates an embodiment of a rotary button configurator of an example integrated development environment. Specifically, FIG. 18 illustrates a rotary button configurator 180 that may be used to configure rotary button 181. The rotary button configurator 180 may be selected by rotary button 181 on the panel layout 103 of the integrated development environment. The rotary button configurator 180 may be different from other rotary button configurators, for example rotary button configurator 120, but may also be the same as other rotary button configurators of the integrated development environment.

Figure 19:
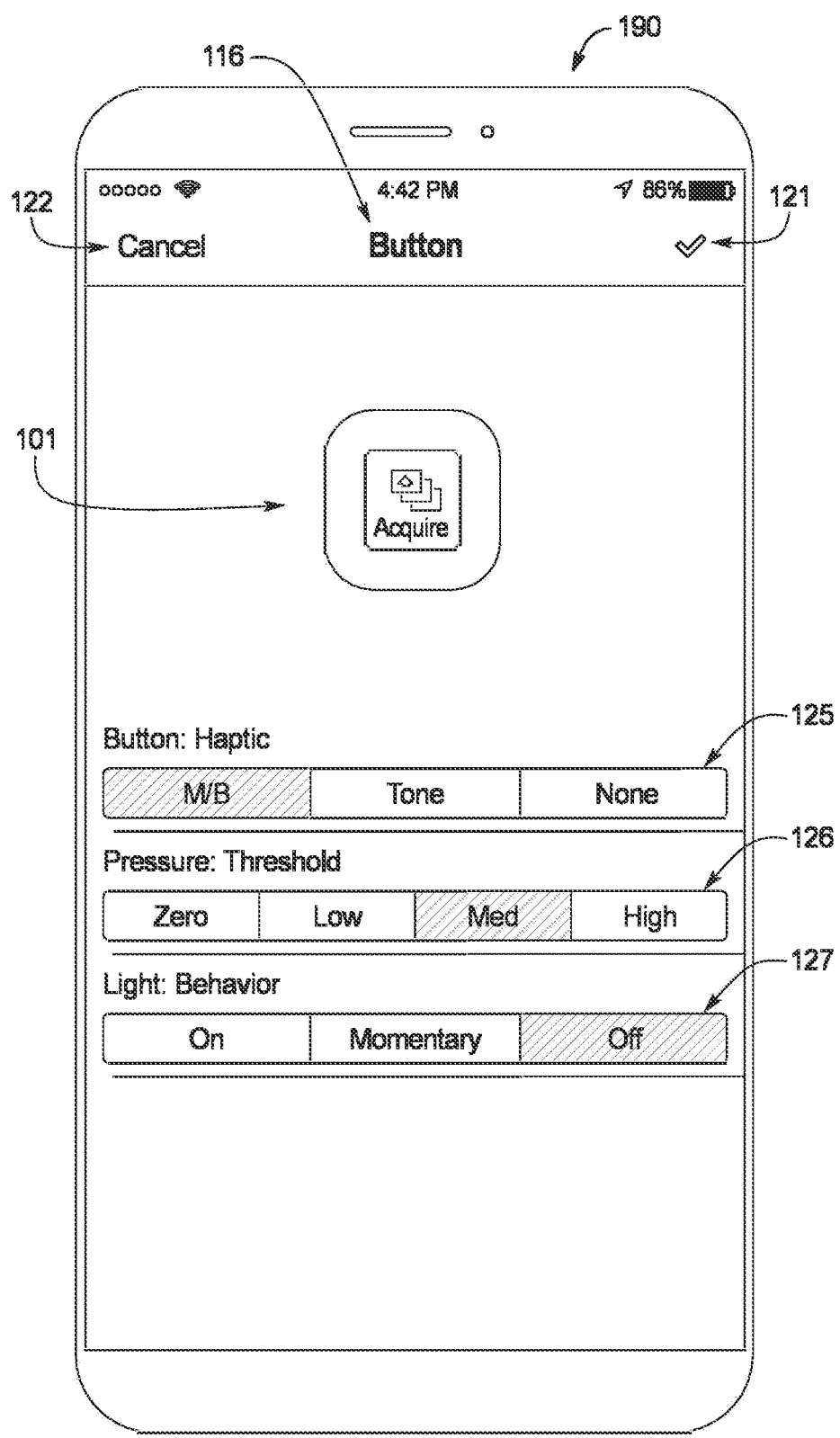
FIG. 19 illustrates a button configurator of an integrated development environment according to the present disclosure.

FIG. 19 illustrates a button configurator 190 of an example integrated development environment. The button configurator 190 may be selected by selecting the button 101 on the panel layout 103 of the integrated development environment. In the button configurator 190, various properties of the button 101 may be edited.

For example, the button haptic selector 125 may be used to select the feedback received when the button 101 is depressed. The pressure threshold selector 126 may be used to select the amount of pressure required by the user to activate the button 101 and begin sending inputs to the panel 250. The light indicator selector 127 may be used to configure visual feedback and/or light illumination associated with any input or lack of input received by the button 101.

When the user has completed the edits, the configuration of the button 101 can be saved by selecting the edit acceptor 121. If the user instead wishes to discard any changes to the configuration of the button 101, the user may exit the button configurator 190 without saving the configuration by selecting the edit rejector 122.

Figure 20:
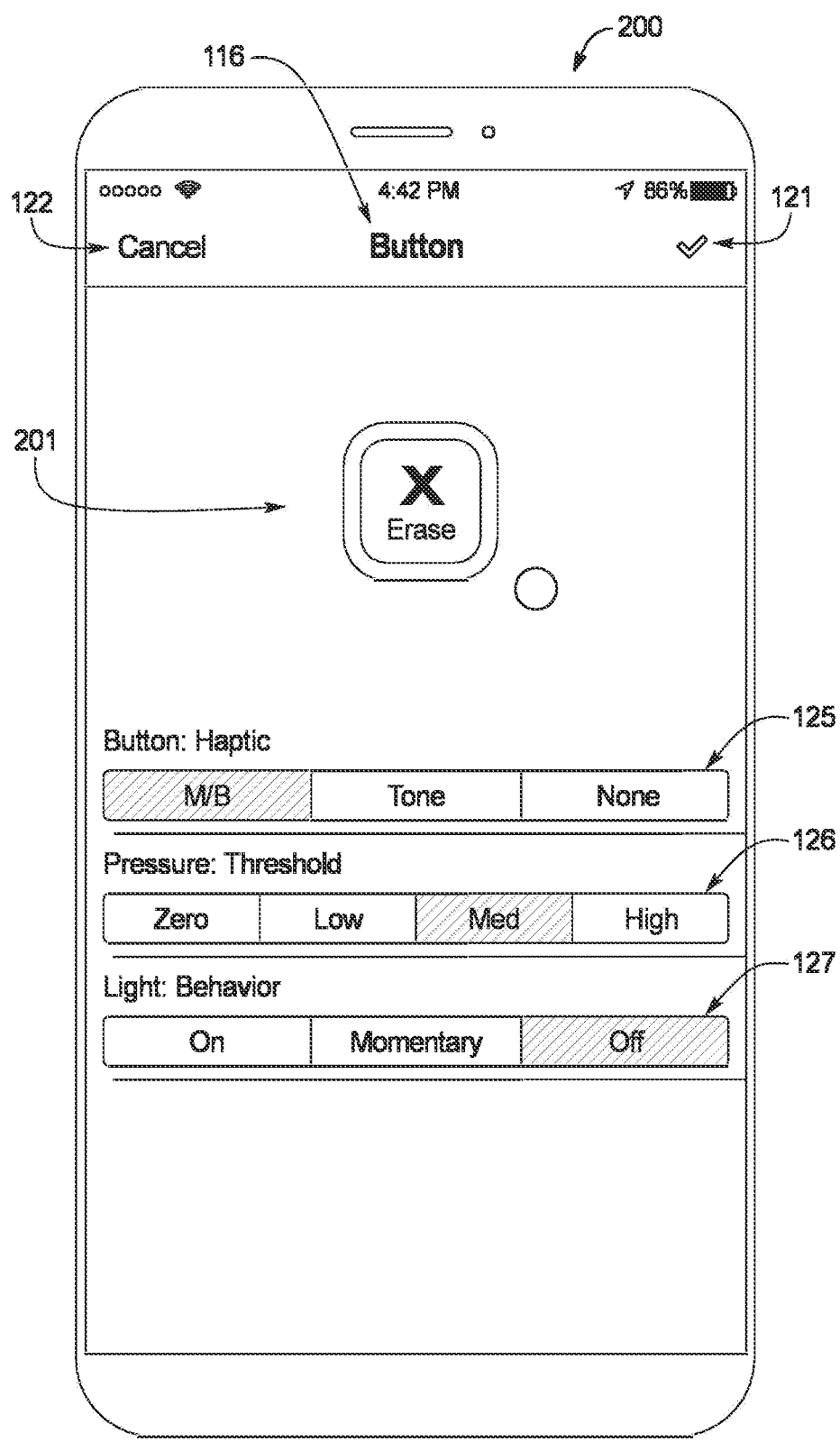
FIG. 20 illustrates a button configurator of an integrated development environment according to the present disclosure.

FIG. 20 illustrates an embodiment of a button configurator of an example integrated development environment. Specifically, FIG. 20 illustrates a button configurator 200 that may be used to configure button 201. The button configurator 200 may be selected by selecting button 201 on the panel layout 103 of the integrated development environment. The button configurator 200 may be different from other button configurators, for example button configurator 190, but may also be the same as other button configurators of the integrated development environment.

Figure 21:
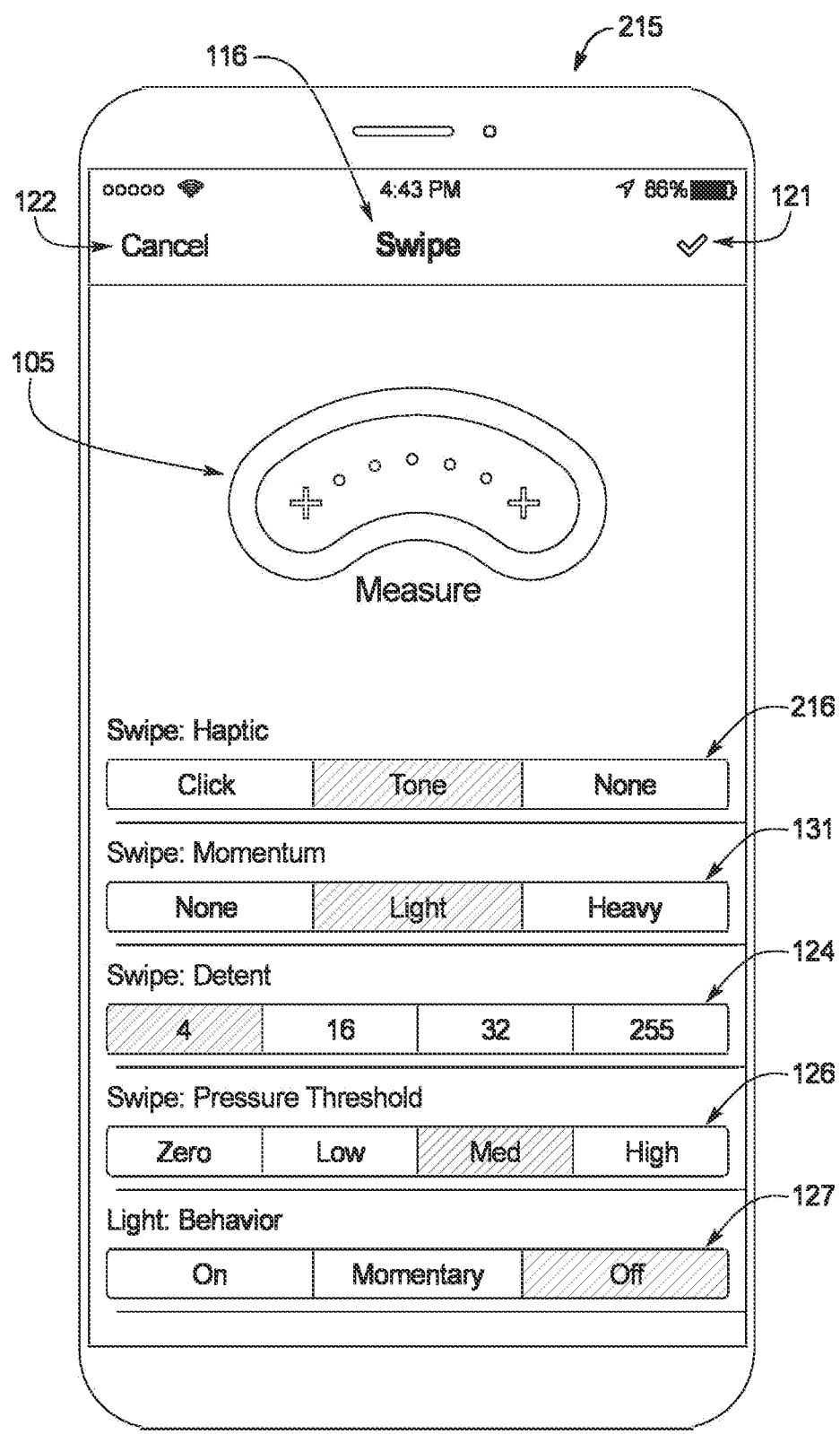
FIG. 21 illustrates a swipe configurator of an integrated development environment according to the present disclosure.

FIG. 21 illustrates a swipe configurator 215 of an example integrated development environment. The swipe configurator 215 may be selected by selecting the swipe 105 on the panel layout 103 of the integrated development environment. In the swipe configurator 215, various properties of the swipe 105 may be edited.

For example, a swipe haptic selector 216 may be used to select the feedback received when the swipe 105 is swiped. The momentum selector 131 may be used to select the perceived momentum of the swipe 105 when rotated by the user. The detent selector 124 may be used to vary the frequency of the detent feedback provided by the swipe 105. The pressure threshold selector 126 may be used to select the amount of pressure required by the user to activate the swipe 105 and begin sending inputs to the panel 250. The light indicator selector 127 may be used to configure visual feedback and/or light illumination associated with any input or lack of input received by the swipe 105.

When the user has completed the edits, the configuration of the swipe 105 can be saved by selecting the edit acceptor 121. If the user instead wishes to discard any changes to the configuration of the swipe 105, the user may exit the swipe configurator 215 without saving the configuration by selecting the edit rejector 122.

Figure 22:
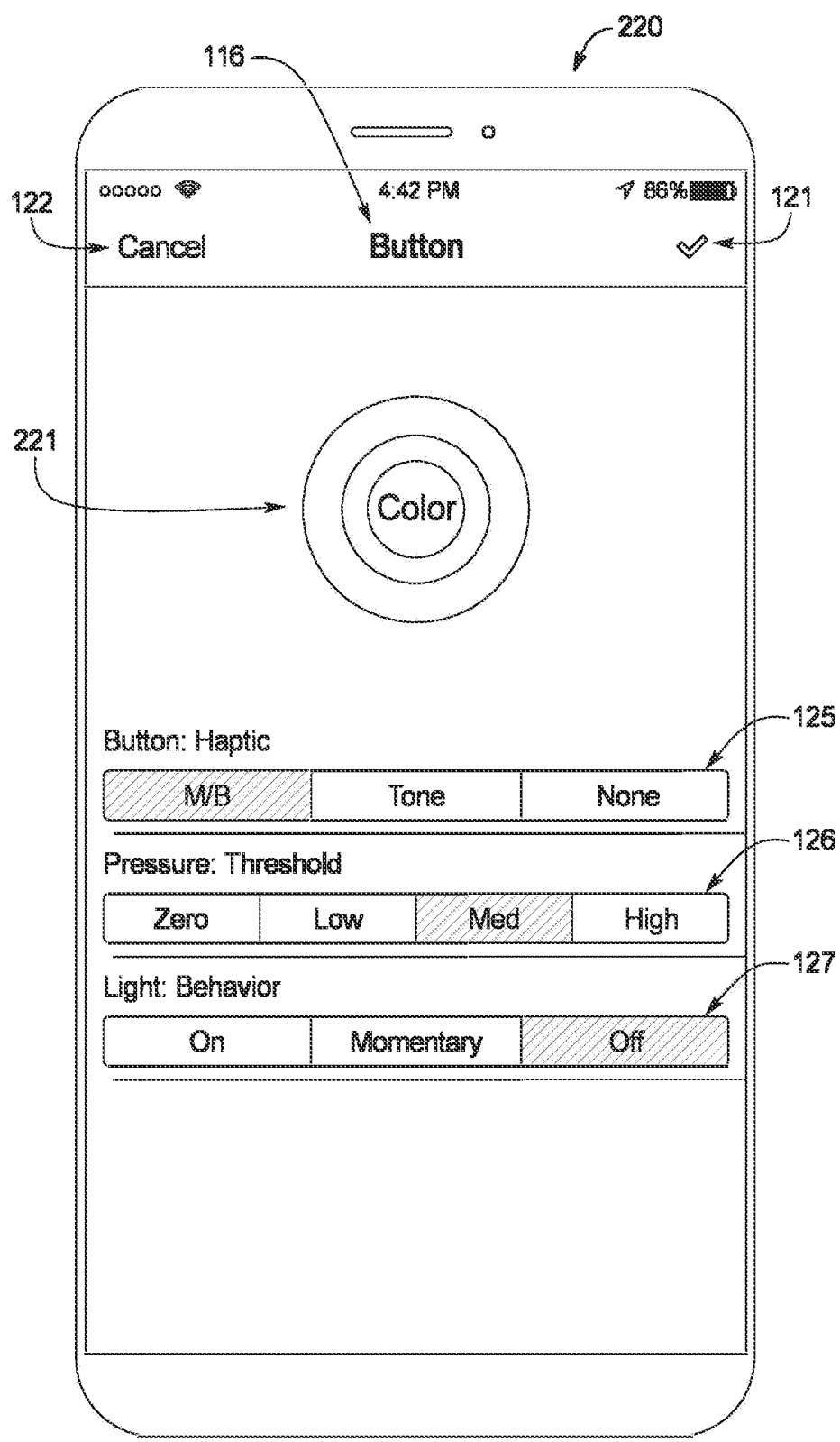
FIG. 22 illustrates a button configurator of an integrated development environment according to the present disclosure.

FIG. 22 illustrates an embodiment of a button configurator of an example integrated development environment. Specifically, FIG. 22 illustrates a button configurator 220 that may be used to configure button 221. The button configurator 220 may be selected by selecting button 221 on the panel layout 103 of the integrated development environment. The button configurator 220 may be different from other button configurators, for example button configurator 190, but may also be the same as other button configurators of the integrated development environment.

Figure 23:
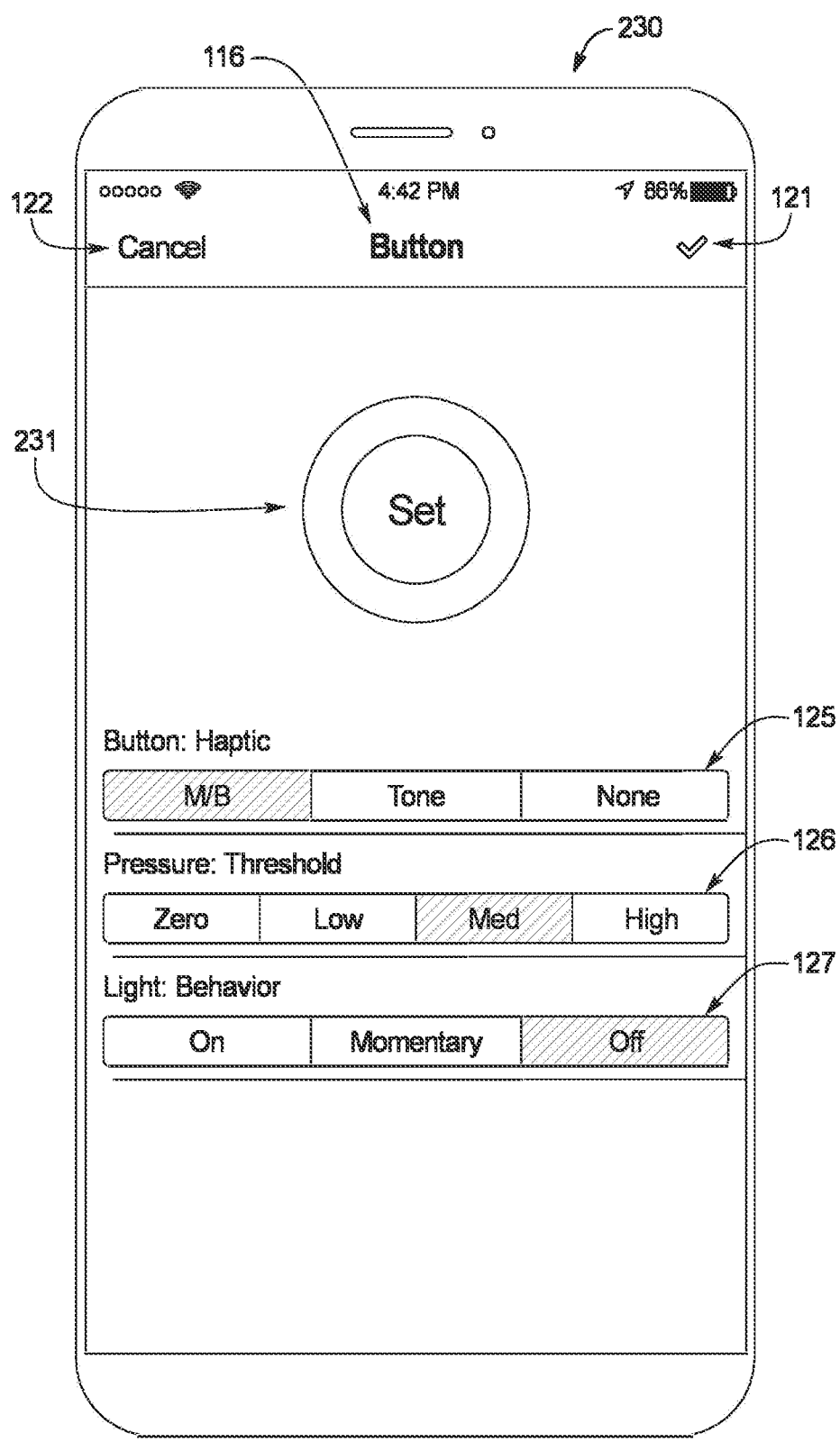
FIG. 23 illustrates a button configurator of an integrated development environment according to the present disclosure.

FIG. 23 illustrates an embodiment of a button configurator of an example integrated development environment. Specifically, FIG. 23 illustrates a button configurator 230 that may be used to configure button 231. The button configurator 230 may be selected by selecting button 231 on the panel layout 103 of the integrated development environment. The button configurator 230 may be different from other button configurators, for example button configurator 190, but may also be the same as other button configurators of the integrated development environment.

Figure 24:
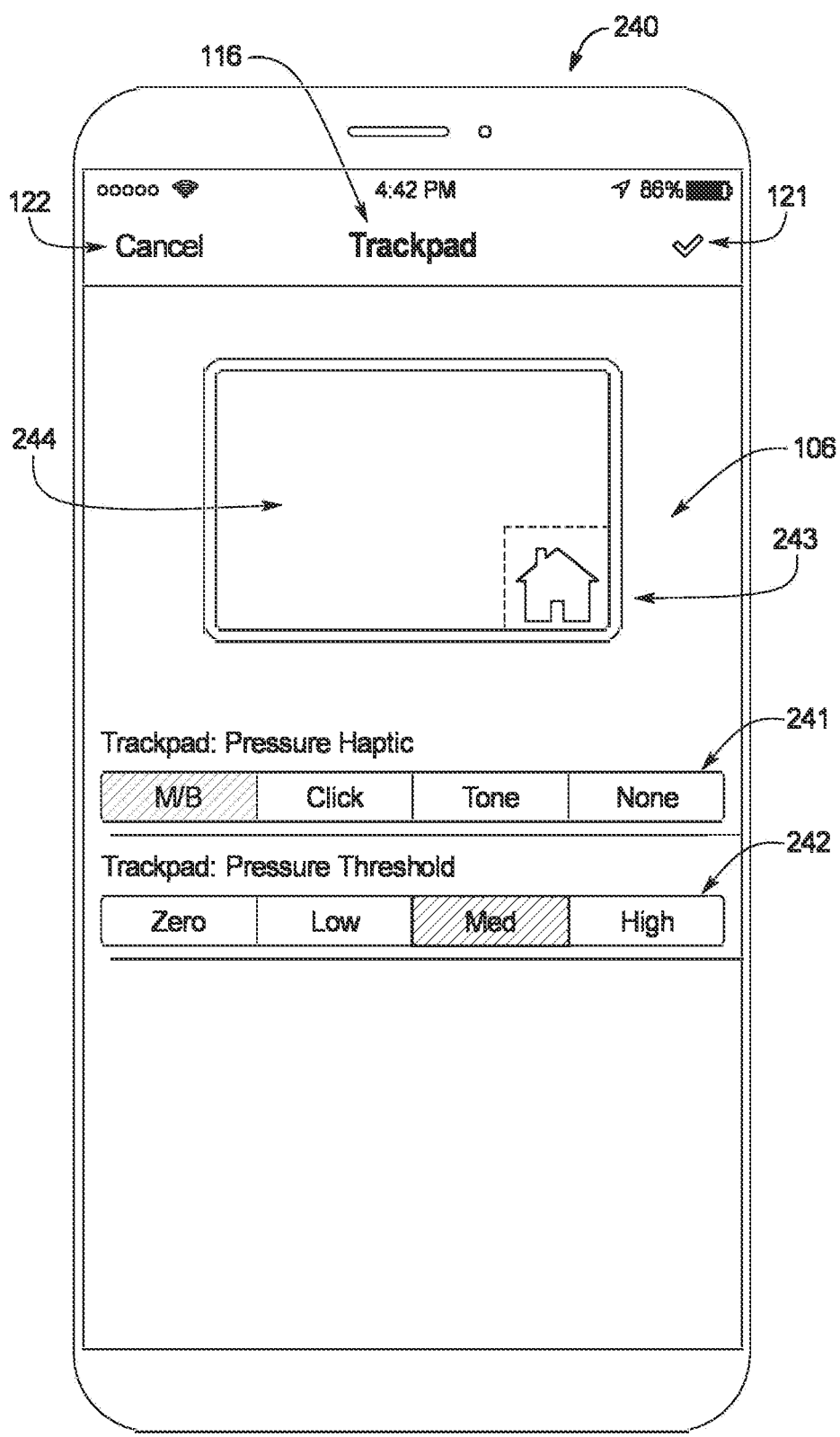
FIG. 24 illustrates a trackpad configurator of an integrated development environment according to the present disclosure.

FIG. 24 illustrates a trackpad configurator 240 of an example integrated development environment. The trackpad configurator 240 may be selected by selecting the trackpad 106 on the panel layout 103 of the integrated development environment. In the trackpad configurator 240, various properties of the trackpad 106 may be edited. For example, a trackpad haptic selector 241 may be used to select the feedback received when the trackpad 106 is touched by the user. A trackpad pressure threshold selector 242 may be used to select the amount of pressure required by the user to activate the trackpad 106 and begin sending inputs to the panel 250.

A trackpad may comprise more than one input area. For example, the trackpad 106 has two input areas, trackpad area 244 and trackpad home button 243. Each input area may be configured to perform a different function. For example, a user input directed to the trackpad home button 243 may send one instruction to the processor 262, while the same input directed to the trackpad area 244 may send a different instruction to processor 262.

In an embodiment, the trackpad area 244 and the trackpad home button 243 may be configured to receive different types of inputs. For example, the trackpad area 244 may be configured to accept a multi-finger gesture, while trackpad home button 243 may only be configured to accept a press. In an embodiment, the trackpad area 244 may receive a pinch to zoom input. In an embodiment, a two finger pressure freeze may be received by the trackpad area 244, the two finger pressure freeze comprising receiving a two finger gesture, then locking inputs for about 300 ms after the selected two finger gesture. In an embodiment, the trackpad area 244 may receive a three finger gesture indicating, for example, to enter a rest mode.

When the user has completed the edits, the configuration of the trackpad 106 can be saved by selecting the edit acceptor 121. If the user instead wishes to discard any changes to the configuration of the trackpad 106, the user may exit the trackpad configurator 240 without saving the configuration by selecting the edit rejector 122.

Figure 25:
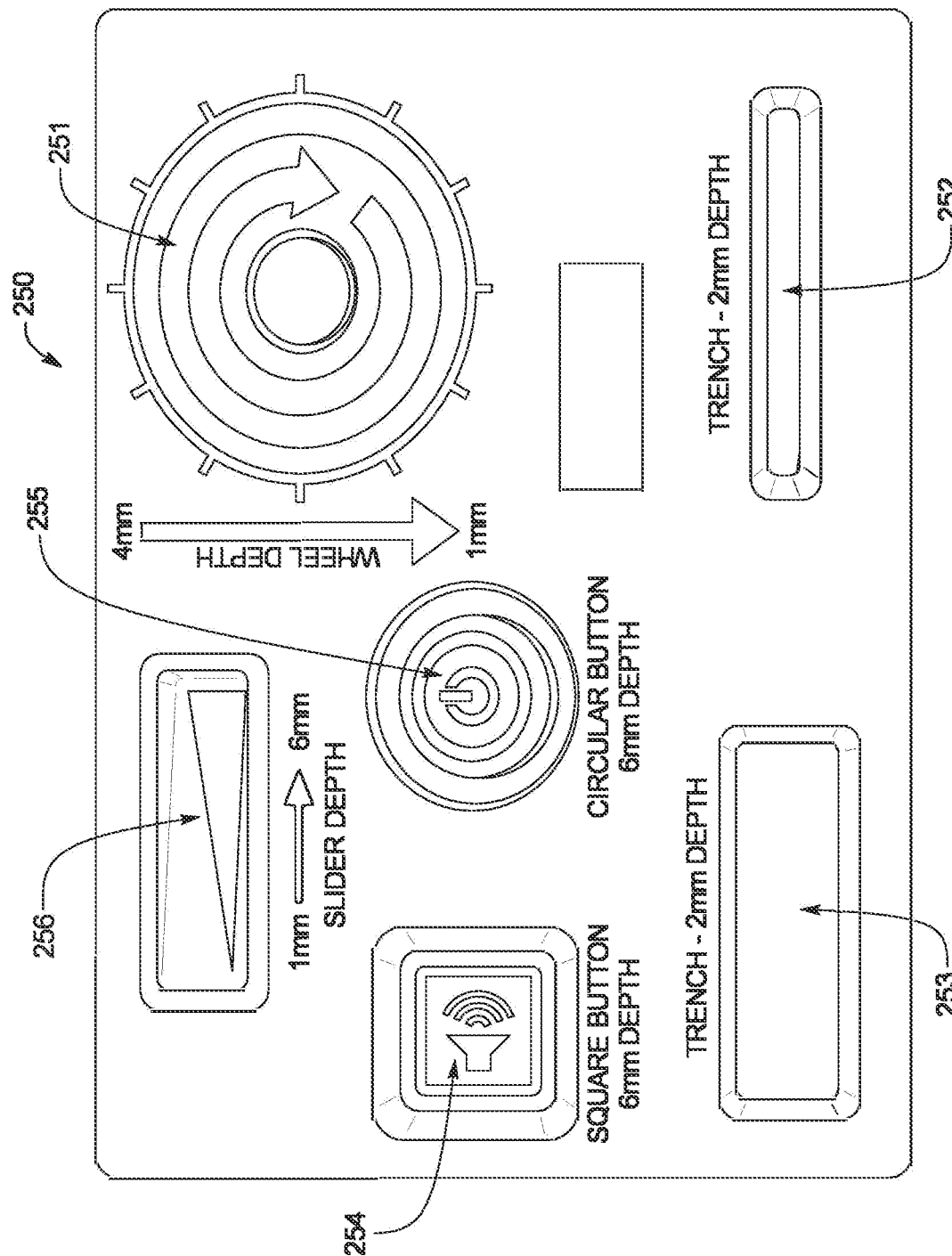
FIG. 25 illustrates a front view of a panel according to the present disclosure.

FIG. 25 illustrates an embodiment of the panel 250 system. The exemplary panel 250 system includes the panel 250 and user input locations. The panel may be provided in various shapes, sizes, and layouts according to the application in which the panel 250 system is to be used. For example, the panel 250 may take the shape of a fork lift console to be integrated into a fork lift to be used as the fork lift's user interface. The panel may also take the shape of a technician input panel of an MRI, ultrasound, or other medical device.

The panel 250 may comprise user input locations. In an exemplary embodiment, the panel 250 may be shaped to create a user input location that resembles a button but may not depress like a button. For example, the panel 250 may comprise a round button 255. Furthermore, the panel 250 may be arranged such that the circuit trace lines 261 layout allows a user to generate an input in a location corresponding with the round button 255. Thus, a user may generate an input by pressing the round button 255 at the user input location. User inputs may not be confined to buttons, as user inputs may include the form of single or multi-touch gestures, swipes, contacts that simulate swipes, clicks, scrolls, spins, voice commands, bio-sensors (including face, retinal, and/or fingerprint scanners), and/or any other type of gesture and/or command.

The panel 250 may comprise a slider 256. The slider 256 may comprise a substantially rectangular depression in the panel 250. Other shapes of the slider 256 may be provided. The depression may be of varying depth, for example the sider 256 may vary from about 1 mm to about 6 mm in depth. In an embodiment, the slider 256 correlates to a slider of an integrated development environment, for example slider 107, and is configured to receive inputs from a user according to the configuration of an integrated development environment.

The panel 250 may comprise a trench 252. The trench 252 may be a depression in the panel 250. The depression of the trench 252 may be about 2 mm in depth. The trench 252 may be about 25 mm long, about 7.62 mm wide, and receded about 8 mm from a top surface of panel 250. Sensors may be placed underneath and along the length of the trench 252 to receive inputs from a user. As a user swipes a finger along the trench 252, the processor 262 (not shown) may be configured to correlate more or fewer sensor inputs with gross or fine movements of the user.

A wide trench 253 may additionally or alternatively be provided in the panel 250. The wide trench 253 may be about 2 mm in depth. The trench 252 and/or the wide trench 253 may correlate to a selectable area of an integrated development environment. For example, an integrated development environment may be configured to accept a press, a swipe, and/or a slide from the user in the trench 252. Such a configuration allows a user to apply a press, a swipe, and/or a slide to the trench 252 without looking at the panel 250, i.e. the user can press a button or otherwise give an input by feel.

The panel 250 may comprise a square button 254. The square button 254 may be a square depression in the panel 250, and may be about 6 mm in depth. The square button 254 may include an icon or graphic indicating a potential use of the square button 254. In an embodiment, the square button 254 correlates to a button of the integrated development environment, and is configured to receive inputs from a user according to the configuration of the integrated development environment. The icon used in the integrated development environment may correlate to the icon or graphic indicating a potential use of the square button 254.

The panel 250 may comprise a scroll wheel 251. The scroll wheel 251 may be a circular depression in the panel 250, and may vary from about 1 mm to about 4 mm in depth. The scroll wheel 251 may include an icon or graphic indicating a potential use and/or direction of input of the scroll wheel 251. In an embodiment, the scroll wheel 251 correlates to a scroll wheel of the integrated development environment, and is configured to receive inputs from a user according to the configuration of the integrated development environment. The icon used in the integrated development environment may correlate to the icon or graphic indicating a potential use of the scroll wheel 251.

The panel 250 may also comprise a printed circuit board ("PCB") including the processor 262. The processor 262 may be configured to receive inputs from the circuit trace lines 261. Furthermore, the processor 262 may be configured to receive inputs from the circuit trace lines 261 resulting from user-generated inputs. Furthermore, the processor 262 may be configured to generate outputs to and receive inputs from an external CPU from the PC board. The CPU may be configured to communicate with the integrated development environment. As a result, the processor 262 response to a user input may be varied through the use of the integrated development environment.

The panel 250 system may also comprise a system to communicate feedback to a user. For example, the panel 250 may comprise illumination elements such as light bulbs, LEDs and/or touch screens such as LED display or LCD touch screens. Such elements may illuminate in response to a user generated inputs. Signals may be transmitted to the illumination elements via pulse width modulation signals. Other feedback means may comprise haptics, kinesthetic communication, forces, vibrations, lights, sounds, recordings, videos, temperature, wind, and/or any other output readily received by the senses of the user.

A panel 250 may comprise various numbers and types of sensors. For example, a panel 250 may be configured with proximity sensors. In such a configuration, the panel 250 may be able to detect when a user is approaching the panel 250 and/or is about to make contact with the panel 250. Such a proximity sensor may be an infrared sensor.

The panel 250 may include a connection port that can be connected directly to a device running the integrated development environment. For example, the connection may include a USB mini, USBC adapter, CAN adapter, and/or BT adapter. This connection may allow the panel 250 to be hard-line connected to the integrated development environment, which may provide at least a faster connection to send information to and/or from the panel 250 and the integrated development environment.

Figure 26:
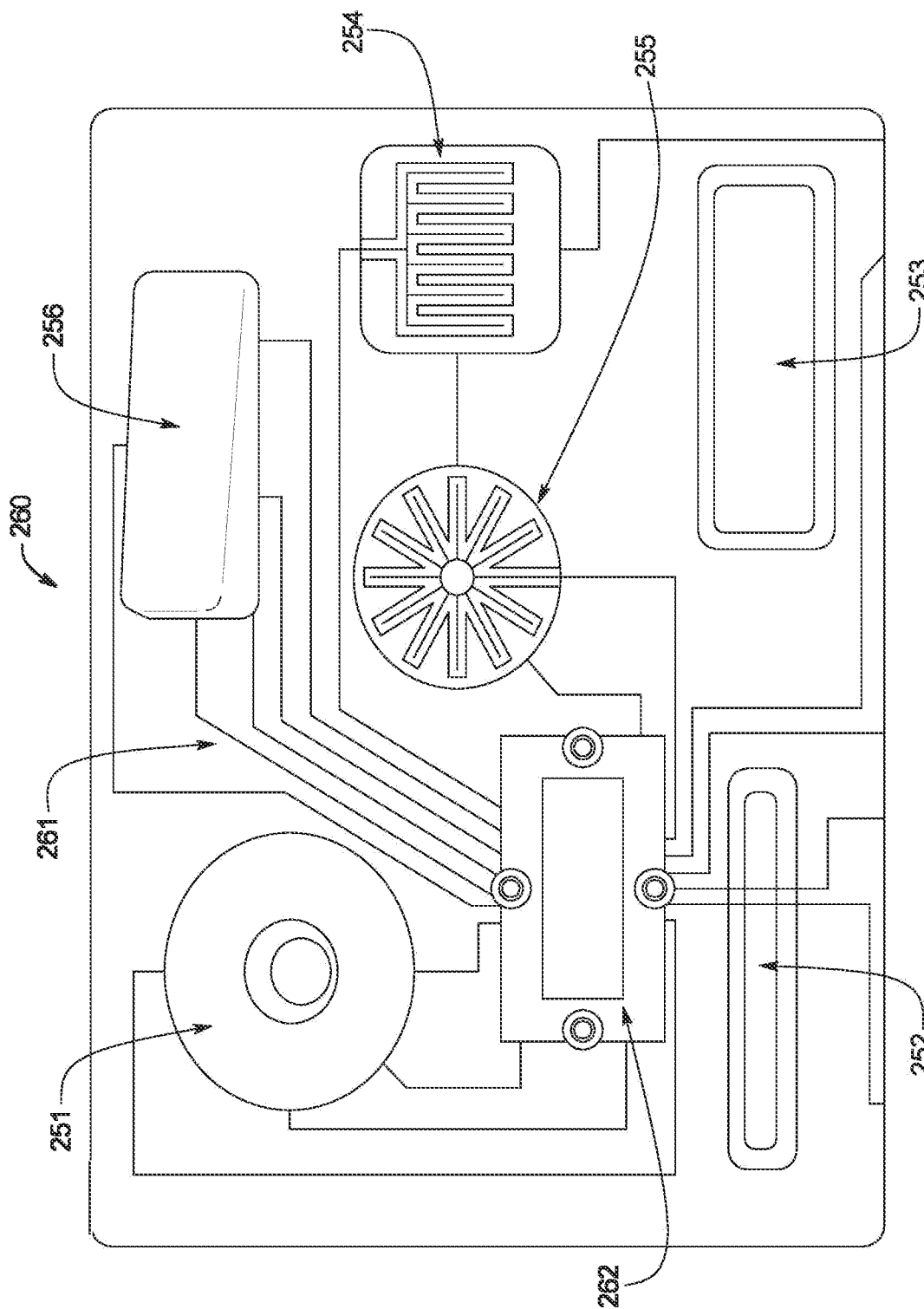
FIG. 26 illustrates a back view of a panel according to the present disclosure.

FIG. 26 illustrates the back of the panel 250, a panel contralateral 260. From the back of the panel contralateral 260, the depressions of the slider 256, square button 254, round button 255, wide trench 253, trench 252, and scroll wheel 251 are all visible. Also visible are circuit trace lines 261.

Figure 27:
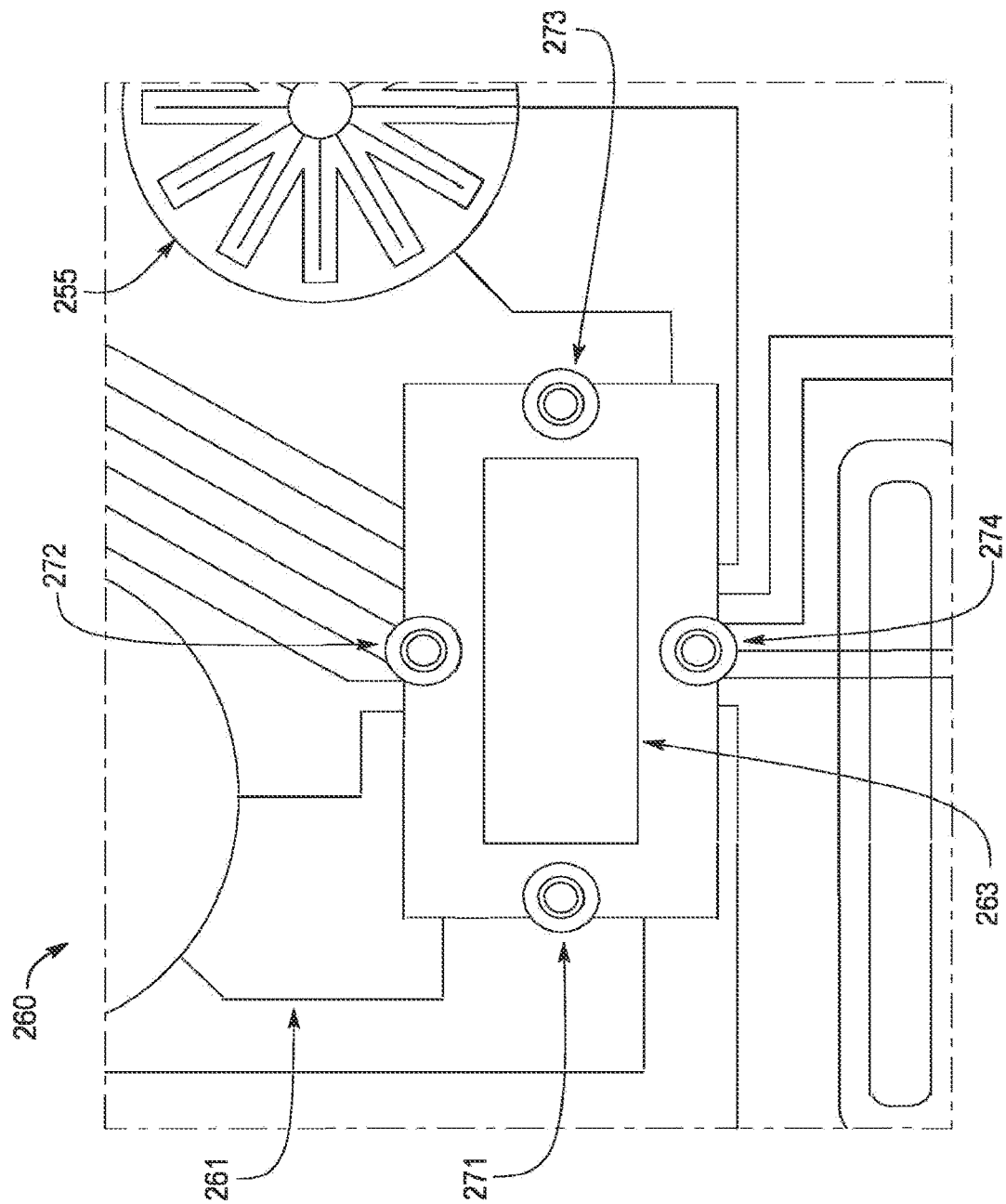
FIG. 27 illustrates a detailed back view of a panel according to the present disclosure.

As shown in FIGS. 26 and 27, the panel 250 and the panel contralateral 260 may comprise alternating layers of conductors and insulators molded within the panel 250. In such an embodiment, conductors may be arranged in a circuit, and may be referred to as the circuit trace lines 261. The circuit trace lines 261 may be formed from a conductive ink printed on injection molded plastic that makes up the panel 250. An overlay of the panel 250, which is the portion of the panel 250 seen by the user, may be created using an in-mold design ("IMD") process. In an embodiment, the panel 250 may be 3-D printed. In an embodiment, the panel 250 may be manufactured using thermal forming over a pre-configured metal plate. The circuit trace lines 261 may comprise a circuit layout such that, at various locations throughout the circuit, a user may touch the board at a contact point to generate an input. The contact point may comprise a raised or a depressed portion such that a user can position a finger or fingers in a desired location based on feel and without the need to visually confirm correct placement of the finger(s) at the desired location. A finger, a hand, and/or multiple fingers can all be used to provide input.

The back view of the panel contralateral 260 shows how the circuit trace lines 261 are integrated into the panel contralateral 260 to receive inputs at each of the input receiving areas of the panel 250. A PC board receiver 263 is also shown on the panel contralateral 260. The PC board receiver 263 may be configured to receive the PC board. The PC board may be able connected to the PC board receiver 263 by soldering or some other connection process.

FIG. 27 illustrates a detail view of the PC board receiver 263 of the panel contralateral 260. The round button 255 is shown for reference. The PC board receiver 263 may include board fasteners 271, 272, 273, and 274 which may be configured to connect the PC board to the panel contralateral 260, and connect the circuit trace lines 261 of the panel contralateral 260 to the PC board. In an embodiment, more or fewer board fasteners may be provided. In an embodiment, the board fasteners may comprise clips, snaps, pins, screws, bolts, adhesive, glue and/or other fasteners configured to connect the PC board to the panel contralateral 260.

The processor 262 of the PC board can take inputs transmitted through the circuit trace lines 261 and communicate those inputs to another location remotely located from the PC board. For example, the PC board may communicate the inputs via an Ethernet connection or another wired and/or wireless connection method.

Figure 28:
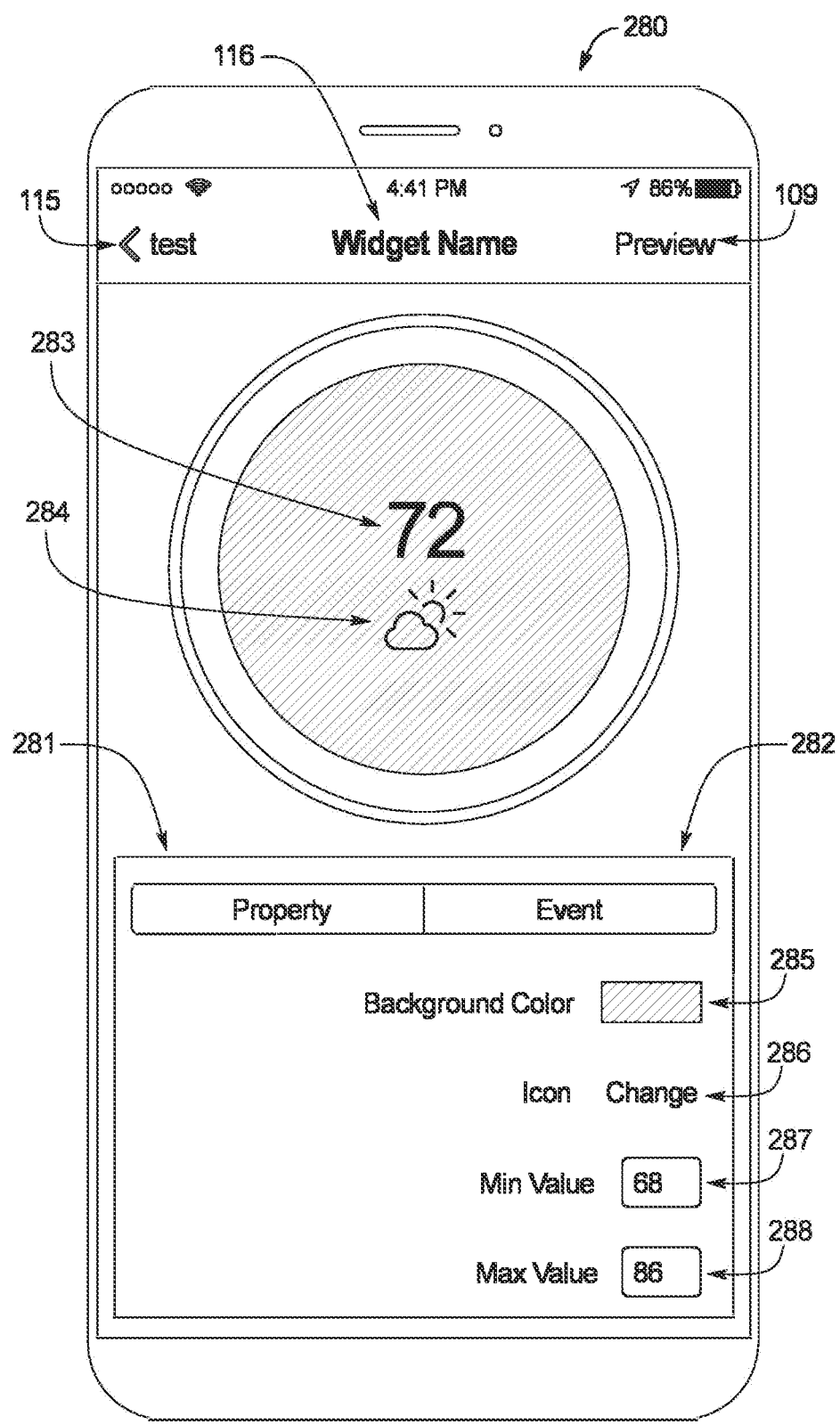
FIG. 28 illustrates an integrated development environment according to the present disclosure.

FIG. 28 illustrates an encoder display configurator 280 of an integrated development environment. The encoder display configurator 280 may be selected by selecting an encoder display 71 on an encoder layout of the integrated development environment. In the encoder display configurator 280, various properties of the encoder display 71 may be edited.

The integrated development environment may be the same as the integrated development environment 100 used for the panel 250, or may be a different integrated development environment. Accordingly, an exemplary encoder and/or panel with an associated input method editor with the integrated development environment can provide a user with the ability to develop and/or apply selected encoder and/or panel configurations across a range of encoders and/or panels in the field.

The encoder 50 input methods may be the same as used for the panel 250. The encoder 50 may comprise fewer or additional input methods than the panel 250. In various embodiments, the encoder 50 may comprise a physical layout and a digital layout. For example, a capacitive sensor may be combined with a switch, scroll wheel, button, slide, and/or toggle. In such an embodiment user inputs and CPU outputs may be communicated through both the physical layout and the digital layout of the encoder 50.

An integrated development environment user interface may provide for the use of any combination of elements described above in reference to the panel 250 on the encoder 50. Such input methods include but are not limited to a trackpad, button, swipe, scroll wheel, slider, and/or rotary button. For example, a large rotary button may be designed configured in the center of the encoder 50. In addition, smaller buttons may be configured around the circumference of the rotary button. In other embodiments, a switchboard comprising numerous switches may be configured in the integrated development environment. A user may create custom buttons with associated custom functionality, representing any type or combination of button, switch, scroll, wheel, swipe, and/or slide not specifically referenced herein.

For example, the integrated development environment may vary and/or edit the number, type, and layout of inputs sent and received by the encoder 50. For example, a user may have a need to communicate to a CPU through a single switch. As a result, the encoder 50 may require a layout that comprises a single switch. In such a layout, the integrated development environment can be configured by the user to instruct the processor 17a of the encoder 50 to comprise a single switch. Furthermore, the integrated development environment can selectively control the inputs received by the single switch.

For example, the switch may be configured to communicate a signal to the processor 17a when the switch is swiped by the user through the use of a capacitive sensor integrated into the encoder 50. A user may also require feedback when the switch is actuated by the user and a signal is communicated to the processor 17a. In such an example, the integrated development environment can be configured by the user to instruct the processor 17a of the encoder 50 to display a light when a signal from the configured encoder 50 switch is communicated to the processor 17a so that the light may be seen by the user, indicating to the user that the processor 17a has received the signal from the encoder 50 switch as configured by the user.

The above example should not be seen as limiting the functionality of the encoder 50 and integrated development environment system to a single switch that gives the user a single feedback source based on communications to or from the processor 17a. The encoder 50 and integrated development environment system can configure the encoder 50, through the use of the integrated development environment 100, to receive any number, type, and/or combination of inputs from the user and communicate those inputs into the processor 17a, and likewise take processor 17a outputs and communicate the desired output into any number, type, and/or combination of feedback to be communicated through the encoder 50 to the user.

Referring back to FIG. 28, the environment name 115 may be used to select other sets of configurations, i.e. other sets of "Options" to be selected for editing. In a selected configuration of the integrated development environment, the configuration may be edited by selecting the input method editor selector 109, which may be used to edit an input received by the encoder 50 in a location, and/or by selecting a property mode selector 281 to access an editor mode selection screen. An encoder event selector 282 may be used to access an event mode screen which can correlate different user inputs with different displays and/or input receiving methods of the encoder 50.

Figure 29:
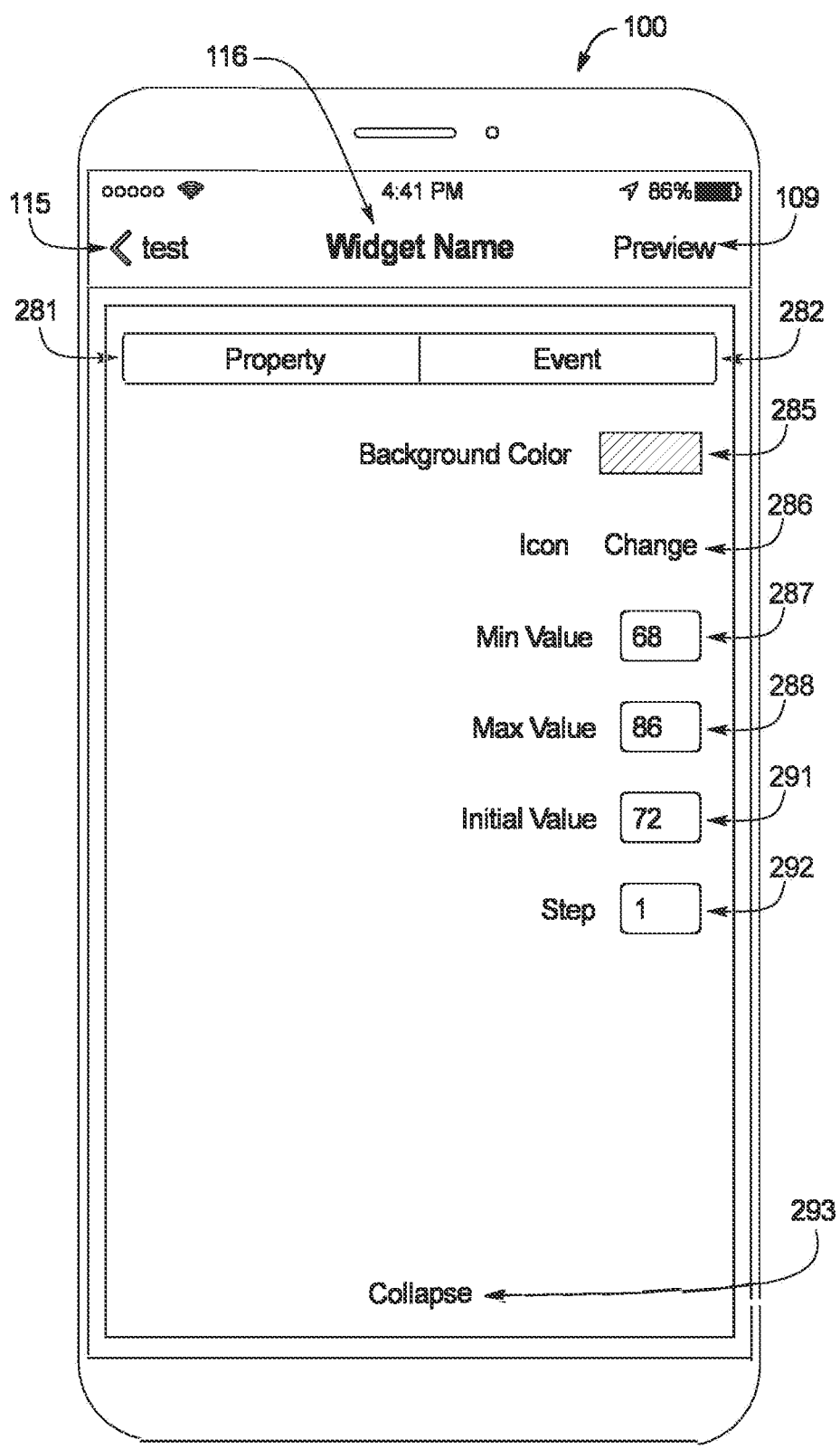
FIG. 29 illustrates a scrolled down view of an integrated development environment according to the present disclosure.

In the encoder property selector 281, various selectors may be used to change the configuration of the encoder 50. For example, selector 285 may be used to select a background color, selector 286 may be used to select an icon, selector 287 may be used to set a minimum value of a numeric display 283, and selector 288 may be used to select a maximum value of the numeric display 283. FIG. 29 shows a scrolled-down view of the encoder display configurator 280 including selector 291, which may be used to select an initial value of the numeric display 283, and selector 292, which may be used to select a step value as the numbers shown in the numeric display 283 are moved between the initial value, minimum value, and maximum value. FIG. 29 also includes a collapse button 293, which may be used to collapse the list of selectors.

The encoder display configurator 280 may also be used to edit an icon 284. In an embodiment, the icon 284 may correlate to the setting that may be varied by the numeric display 283. For example, the encoder 50 may comprise the functionality of reporting the weather to a user. The icon 284 may be changed to correlate to the current weather in a selected location. The numeric display 283 may be changed to correlate to the temperature in the same selected location. Accordingly, the encoder 50 may relay a weather report to the user.

Figure 30:
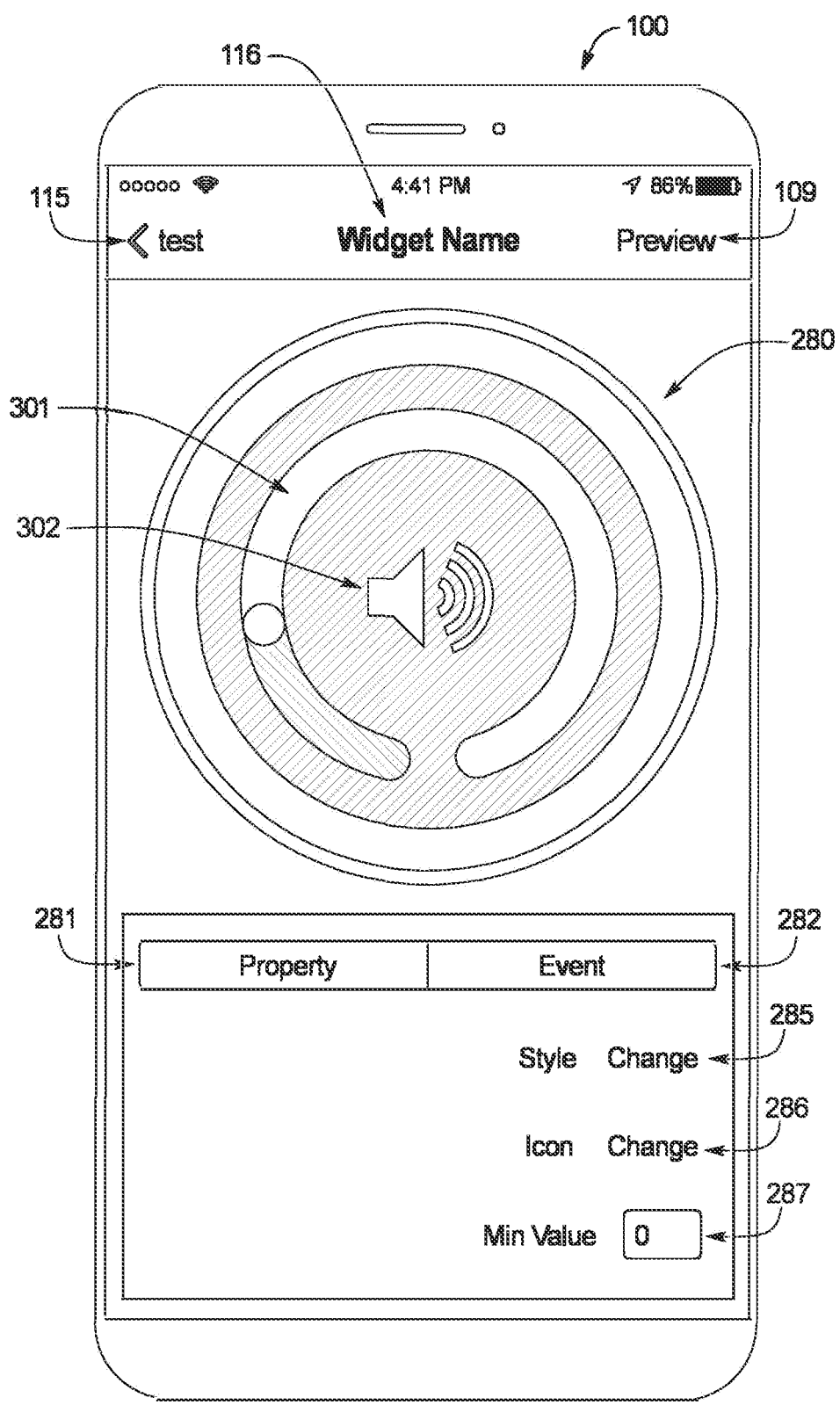
FIG. 30 illustrates an integrated development environment according to the present disclosure.

FIG. 30 shows an additional or alternative embodiment of the encoder display configurator 280. In the embodiment according to FIG. 30, the encoder 50 may comprise a scroll wheel display that correlates to movement of the knob 27 of the encoder 50. In an embodiment, as the knob 27 is turned by the user, a scroll wheel 301 may be updated to show a relative position of a slider in the scroll wheel 301. A button 302 may indicate the functionality that the user is controlling, and may also include another input area for the user.

For example, the encoder 50 may be used as a volume controller. The relative positon of the volume may be indicated by the scroll wheel 301. The volume may be changed by the user using the knob 27. The button 302 may show an icon indicating to the user that the encoder 50 is currently controlling volume. The button 302 may be further configured to mute and/or unmute the controlled volume. Other uses for the encoder 50 may include but are not limited to a fan speed, a channel selector, a temperature selector, a generic dynamic number selector, a generic dynamic bar graph editor, and/or a lights setting.

In an embodiment, configurations of the encoder 50 may be pre-configured and available for purchase from a manufacturer. Such configurations may be located in a configuration library, which may be integrated into the integrated development environment and/or may be hosted in another stand-alone application. In an embodiment, a configuration may only be partially configured from a manufacturer, and the remaining portions of which may be filled in by a user and/or purchaser.

Referring to FIG. 30, the encoder property selector 281 may be used to change the configuration of the encoder 50. For example, selector 285 may be used to select a style, selector 286 may be used to select an icon, and selector 287 may be used to set a minimum value of the scroll wheel 301. The encoder event selector 282 may be used to access an event mode screen which can correlate different user inputs with different displays and/or input receiving methods of the encoder 50. In an embodiment where the encoder 50 requires a connection to another device, the encoder 50 may be configured to display an indication when the signal to the other device is lost and/or connected.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims. Further, the present embodiments are thus not to be limited to the precise details of methodology or construction set forth above as such variations and modification are intended to be included within the scope of the present disclosure. Moreover, unless specifically stated any use of the terms first, second, etc. do not denote any order or importance, but rather the terms first, second, etc. are merely used to distinguish one element from another.

The invention claimed is:

1. A system comprising:
a panel having a CPU, a memory, and a transceiver, and at least one input means wherein the panel is configured to receive a first input from a user via the at least one input means and communicate the first user input to the CPU based on a first panel configuration; and
a portable computing device, remote from the at least one input means comprises a configurator, wherein the portable computing device wirelessly communicates with the CPU via the transceiver to electronically configure the first panel configuration of the panel, wherein electronically configuring the first panel configuration includes remotely determining all limits for the first input and the at least one input means of the panel, and wherein the configurator wirelessly applies the limits to the first panel configuration.

2. The system according to claim 1, wherein the portable computing device comprises a portable computing device memory configured to store a second panel configuration as a second panel configuration file, wherein the portable computing device wirelessly transmits the second panel configuration file to the panel.

3. The system according to claim 1, wherein the configurator comprises an integrated development environment configured to edit the second panel configuration file.

4. The system according to claim 3, wherein the integrated development environment is configured to edit the sensitivity of a first programmable input of the panel.

5. The system according to claim 4, wherein the portable computing device allows a plurality of user profiles to access the integrated development environment.

6. The system according to claim 5, wherein the portable computing device is configured to allow customization of a third panel configuration file in the integrated development environment based on one of the plurality of user profiles.

7. The system according to claim 1, wherein the panel further comprises a feedback unit to provide feedback to a user.

8. The system according to claim 7, wherein the feedback unit is configurable.

9. The system according to claim 1, wherein the panel is adapted for use in a vehicle.

10. The system according to claim 1, wherein the panel is adapted for use in a healthcare application.

11. A method, comprising:
configuring, at a remote configurator, an encoder according to a first input configuration from a user, the first input configuration defining a first gesture; the first input configuration further comprising a first icon and a second icon; the encoder comprising a physical layout and a digital layout, the digital layout comprising a digital representation of at least one feature of the physical layout; configuring of the encoder further comprises editing the digital representation at the remote configurator to determine all limits of the physical layout, first gesture, first icon, and second icon;
transmitting wirelessly the first input configuration from the remote configurator to the encoder to apply the limits to the physical layout of the encoder;
configuring, at the remote configurator, the encoder according to a second input configuration from a user, the second input configuration defining a second gesture different from the first gesture; the second input configuration further comprising a third icon and a fourth icon; configuring of the encoder further comprises editing the digital representation at the remote configurator to determine all limits of the physical layout, second gesture, third icon, and fourth icon, and transmitting wirelessly the second input configuration from the remote configurator to the encoder to apply the limits to the physical layout of the encoder.

12. The method according to claim 11, wherein the encoder comprises a central protrusion, a knob configured to rotate in substantially a single plane about the central protrusion and a top surface comprising a touch screen configured to display a first display comprising the first icon and the second icon as defined by the remote configurator.

13. The method according to claim 11, wherein the encoder comprises a feedback unit configured to provide feedback of at least one selected from the group of visual feedback, audible feedback, haptic feedback, and motion feedback.

14. The method according to claim 13, further comprising providing feedback at the feedback unit when the first input is received by a touch screen.

15. A method, comprising:
receiving, at a molded panel, a first user input configuration file from a portable computing device, the first user input configuration file comprising a first user input configuration, wherein the first user input configuration determines all limits for a first user input and a first user input area of the molded panel;
receiving the first user input at the first user input area based on a user contact with the first user input area at the molded panel, wherein the first user input area is electronically configured according to the first user input configuration, and wherein the first user input area is remote from the portable computing device;
communicating the first user input to a CPU based on the first user input configuration;
receiving, at the molded panel, a second user input configuration file from the portable computing device, the second user input configuration file comprising a second user input configuration, wherein the second user input configuration determines all limits for a second user input and a second user input area of the molded panel;
receiving the second user input at the second user input area at the molded panel based on a user contact with the second user input area at the molded panel, wherein the second user input area is electronically configured according to the second user input configuration file, and wherein the second user input area is remote from the portable computing device;
communicating the second user input to the CPU based on the second user input configuration.

16. The method according to claim 15, wherein the first user input area is the same as the second user input area.

17. The method according to claim 15, wherein the first user input area is different from the second user input area.

18. The method according to claim 17, further comprising providing feedback in response to the first user input or the second user input selected from the group consisting of visual feedback, audible feedback, haptic feedback, motion feedback, and combinations thereof.

19. The method according to claim 17, wherein the first user input area comprises a raised or a depressed portion of the molded panel.

20. The method according to claim 17, wherein the molded panel is adapted for use in a vehicle.

* * * * *